United States Patent
Flagg et al.

(10) Patent No.: US 11,237,638 B2
(45) Date of Patent: Feb. 1, 2022

(54) SYSTEMS AND METHODS FOR EXTENSIONS TO ALTERNATIVE CONTROL OF TOUCH-BASED DEVICES

(71) Applicant: Cuesta Technology Holdings, LLC, Mountain View, CA (US)

(72) Inventors: Matthew Flagg, San Diego, CA (US); Jeremy Barrett, Atlanta, GA (US); Scott Wills, Mountain View, CA (US); Sean Durkin, Encinitas, CA (US); Vinod Valloppillil, San Francisco, CA (US); Satya Mallick, San Diego, CA (US)

(73) Assignee: Cuesta Technology Holdings, LLC, Mountain View, CA (US)

( * ) Notice: Subject to any disclaimer, the term of this patent is extended or adjusted under 35 U.S.C. 154(b) by 0 days.

(21) Appl. No.: 16/132,541

(22) Filed: Sep. 17, 2018

(65) Prior Publication Data

US 2019/0025936 A1 Jan. 24, 2019

Related U.S. Application Data

(63) Continuation of application No. 15/602,691, filed on May 23, 2017, now Pat. No. 10,108,271, which is a
(Continued)

(51) Int. Cl.
*G06F 3/16* (2006.01)
*G06F 3/0346* (2013.01)
(Continued)

(52) U.S. Cl.
CPC ............ *G06F 3/017* (2013.01); *A63F 13/213* (2014.09); *A63F 13/2145* (2014.09);
(Continued)

(58) Field of Classification Search
CPC ......... G06F 3/017; G06F 3/0484; A63F 13/42
See application file for complete search history.

(56) References Cited

U.S. PATENT DOCUMENTS 6,219,032 B1 4/2001 Rosenberg
7,278,115 B1 10/2007 Conway
(Continued)

OTHER PUBLICATIONS

Broderick, et al., "Fast and Flexible Selection with a Single Switch", Plos One, vol. 4, Issue 10, Oct. 2009, pp. 1-8.

*Primary Examiner* — Kevin M Nguyen
(74) *Attorney, Agent, or Firm* — Clements Bernard Baratta; Lawrence A. Baratta, Jr.

(57) ABSTRACT

Systems and methods of multi-modal control of a touch-based device include receiving multi-modal control inputs from one or more of voice commands, a game controller, a handheld remote, and physical gestures detected by a sensor; converting the multi-modal control inputs into corresponding translated inputs which correspond to physical inputs recognizable by the touch-based device; and providing the corresponding translated inputs to the touch-based device for control thereof, wherein the translated inputs are utilized by the touch-based device as corresponding physical inputs to control underlying applications executed on the touch-based device which expect the corresponding physical inputs.

12 Claims, 40 Drawing Sheets

Input – Recordings of touches and screenshots serves as training data

Output – User Model to predict most likely touch interaction per screen

"Snap to" – Cursor enters region of interest & is "snapped" to anchor

"Drag Region" – Translates large hand movements into bounded, fine grained cursor movements when dragging objects

Related U.S. Application Data continuation of application No. 14/923,888, filed on Oct. 27, 2015, now Pat. No. 9,671,874, which is a continuation-in-part of application No. 14/075,742, filed on Nov. 8, 2013, now Pat. No. 9,658,695.

(60) Provisional application No. 61/724,248, filed on Nov. 8, 2012.

(51) Int. Cl.
| | | |
|---|---|---|
| *G06F 3/0488* | (2013.01) | |
| *G06F 3/042* | (2006.01) | |
| *G06F 3/01* | (2006.01) | |
| *G06K 9/00* | (2006.01) | |
| *A63F 13/42* | (2014.01) | |
| *A63F 13/67* | (2014.01) | |
| *G06F 3/0484* | (2013.01) | |
| *A63F 13/26* | (2014.01) | |
| *A63F 13/213* | (2014.01) | |
| *A63F 13/2145* | (2014.01) | |

(52) U.S. Cl.
CPC .............. *A63F 13/26* (2014.09); *A63F 13/42* (2014.09); *A63F 13/67* (2014.09); *G06F 3/0346* (2013.01); *G06F 3/0425* (2013.01); *G06F 3/0484* (2013.01); *G06F 3/04883* (2013.01); *G06F 3/167* (2013.01); *G06K 9/00335* (2013.01); *G06F 2203/0381* (2013.01); *G06F 2203/04108* (2013.01); *G06F 2203/04801* (2013.01)

(56) References Cited

U.S. PATENT DOCUMENTS

| | | | |
|---|---|---|---|
| 8,363,009 B1 | 1/2013 | Queru | |
| 8,482,527 B1 | 7/2013 | Kim | |
| 9,155,960 B2* | 10/2015 | Argiro | A63F 13/98 |
| 9,671,874 B2 | 6/2017 | Flagg et al. | |
| 2005/0054920 A1 | 3/2005 | Washbum | |
| 2008/0215994 A1 | 9/2008 | Harrison et al. | |
| 2008/0267447 A1 | 10/2008 | Kelusky | |
| 2008/0273015 A1 | 11/2008 | Huang | |
| 2009/0049388 A1* | 2/2009 | Taib | G06F 3/038 715/738 |
| 2010/0053151 A1 | 3/2010 | Marti | |
| 2010/0277489 A1 | 11/2010 | Geisner | |
| 2010/0281432 A1 | 11/2010 | Geisner et al. | |
| 2011/0216002 A1 | 9/2011 | Weising | |
| 2011/0227841 A1* | 9/2011 | Argiro | G06F 3/016 345/173 |
| 2011/0230178 A1 | 9/2011 | Jones | |
| 2012/0017147 A1 | 1/2012 | Mark | |
| 2012/0020183 A1 | 1/2012 | Lee | |
| 2012/0098754 A1 | 4/2012 | Kim | |
| 2012/0100900 A1 | 4/2012 | Su et al. | |
| 2012/0169671 A1 | 7/2012 | Yaautake | |
| 2012/0242800 A1 | 9/2012 | Ionescu et al. | |
| 2012/0275686 A1 | 11/2012 | Wilson | |
| 2012/0303274 A1 | 11/2012 | Su | |
| 2012/0309532 A1 | 12/2012 | Ambrus et al. | |
| 2012/0319989 A1* | 12/2012 | Argiro | G06F 3/038 345/174 |
| 2013/0082978 A1 | 4/2013 | Horvitz | |
| 2013/0086674 A1 | 4/2013 | Horvitz | |
| 2013/0093702 A1* | 4/2013 | Argiro | G06F 3/041 345/173 |
| 2013/0303281 A1 | 11/2013 | Argiro | |
| 2013/0307792 A1* | 11/2013 | Andres | G11B 27/005 345/173 |
| 2014/0019653 A1 | 1/2014 | Amchislavsky et al. | |
| 2014/0049475 A1* | 2/2014 | Argiro | G06F 3/041 345/172 |
| 2014/0139455 A1* | 5/2014 | Argiro | A63F 13/02 345/173 |
| 2014/0157210 A1* | 6/2014 | Katz | G06F 3/017 715/863 |
| 2014/0337791 A1 | 11/2014 | Agnetta | |
| 2015/0029095 A1* | 1/2015 | Gomez | G06F 3/033 345/156 |
| 2015/0138089 A1* | 5/2015 | Angerbauer | G06F 3/041 345/158 |
| 2016/0030835 A1* | 2/2016 | Argiro | A63F 13/02 463/33 |

* cited by examiner

Input – Recordings of touches and screenshots serves as training data

Output – User Model to predict most likely touch interaction per screen

"Snap to" –
Cursor enters region of interest & is "snapped" to anchor

"Drag Region" –
Translates large hand movements into bounded, fine grained cursor movements when dragging objects

- 902

OBTAIN IMAGE INFORMATION 930

LOCATE PRIMARY LANDMARK 932

DEFINE SECONDARY LANDMARK REGION 934

DETERMINE LIGHT PATTERN 936

PROJECT LIGHT PATTERN 938

OBTAIN IMAGE INFORMATION 940

LOCATE SECONDARY LANDMARK 942

DETERMINE POSE 944

DETERMINE COMMAND INPUT 946

FIG. 20

Smartphone

Mono (RGB) On Device

Depth (IR Camera) Off Device

Application of Control Scheme Classifier

SYSTEMS AND METHODS FOR EXTENSIONS TO ALTERNATIVE CONTROL OF TOUCH-BASED DEVICES

CROSS-REFERENCE TO RELATED APPLICATION(S)

The present non-provisional patent application is a continuation of U.S. patent application Ser. No. 15/602,691, filed May 23, 2017, and entitled "MULTI-MODAL INPUT CONTROL OF TOUCH-BASED DEVICES," which is a continuation of U.S. patent application Ser. No. 14/923,888, filed Oct. 27, 2015, and entitled "SYSTEMS AND METHODS FOR EXTENSIONS TO ALTERNATIVE CONTROL OF TOUCH-BASED DEVICES" and the present non-provisional patent application is a continuation-in-part of U.S. patent application Ser. No. 14/075,742, filed Nov. 8, 2013, and entitled "SYSTEMS AND METHODS FOR ALTERNATIVE CONTROL OF TOUCH-BASED DEVICES," which claims priority to U.S. Provisional Patent Application Ser. No. 61/724,248, filed Nov. 8, 2012, and entitled "SYSTEM AND METHOD FOR PROVIDING ALTERNATIVE CONTROL OF TOUCH-BASED APPLICATIONS," the contents of all are incorporated in full by reference herein.

FIELD OF THE DISCLOSURE

The disclosure relates to providing computer vision based control of touch-based applications to facilitate user control over a touch-sensitive mobile device (smartphone, laptop, tablet, etc.) via non-contact gesture based inputs by a user to complement viewing output from the mobile device on an external display device, such as a television or the like.

BACKGROUND OF THE DISCLOSURE

Touch-sensitive user interfaces for mobile devices, such as smartphones, tablets, laptops, and other mobile devices are known. These devices are proliferating and include, without limitation, iOS-based devices from Apple, Android-based devices from various manufacturers, Windows 8.x devices from Microsoft and other manufacturers, and the like. Furthermore, these devices can operate various applications ("apps") which offer rich user experience for games, social networking, education, entertainment, health & fitness, music, productivity, and the like. Additionally, processing power and capability for mobile devices is beginning to be on par with desktop and laptop computers. With the enhanced processing capabilities of these mobile devices, it is possible to provide display information to external display devices having much larger display areas than the mobile devices (e.g., televisions and/or other display devices). However, for a user to control the mobile device and display content from the mobile device on the external display, the user must either be relatively close to the display device, implement a long connection cord between the mobile device and the external display, and/or implement a wireless connection between the mobile device and the display device (which may not be provide sufficient performance). Conventional mobile devices do not provide for an alternative form of control (e.g., alternative to touch) for these types of uses.

BRIEF SUMMARY OF THE DISCLOSURE

In an exemplary embodiment, systems and methods configured to facilitate gesture-based user inputs in lieu of physical inputs for a touch-based device include obtaining video and/or image data of a user at a distance from the touch-based device, wherein the user is not in physical contact with the touch-based device; processing the video and/or image data to detect gestures by the user; converting the detected gestures into appropriate touch-based commands; and providing the touch-based commands to the touch-based device.

In an exemplary embodiment, a method configured to facilitate multi-modal user inputs in lieu of physical input for a processing device configured to execute an application includes obtaining non-physical input for processing device and the application, wherein the physical input comprises one or more of touch-based input and tilt input; processing the non-physical input to convert into appropriate physical input commands for the application; and providing the physical input commands to the processing device. The non-physical input can include voice commands used to initiate multiple actions in the application, wherein the voice commands are converted into the appropriate physical input commands. The non-physical input can include input from a game controller which is converted into the appropriate physical input commands. The non-physical input can include input from a handheld remote which is converted into the appropriate physical input commands. The application can be controlled by physical touch commands on a touch screen and accelerometer readings associated with moving the touch-based device. The non-physical input can include gestures detected by a depth sensor which is converted into the appropriate physical input commands. Video and/or image data can be used to detect the gestures is from an imaging device associated with the processing device. Video and/or image data used to detect the gestures is from a sensor communicatively coupled to the processing device. The processing can include tracking hand position of the user in video and/or image data; detecting a pose of the hand position through the video and/or image data by assigning a pose to the hand for at least one of the images from a set of potential poses, the set of potential poses include a first active pose and a null pose; in response to detecting the first active pose, generating a control input command for the application; and in response to the null pose, refraining from generation of any control input command for the application. The null pose can be based on proximity of the hand position to at least one of one or more other body parts of the subject and one or more foreign objects. The method can further include utilizing a "snap to" technique on menu screens for the application on the processing device where a cursor enters a region of interest and is snapped to an anchor which translates large gesture movements into bounded, fine grained cursor movements. The method can further include enhancing menu screens in the application on the processing device to assist the user from getting to gameplay, wherein the enhancing comprises any of implementing a macro and modeling the menu screens on a graph to find a shortest path to the gameplay.

In another exemplary embodiment, a system configured to facilitate gesture-based user inputs in lieu of physical input for a processing device configured to execute an application includes an interface communicatively coupled to the processing device; and a processor communicatively coupled to the processing device and configured to obtain non-physical input for processing device and the application, wherein the physical input comprises one or more of touch-based input and tilt input; process the non-physical input to convert into appropriate physical input commands for the application; and provide the physical input commands to the processing device. The non-physical input can include voice commands used to initiate multiple actions in the application, wherein the voice commands are converted into the appropriate physical input commands. The non-physical input can include input from a game controller which is converted into the appropriate physical input commands. The non-physical input can include input from a handheld remote which is converted into the appropriate physical input commands. The application can be controlled by physical touch commands on a touch screen and accelerometer readings associated with moving the touch-based device. The non-physical input can include gestures detected by a depth sensor which is converted into the appropriate physical input commands. The processor can be further configured to enhance menu screens in the application on the processing device to assist the user from getting to gameplay, wherein the enhance comprises any of implementing a macro and modeling the menu screens on a graph to find a shortest path to the gameplay.

In a further exemplary embodiment, a processing device includes an interface communicatively coupled to a device configured to facilitate multi-modal user inputs in lieu of physical input, wherein the physical input includes one or more of touch-based input and tilt input; a processor communicatively coupled to the interface; and memory storing instructions that, when executed, cause the processor to execute an application configured to operate according to the physical input, and receive appropriate physical input commands from the interface, wherein the interface is configured to obtain non-physical input for the processing device, process the non-physical input to convert into the appropriate physical input commands for the application, and provide the appropriate physical input commands to the processing device via the interface.

BRIEF DESCRIPTION OF THE DRAWINGS

The present disclosure is illustrated and described herein with reference to the various drawings, in which like reference numbers are used to denote like system components/method steps, as appropriate, and in which:

FIG. 20 illustrates another overlay superimposed over application output by gathering location definition and visibility pattern from a gestures-based application.

DETAILED DESCRIPTION OF THE DISCLOSURE

In various exemplary embodiments, systems and methods are described providing alternative control of touch-based devices such as mobile devices. In an exemplary application, the systems and methods include a mobile device coupled to an external display device and controlled via user gestures monitored by a collocated sensor. Accordingly, the systems and methods allow users to operate applications ("apps") on the mobile device displayed on the external display device and controlled without touching the mobile device using gestures monitored by the collocated sensor. This enables the wide variety of rich apps to be operated in a new manner. In the various exemplary embodiments described herein, alternate control means replacing physical control of the mobile device with gesture-based control (i.e., not touching or moving the mobile device). That is, touches, swipes, rotation, angling, shaking, etc. is replaced with in-air gestures via hand movement, body movement, etc. The in-air gestures replace touches on the touch screen and tilt movement of the mobile device via the accelerometer, etc.

In an exemplary embodiment, the systems and methods enable a traditional touch-based device, such as an Android or iPhone mobile device, to be controlled in a multi-modal fashion, i.e., different modes of input besides touch. Specifically, these mobile devices are designed for touch-based inputs, namely touch screen inputs, accelerometer inputs, etc. The multi-modal fashion enables control of the mobile device, without modification of the mobile device or underlying applications on the mobile device. The multi-modal fashion includes voice commands, game controllers, hand-held remotes, and gestures. Again, the systems and methods provide a mechanism to add different input schemes to these touch-based devices.

For voice commands, the mobile devices can support voice commands to date, but only for a small subset of features such as starting an app. The systems and methods enable voice commands to not only open, but to also navigate an app and various screens included therein. For example, "Jump to Netflix Batman" could bring up the Netflix app and the Batman movie. For game controllers, the systems and methods can learn how menus are navigated through machine learning, Artificial Intelligence (AI), etc. to leans the flow of menus to more efficiently allow game controllers to navigate touch-based menus. The game controllers can be used to control the app instead of touch commands, i.e., Angry Birds with a joystick. For handheld remote, similarly, the systems and methods can enable navigation of the touch-based menus, based on the machine learning, AI, etc. Finally, the systems and methods enable the use of gestures in lieu of touch or tilt-based commands. Again, the systems and methods do not require modification of the mobile devices or the underlying apps to support this functionality.

Figure 1:
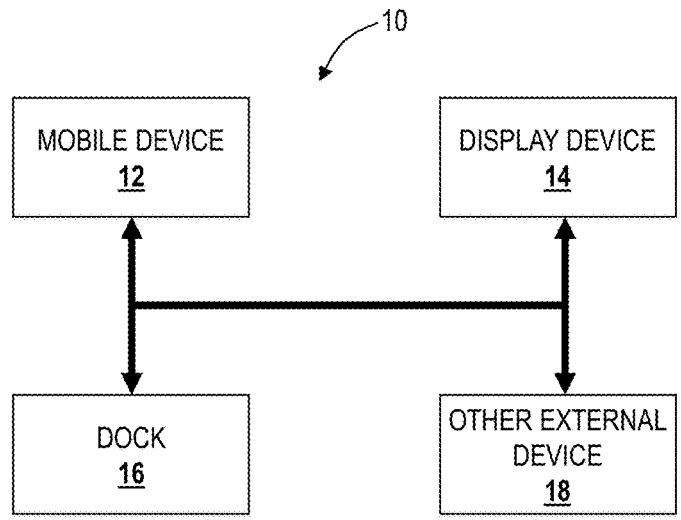
FIG. 1 illustrates a system configured to provide alternative control over a touch-based application being executed on a mobile device.

FIG. 1 illustrates a system 10 to provide alternative control via a mobile device 12. For example, system 10 may be configured to provide non-contact gesture control over the mobile device 12. This may enhance and/or enable the use of the mobile device 12 as a source of visual information for presentation on an external display device 14. In some implementations, the system 10 may include one or more of the mobile device 12, the external display device 14, a dock 16, one or more other external devices 18, and/or other components.

The components of the system 10 may be directly or indirectly connected to one or more of the other system components in one or more different arrangements. For example, the mobile device 12 may be directly connected to the external display device 14. Alternatively, the mobile device 12 and/or the external device 18 may be directly connected to the dock 16, which may then directly connected to the external display device 14, creating an indirect connection between the external display device 14 and the mobile device 12 and/or the external device 18. These connections may be accomplished via wired and/or wireless communication media.

The mobile device 12 may be a wireless communication device that facilitates voice and/or data communications by a user. For example, the mobile device 12 may be configured to facilitate communication via one or more of CDMA, 3G, 4G, LTE, WiFi, WiMAX, and/or other radio frequency communications protocols. The mobile device 12 may be configured to facilitate communication of other types of information via a network. For example, the mobile device 12 may provide access to one or more of email communications, SMS messages, and/or other communications. The mobile device 12 may be configured to send and/or receive information over the Internet and/or other networks. Information communicated over a network may include web pages, information related to dedicated mobile applications (or "apps"), streaming content (e.g., still images, video, text, audio, and/or other content) and/or other information. By way of non-limiting example, the mobile device 12 may include one or more of a Smartphone, a personal digital assistant, a tablet, and/or other wireless, handheld, personal computing platforms. In some implementations, the mobile device 12 may be a device not typically considered to be "mobile", but implementing an operating system generally associated with mobile devices. Such devices may include, for example, a set-top box (e.g., an Android set-top box, and/or other devices).

The external display device 14 may be configured to present visual information to users. By way of non-limiting example, the external display device 14 may include one or more of a television, a projector, a three-dimensional display, a computer monitor, and/or other external display devices. When the mobile device 12 is coupled to the external device 14, the external display device 14 may present content received from the mobile device 12. Such content may include one or more of content received over a network by the mobile device 12 (e.g., streaming content), content generated by one or more applications being executed on the mobile device 12, content stored on the mobile device 12, and/or other content. The content may include audio information, visual information, and/or other information. Although it is not depicted in FIG. 1, the external display device 14 may be a smart television including one or more processors, an image capture device, and/or other components. The inclusion of one or more of such components in the external display device 14 may be implemented to provide some or all of the functionality attributed herein to similar components associated with the mobile device 12, and/or the dock 16.

The dock 16 may be configured to provide a coupling interface between the mobile device 12, the external display device 14, and/or the external device 18. The interface may facilitate communication of information between the mobile device 12, the external display device 14, and/or the external device 18. The dock 16 may be configured to provide power and/or charge the mobile device 12.

The external device 18 may include one or more other devices external to the mobile device 12, the external display device 14, and/or the dock 16. The external device 18 may generate information implemented by one or more of the mobile device 12, the external display device 14, and/or the dock 16, may enhance or enable operation of one or more of the mobile device 12, the external display device 14, and/or the dock 16, and/or may contribute to the operation of the system 10 in other ways. By way of non-limiting example, the external device 18 may include one or more of a web camera, a distance camera, other image capture devices, a light source, a microphone, an infrared sensor, and/or other components.

Figure 2:
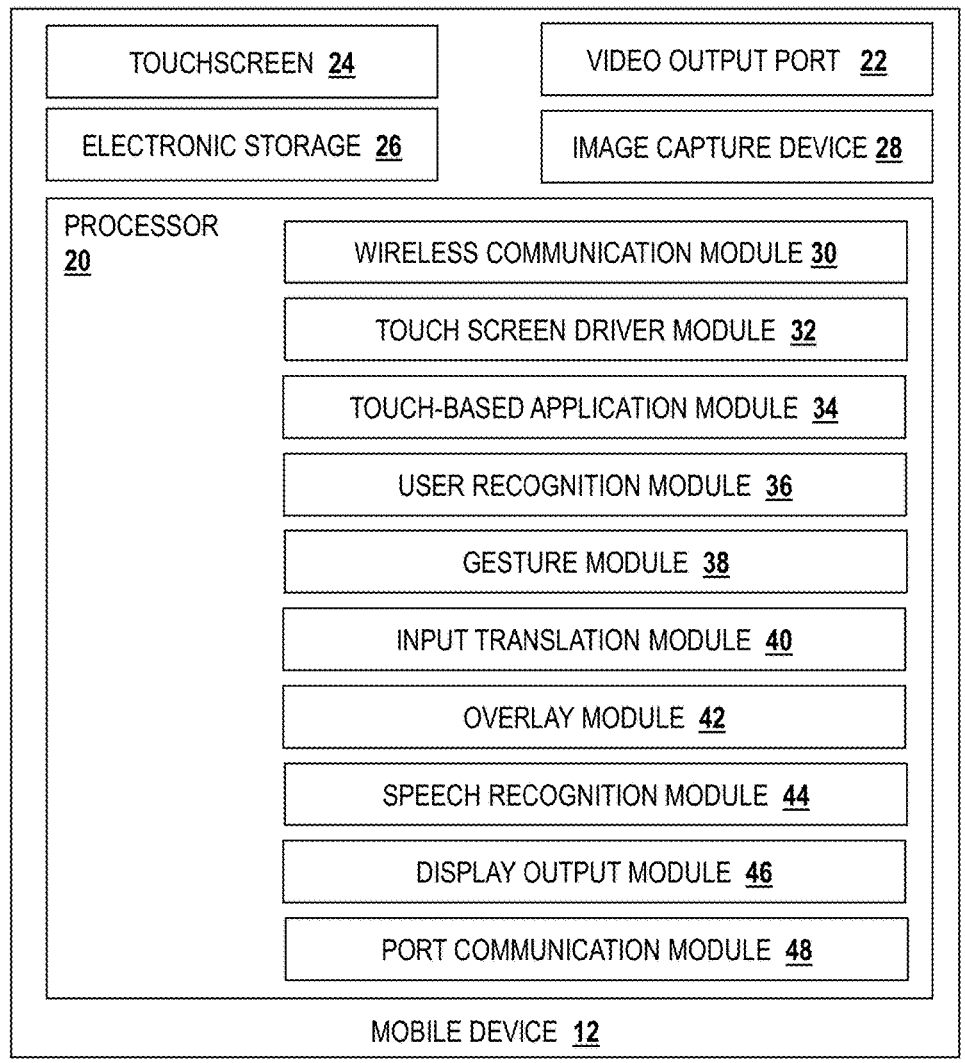
FIG. 2 illustrates a mobile device.

FIG. 2 illustrates an exemplary implementation of the mobile device 12. The mobile device 12 may include one or more of a processor 20, a video output port 22, a touchscreen 24, electronic storage 26, an image capture device 28, and/or other devices.

The processor 20 may execute one or more programmed sequences to accept digital input information, process the digital information according to programmed instructions, output digital results, and/or provide other information processing capabilities. Although FIG. 2 illustrates one processing unit, the functions of the processor 20 may be completed by one or more processing units with overlapping or unique functionality. In some implementations the processor 20 may be made up of one or more of a digital integrated circuit, an analog integrated circuit, an arithmetic logic unit (ALU), a control unit, BUS lines, cache memory, a transistor, a control signal, an instruction set, a register, or other components for processing digital information with the processor 20 or other information processing components located internal or external to the mobile device 12. The processing resources attributed to the processor may be provided virtually by a plurality of servers in a cloud configuration.

The modules executed by the processor 20 in the mobile device 12 may include one or more of a wireless communication module 30, a touchscreen driver module 32, a touch-based application module 34, a user recognition module 36, a gesture module 38, an input translation module 40, an overlay module 42, a speech recognition module 44, a display output module 46, a port connection module 48, and/or other modules. The modules 30, 32, 34, 36, 38, 40, 42, 44, 46, and/or 48 may be implemented in software; hardware; firmware; some combination of software, hardware, and/or firmware; and/or otherwise implemented. It should be appreciated that although the modules 30, 32, 34, 36, 38, 40, 42, 44, 46, and/or 48 are illustrated in FIG. 2 as being co-located within a single processing unit, in implementations in which the processor 20 includes multiple processing units, the modules 30, 32, 34, 36, 38, 40, 42, 44, 46, and/or 48 may be located remotely from the other modules. Further, the description of the functionality provided by the different modules 30, 32, 34, 36, 38, 40, 42, 44, 46, and/or 48 described below is for illustrative purposes, and is not intended to be limiting, as any of the modules 30, 32, 34, 36, 38, 40, 42, 44, 46, and/or 48 may provide more or less functionality than is described. For example, one or more of the modules 30, 32, 34, 36, 38, 40, 42, 44, 46, and/or 48 may be eliminated, and some or all of its functionality may be provided by other ones of the modules 30, 32, 34, 36, 38, 40, 42, 44, 46, and/or 48. As another example, the processor 20 may include one or more additional modules that may perform some or all of the functionality attributed below to one of the modules 30, 32, 34, 36, 38, 40, 42, 44, 46, and/or 48.

The wireless communication module 30 may facilitate wireless information transfer between the mobile device 12 and one or more other devices, networks, etc. The information transferred may include one or more of audio information, video information, and/or other information. The information transferred by the wireless communication module 30 may facilitate real time (or near real time) communications between the user of the mobile device 12 and the user(s) of one or more other devices. The wireless communication module 30 may operate on one or more networks comprising 4G, 3G, WiFi, LTE, and/or other networks. By way of a non-limiting example, the wireless communication module 30 may facilitate communication between the mobile device 12 and the dock 16, or the display device 14, other devices as described in FIG. 1, or other devices on a wireless network outside the system 10.

In some implementations, the touchscreen driver module 32 may be configured to serve as an interface between touchscreen 24 and one or more applications being executed by the processor 20 (e.g., the touch-based application module 34). This may include receiving input from the touchscreen 24 sensors and/or other sensors, devices, or components configured to generate input information from the touchscreen 24, and/or generating command output (e.g., based on the received input information) configured so a user may control an application or other program run on the mobile device 12. Command outputs may be generated by touchscreen the driver module 32 based on input to the mobile device 12 by the user. The touchscreen driver module 32 may be configured to generate command input to the touch-based application module 34 or another module that may be configured to accept input from touchscreen the driver module 32. The touchscreen driver module 32 output may be determined from the touchscreen 24 input signals via touchscreen sensors and/or other touch detection capability that may alter the monitored state of the touchscreen, and/or input signals from another device configured to generate input signals for the touchscreen driver module 32. User touch in one or more simultaneous locations, user gestures, user speech, or other user method of contact or non-contact control may be utilized by the user to change one or more states of the device monitored by one or more touchscreen systems as input information. By way of a non-limiting example, a user gesture may be used in a capacitive system to change the electrical charge at a single location on the touchscreen 24.

In some implementations, the touch-based application module 34 may generate visual information for display to a user. The visual information may be impacted by the inputs generated by the touchscreen driver module 32. For example, the visual information may be representative of, controlled by, determined responsive to, and/or impacted by the inputs in other ways. As such, a user may control, interact with, and/or otherwise manipulate the touch-based application module 34. The inputs to the touch-based application module 34 may include one or more of controls, user-selected settings and/or configuration options, information entry, and/or other inputs. By way of a non-limiting example, the touch-based application module 34 may include one or more of an electronic game, an email application, a web browser, a mobile device operating system, a mobile "app", and/or other applications run on the processor 20 of the mobile device 12.

The user recognition module 36 may be configured to analyze image information generated or captured by the image capture device 28 (and/or other image capture devices). The user recognition module 36 may be configured to perform one or more of recognizing one or more users' spatial position, one or more user body parts (and/or the position of the same), one or more unique user characteristics (e.g., fingerprint, voice, eye color, facial features, and/or other characteristics), or any other identifiable user characteristic user recognition module 36 is programmed to recognize. The output generated by the user recognition module 36 may be implemented as inputs to one or more of the application module 34, the gesture module 38, the overlay module 42, or other modules or devices configured to accept input from the user recognition module 36.

The outputs generated by the user recognition module 36 may indicate one or more user body position parameters, and/or other parameters of one or more users controlling the mobile device 12. The user body parameters indicated in the output of the user recognition module 36 may include one or more of a number of users, identifications of individual users, identified body parts of individual users, information related to pose, and/or other parameters. The body position parameters indicated by the output of the user recognition module 36 for a given user may include one or more of a profile/silhouette parameter, a parameter describing the relative position of two or more body parts (e.g., head, torso, legs, arms, hands, feet, and/or other body parts), a volume or area parameter, and/or other body position parameters. Other parameters indicated by the output of the user recognition module 36 may include one or more of a depth parameter related to the distance of the user from a real or virtual reference plane, a body pose parameter (e.g. parameterizing the pose of a player), a gesture parameter, a location parameter, an orientation parameter, a motion parameter, a rhythm parameter, a timing parameter, a size parameter, and/or other parameters.

In some implementations, the gesture module 38 may identify user gestures performed by users. Identification of a user gesture may be made based on analysis of the output of the user recognition module 36. A gesture may include a bodily motion, a body position, a sound, a body state, a position, and/or other gestures (and/or aspects thereof) made by the user. The gesture module 38 may identify gestures by monitoring the relative motion of key pointers in a three-dimensional coordinate system or other method of tracking spatial movement or sound (e.g., based on the outputs of the user recognition module 36). The gesture module 38 may interpret user gestures via mathematical algorithms comprising three-dimensional model-based algorithms, skeletal-based algorithms, appearance-based algorithms or other algorithms configured to interpret user gestures. By way of a non-limiting example, a user may make a fist, drag the fist through space, and release the fist to select and drag through various screens of a mobile device. Other examples are also contemplated.

In some implementations, the input translation module 40 may be configured to spoof the output of the touchscreen driver module 32 based on the output of one or more of the user recognition module 36, the gesture module 38, and/or other modules. In some implementations, the input translation module 40 may be configured to receive information from the user recognition module 36, the gesture module 38, a module that generates input data without physically touching the touchscreen 24, and/or another component of the mobile device 12 or an external device that may accept contact or non-contact input (e.g. audio recording, picture, video). The input translation module 40 may be configured to accept data from one or more of image the capture device 28, the user recognition module 36, the gesture module 38, or another internal or external module or device that accepts user contact or non-contact input, and then spoof the outputs of the touchscreen driver module 32.

The input translation module 40 may be configured to output information to the touchscreen driver module 32, the application module 34, the overlay module 42 and/or other modules if the module has been configured to receive input from the input translation module 40.

By way of a non-limiting example, a user may gesture in view of the image capture device 28 in a way recognized by the gesture module 38. That gesture may be converted to input information for the input translation module 40 and spoofed so that in conjunction with the overlay module 42 and/or the touch-based application module 34 the user may view his gesture position relative to the displayed content of the touch-based application module 34.

It will be appreciated that the description of output from the gesture module 38 and/or the user recognition module 38 being usable by the touch-based application module 34 after being processed by the input translation module 40 is not intended to be limiting. In some implementations, the application module 34 may be configured to accept input information directly from one or more of the user recognition module 36, the gesture module 38, the input translation module 40, the overlay module 42, or other forms of input, without translation.

In some implementations, the overlay module 42 may be configured to generate overlay content that is to be presented to the user in conjunction with the displayed output of the touch-based application module 34. The overlay content may be superimposed over the displayed output of the touch-based application module 34 to provide guidance to the user controlling and/or interacting with the touch-based application module 34 via visual information captured by the image capture device 28 rather than through the touchscreen 24. In some implementations, the overlay module 42 may be configured to accept the outputs of one or more of the image capture device 28, the user recognition module 36, the gesture module 38, the input translation module 40, or other module or device configured to output information in a way recognized by the overlay module 42. The overlay module 42 may be configured to output information to one or more of the touch-based application module 34, the touchscreen 24, the display device 14 or another internal or external device configured to accept information from the overlay module 42. By way of non-limiting example, the overlay content may convey a user's gesture(s) relative to one or more applications ("apps") arranged on the touchscreen 24 of the mobile device 12 prior to non-contact selection, possibly via a second gesture, of that app for interaction.

Figure 3:
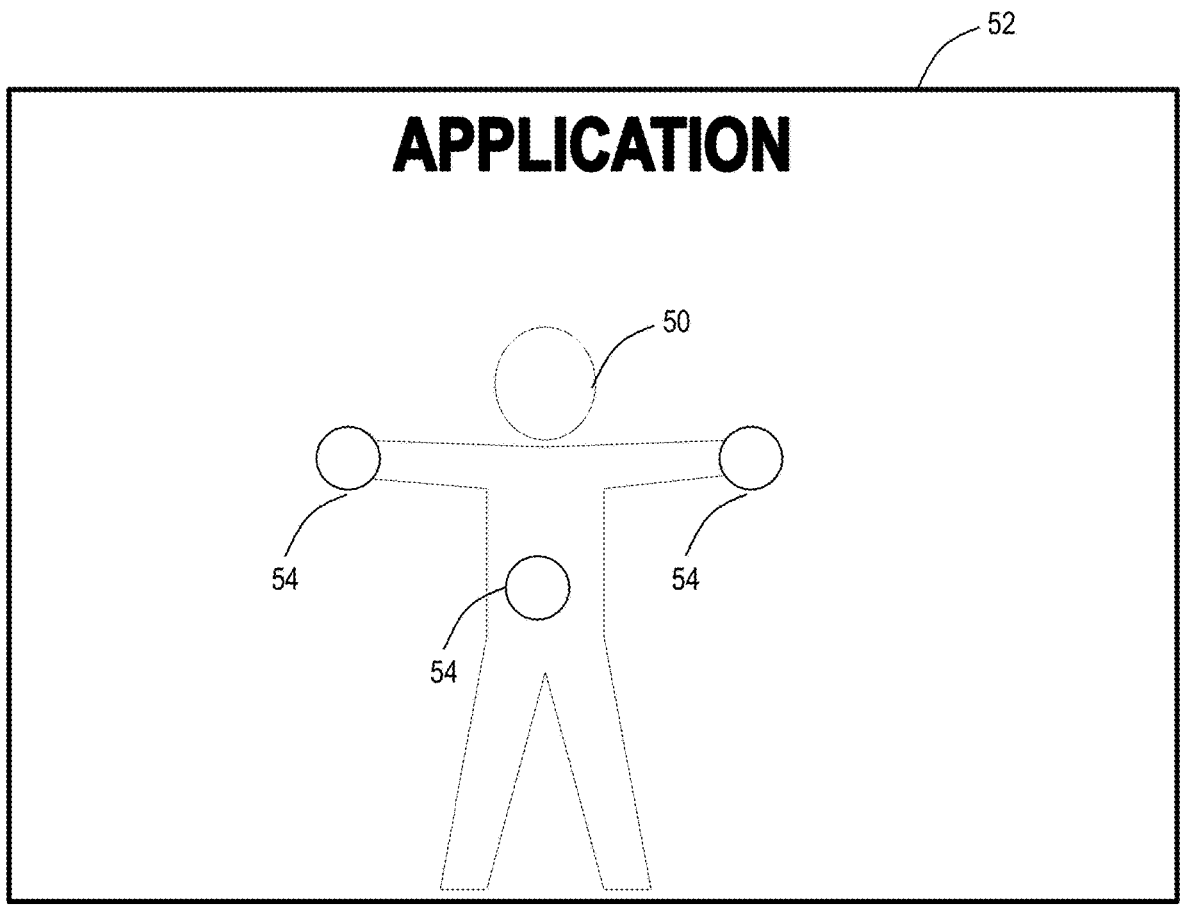
FIG. 3 illustrates an overlay superimposed over application output.

By way of illustration, FIG. 3 depicts a view 52, image information from a touch-based application module (e.g., similar to or the same as the touch-based application module 34 shown in FIG. 2 and described above). In the view 52, a user interface overlay 50 may be visible on the touchscreen 24. The view 52, with the overlay 50 may be presented to the user via an external display device (e.g., the external display device 14 shown in FIG. 1) or another external device (e.g., the other external device(s) 18 shown in FIG. 1). The overlay 50 includes overlay content, such as, for example, one or more of visual content, audio content, tactile content, and/or other content.

The overlay 50 may be configured to be superimposed over visual and/or audio information generated by the touch-based application module, wherein the user interface overlay is determined based on the image information representing the user. The overlay 50 may be configured to represent a current body position of the user. In some implementations, the overlay 50 may be configured to represent body positions of one or more individual user body parts. The overlay 50 may be configured to track and display user gestures (e.g. body position, sounds, movement, touch, or other contact or non-contact gestures) from one or more simultaneous users. The overlay 50 may be depicted as having a body position that corresponds to the body position of the user associated with the overlay representation (e.g., based on body position and/or body position parameters detected by the gesture module 38).

The overlay 50 may be configured to provide real-time visual, audio, tactile, and/or other display information to a user via a display device based on user contact or non-contact gestures. The overlay 50 may be configured to track user gestures (e.g. body position, sounds, movement, touch, or other contact or non-contact gestures) relative to a view of a touch-based application displayed on a display device. The overlay 50 may be configured to allow a user to position a gesture relative to objects in a touch based application to affect intended change within the application displayed on a display device. In some implementations, a user's real-time view of the overlay 50 relative to a touch-based application displayed to the user on a display device may allow the user to interact with the display device in real-time. A user may use the overlay 50 as user feedback relative for controlling a touch-based application via the user's gestures.

By way of a non-limiting example, FIG. 3 displays the overlay 50 as part of a game application displayed on the external display device 14 with a user's individual body parts 54 identified on the overlay 50. In the example, a user may gesture in a way that moves the overlay 50 to a desired position within the view 52 of the game application. The user may use the same and/or another gesture to select and move an object in the application.

As an example, if the game application in FIG. 3 is a chess game application, the user may control pieces of a chess game application by physically moving the user's body position so the overlay 50 is positioned over an individual chess piece, clapping the user's hands to "pick up" the piece within the game application, physically move the user's body through space so that the overlay 50 and the selected chess piece move across the game application chess board as viewed on the display device, and then clap the user's hands a second time to place the chess piece in the new desired location on the chessboard within the game application.

Returning to FIG. 2, the overlay module 42 may enable the creation of customized overlays. Customization of an overlay may include customization of a size, shape, features (e.g., hair, facial features, and/or other features), clothing, props, and/or other aspects of the overlay that are customized. The overlay 50 may include an object or set of objects. The overlay module 42 may manage associations between users that have previously established customized overlays on the mobile device 12. In some implementations, the characteristics of the overlay for a given application may depend on the given application. A customized user overlay may be created for separate types of applications (e.g., a game, an electronic social network site, an operating system). In some implementations, an overlay may be chosen automatically based on underlying parameters of the application (e.g., game genre, game type, game mechanic, control scheme or mechanism, and/or others). In some implementations, the application may designate one or more of the characteristics of the overlay to be applied. In some implementations, a user may select the overlay (or the overlay may be determined based on the application and pre-set user preferences).

The speech recognition module 44 may be configured to generate input control information so the mobile device 12 and/or applications run on the mobile device 12 may be controlled, at least in part, with voice or other audible commands. In some implementations, a user may dictate into a speech recognition engine. In some implementations transformation algorithms, synchronization algorithms, or other speech recognition module 44 programming may convert speech to text, and/or text to a command signal(s) and/or speech straight to command signal(s). The speech recognition module 44 algorithms may be statistically based or non-statistically based algorithms. The speech recognition module 44 algorithms may comprise one or more of acoustic modeling, language modeling, and/or other speech recognition algorithm modeling. In some implementations, the speech recognition module 44 may generate input information for the overlay module 42 or input information for the touch-based application module 34 directly.

The display output module 46 may output information generated by the processor 20. The display output module 46 may be configured to output video audio information, tactile information, and/or other output information for presentation to a user via the port connection module 48 to the touchscreen 24 of the mobile device 12, an external display device (e.g., the external display device 14 shown in FIG. 1) or another external device (e.g., the other external device(s) 18 shown in FIG. 1). The information may include, for example, the output of the touch-based application module 34, the overlay content generated by the overlay module 42, and/or other information and/or content.

The port connection module 48 may receive input from the display output module 46 and generate command output information via a signal or other method to the video output port 22, touchscreen 24, or other information output port or display. Port connection module 48 may function as an input or output transmission interface to transfer visual and or audio information.

The remaining components of the mobile device 12 shown in FIG. 2 include the video output port 22, the touchscreen 24, the electronic storage 26, and the image capture device 28.

The video output port 22 may be configured to output video audio information, tactile information, and/or other output information from the mobile device 12 for presentation to a user on an external display device (e.g., the external display device 14 shown in FIG. 1) or another external device (e.g., the other external device(s) 18 shown in FIG. 1). In some implementations, buttons or menus on the mobile device 12 (e.g., presented via the touchscreen 24, included on the mobile device 12 itself, and/or provided to the user in other ways) may allow a user to select output content and/or output format. By way of a non-limiting example, the mobile device 12 may be configured to facilitate video or audio information transfer via one or more of a radio frequency coaxial cable, composite video, SCART, component video, D-Terminal, VGA, sVideo, HDMI, MHL, a wired network connection, a wireless network connection, and/or other video communications formats. The video output port 22 may utilize one or more of a decoder, an encoder, a connecting port, a USB port, and/or other connecting hardware to output video and or audio information.

The touchscreen 24 may be configured to provide an interface to the mobile device 12 through which the user inputs information to and/or receives information from the mobile device 12. Through an electronic display capability of the touchscreen 24, graphics, text, and/or other visual content may be presented to the user. Superimposed over some and/or all of the electronic display of the touchscreen 24, the touchscreen 24 may include one or more sensors configured to generate output signals that indicate a position of one or more objects that are in contact with and/or proximate to the surface of the touchscreen 24. The sensor(s) of the touchscreen 24 may include one or more of a resistive, a capacitive, surface acoustic wave, or other sensors. In some implementations the touchscreen 24 may comprise one or more of a glass panel, a conductive layer, a resistive layer, a scratch resistant layer, a layer that stores electrical charge, a transducer, a reflector or other components.

In some implementations, the electronic storage 26 may comprise electronic storage media that electronically stores information. The electronically stored media of the electronic storage 26 may include one or both of system storage that is provided integrally (e.g., substantially non-removable) with the mobile device 12 and/or removable storage that is removably connectable to the mobile device 12 via, for example, a port (e.g., a USB port, a firewire port, etc.) or a drive (e.g., a disk drive, etc.). The electronic storage 26 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 26 may store software algorithms, information determined by other components of the mobile device 12, and/or other information that enables the mobile device 12 to function properly. The electronic storage 26 may include one or more separate components within the mobile device 12. The electronic storage 26 may include one or more components provided integrally with one or more other components of the mobile device 12 (e.g., the processor 20).

The image capture device 28 may be configured to capture visual information from an area around the mobile device 12. The image capture device 28 may generate one or more output signals that represent the captured visual information. The output signals may be generated by one or more photosensitive sensors and/or sensor arrays. Such sensors may include, without limitation, a CCD chip, a CMOS chip, and/or other photosensitive sensors. The electromagnetic radiation may be directed to the sensor(s) by one or more optical elements. Such elements may include one or more reflective elements, refractive elements, and/or other optical elements. The image capture device 28 may capture video, still images, and/or other visual information. The image capture device 28 may capture visual information at rates sufficient to allow a user to interact in real time with the mobile device 12. The image capture device 28 may include one or more of a web camera, a distance camera, a microscope, a stereoscope, a stereo camera, a depth aware camera, an RGB camera, an infrared camera, other cameras, or other visual information capturing devices. The image capture device 28 may include one or more light emitting elements. The image capture device 28 may include one or more depth sensors. The image capture device 28 may be internal or external to the mobile device 12. If external to the mobile device 12, the image capture device 28 may be connected to mobile device 12 through USB, Bluetooth, or other external connections that properly transmit visual information.

The image capture device 28 may be capable of capturing visual information from a plurality of locations on the mobile device 12. For example, to enable three-dimensional imaging, the image capture device 28 may be configured to capture stereoscopic images. As another example, the image capture device 28 may be configured to capture images on from both the front and the back of the mobile device 12 (e.g., to enable videoconferencing). In such implementations, the visual information may be captured by a single imaging sensor and/or separate imaging sensors included in the image capture device 28.

Figure 4:
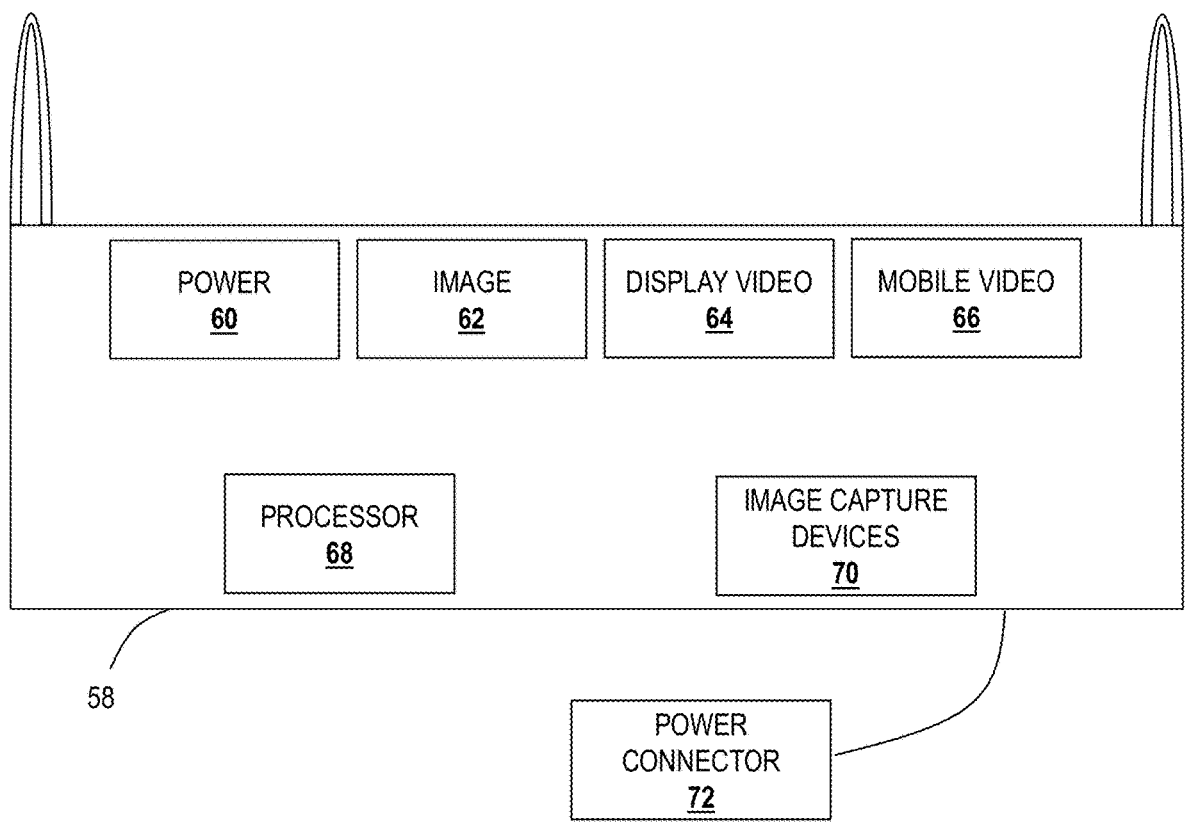
FIG. 4 illustrates a dock for a mobile device.

FIG. 4 illustrates one or more implementations of the mobile dock 16. In some implementations, the dock 16 may be configured to connect a mobile device (e.g. the mobile device 12) with an external display device (e.g. the external display device 14). As can be seen in FIG. 4, the dock 16 may include one or more of a device seat 56, a housing 58, a power provision port 60, an image information port 62, a display device video port 64, a mobile device video port 66, a processor 68, an image capture device 70, a power supply connector 72, and/or other devices.

The device seat 56 may be configured to mechanically hold and support a mobile device or other devices in place on a docking station. The housing 58 may be configured to contain components of the dock 16 and/or other components as a unit. The image capture device 70 may be configured to capture image information representing a user or other image information. The image information port 62 may be configured to couple the image capture device 70 to a mobile device (e.g. the mobile device 12) to facilitate the transfer of image information from the image capture device 70 to a mobile device. The mobile device video port 66 and/or the display device video port 64 may be configured to couple a mobile device with an external display device to facilitate the communication of visual information from a mobile device to an external display device for display on an external display device.

The processor 68 may execute one or more programmed sequences to accept digital input information, process the digital information according to programmed instructions, output digital results, and/or provide other information processing capabilities. Although FIG. 4 illustrates one processing unit, the functions of the processor 68 may be completed by one or more processing units with overlapping or unique functionality. In some implementations, the processor 68 may be made up of one or more of a digital integrated circuit, an analog integrated circuit, an arithmetic logic unit (ALU), a control unit, BUS lines, cache memory, a transistor, a control signal, an instruction set, a register, or other components for processing digital information with the processor 68 or other information processing components located internal or external to the dock 16. The processing resources attributed to the processor may be provided virtually by a plurality of servers in a cloud configuration. The processor 68 may be configured to execute one or more of the modules shown in FIG. 2.

The power supply connector 72 may be configured to removably connect to one or more external power supplies. The power provision port 60 and/or the power supply connector 72 may be configured to couple a mobile device to one or more external power supplies to facilitate the provision of power from one or more external power supplies to the mobile device and/or other devices.

The dock 16 image information may comprise one or more of video image, still images, intensity images, depth images, or other image information.

Figure 5:
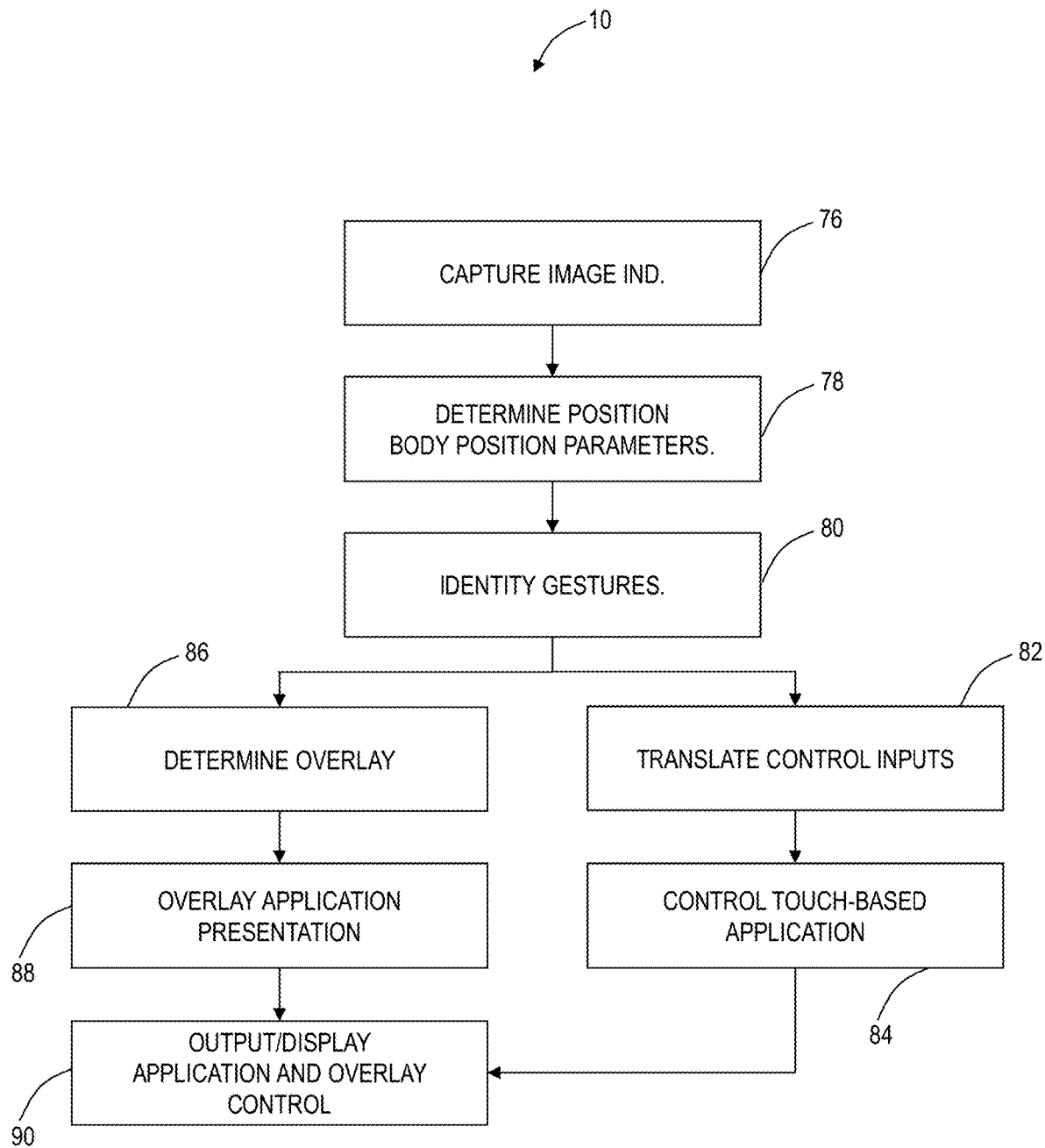
FIG. 5 illustrates a method of providing alternative control over a touch-based application.

FIG. 5 illustrates a method 74 of controlling a touch-based application being executed on a mobile device with computer vision. The operations of the method 74 presented herein are intended to be illustrative. In some embodiments, the method 74 may be accomplished with one or more additional operations not described, and/or without one or more of the operations discussed. Additionally, the order in which the operations of the method 74 are illustrated in FIG. 5 and described below is not intended to be limiting.

In some embodiments, the method 74 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 74 in response to instructions stored electronically on an electronic storage medium. The one or more processing devices may include one or more devices configured through hardware, firmware, and/or software to be specifically designed for execution of one or more of the operations of the method 74.

At an operation 76, image information may be captured. The image information may include one or more of RGB information, depth information, and/or other information associated with images. The image information may include video information and/or still image information. The image information may be generated by an image capture device associated with the mobile device (e.g., the image capture device 28 shown in FIG. 2 and described above), an image capture device associated with a dock for the mobile device (e.g., the image capture device 70 shown in FIG. 4 and described above), an image capture device associated with a display device (e.g., the display device 16 shown in FIG. 1 and described above), a separate image capture device (e.g., a webcam, a depth camera, and/or other image capture devices), and/or other image capture devices.

At an operation 78, information related to the position and/or the body position of the user may be determined. Such information may be determined from the image information captured at the operation 76. Such information may include one or more parameters related to the position and/or the body position of the user. In some implementations, the operation 78 may be performed by a user recognition module the same as or similar to the user recognition module 36 (shown in FIG. 2 and described herein).

At an operation 80, one or more gestures performed by the user may be identified. The identification of the gestures may be performed based on the image information captured at the operation 76, the information related to position and/or body position captured at the operation 78, and/or other information. In some implementations, the operation 80 may be performed by as gesture module the same as or similar to the gesture module 38 (shown in FIG. 2 and described herein).

At an operation 82, the position, body position, and/or gestures of the user may be translated into control inputs to the touch-based application. This translation may spoof control inputs typically generated for the touch-based application by one or more touch-based sensors associated with a touchscreen, a touchpad, and/or other touch-based control interfaces. The control inputs may control operation of the touch-based application. In some implementations, the operation 82 may be performed by an input translation module the same as or similar to the input translation module 40 (shown in FIG. 2 and described herein).

At an operation 84, the touch-based application may be controlled by the control inputs generated at the operation 82. In some implementations, the operation 84 may be performed by a touch-based application module the same as or similar to the touch-based application module 34 (shown in FIG. 2 and described herein).

At an operation 86, overlay content associated with an overlay to be presented with the touch-based application may be determined. The overlay content may include visual information, audio information, tactile information, and/or other information configured to provide the user with feedback related to position, body position, gestures, and/or other control information. The operation 86 may include determining one or more characteristics of the overlay content that are independent of a current position, body position, and/or gesture. Such characteristics may include, for example, a size, a shape, a relative volume, a shade or color, and/or other characteristics. Such characteristics may be determined based on a user selection and/or user configured settings, an application type or genre, and/or based on other information. In some implementations, the operation 86 may be performed by an overlay module the same as or similar to the overlay module 42 (shown in FIG. 2 and described herein).

At an operation 88, the overlay content determined at the operation 86 may be superimposed on output from the touch-based application. In some implementations, operation 86 may be performed by an output module the same as or similar to the output module 48 (shown in FIG. 2 and described herein).

At an operation 90, the output from the touch-based application and the overlay content may be presented to the user. This may include outputting the output from the application and the overlay content to a display device and/or actually displaying the output from the application and the overlay content. In some implementations, the operation 90 may be performed by an output module and/or a display device the same as or similar to the output module 48 (shown in FIG. 2 and described herein) and/or the display device 16 (shown in FIG. 1 and described herein).

Figure 6:
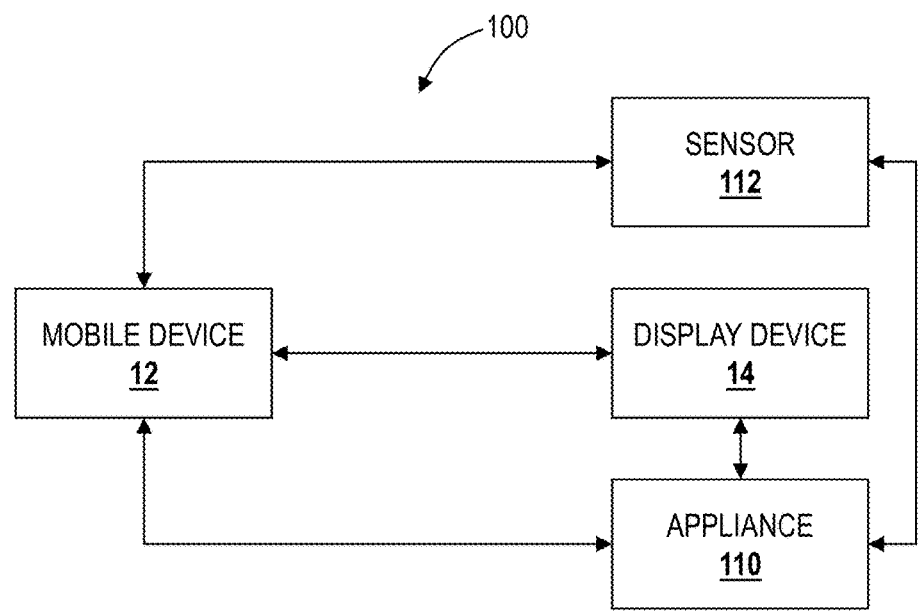
FIG. 6 illustrates a block diagram of an exemplary system for alternative control of a mobile device.
Figure 7:
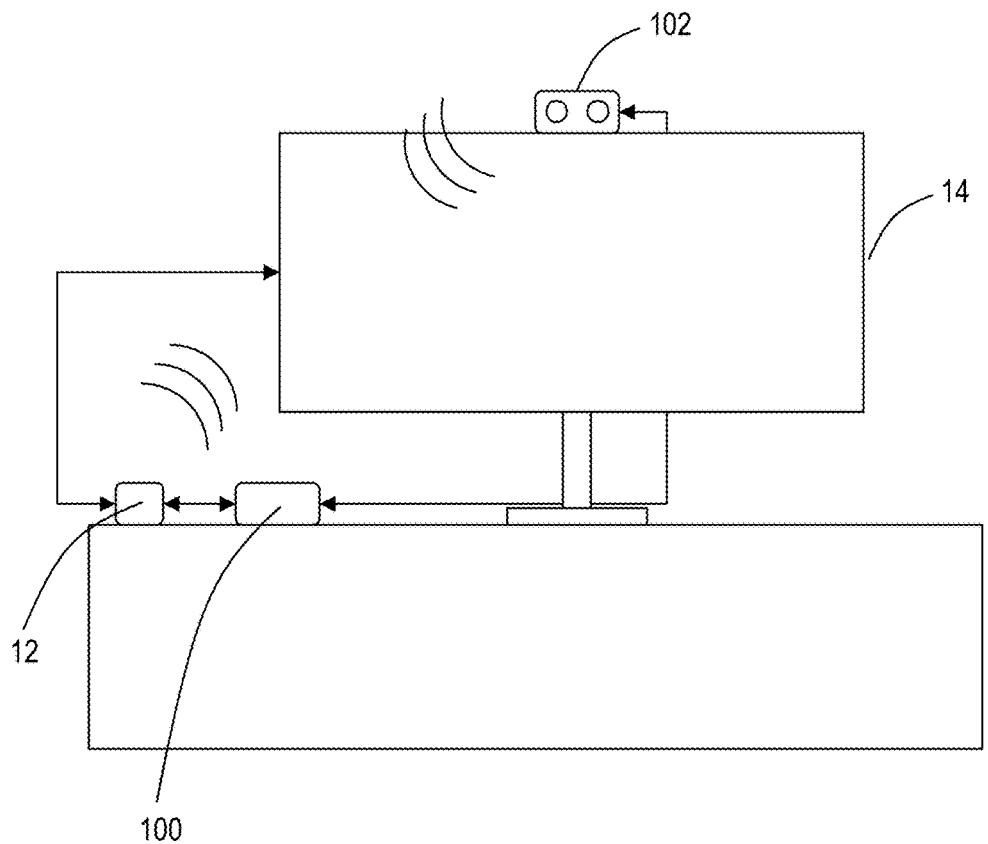
FIG. 7 illustrates a front perspective view of an exemplary system for alternative control of a mobile device.

FIG. 6 is a block diagram and FIG. 7 is a front perspective view of an exemplary system 100 for alternative control of a mobile device 12. The system 100 can include similar components and/or functionality as the system 10. The system 100 includes the mobile device 12, the display device 14, an appliance 110, and a sensor 112. The mobile device 12 can include, without limitation, a smart phone, a tablet, a net book, an ultra-book, a laptop, etc. that is configured for touch-based control. The mobile device 12 can operate, without limitation, iOS from Apple, Android or Chrome from Google, Windows from Microsoft, or the like. The display device 14 can be an external display communicatively coupled to the mobile device 12 for displaying apps from the mobile device 12. For example, the display device 14 can include, without limitation, a television, a projector, a monitor, or the like.

The appliance 110 can be a computer or the like configured to interface between the mobile device 14 and the sensor 112 for enabling alternative control of the touch-based, mobile device 14. The sensor 112 can include a depth camera configured to detect motion of a user for gesture control in lieu of touch-based control of the mobile device 14. For example, the sensor 112 can be an off-the-shelf component such as an ASUS Xtion or Microsoft Kinect. The sensor 112 can use a USB or Bluetooth connection to the appliance 110. In the context of system development, the sensor 112 is expected to be the most expensive hardware component. Note, users typically already have the mobile device 12 and the display device 14 and possibly the sensor 112 (e.g., for a gaming platform such as the Xbox from Microsoft). If the sensor 112 is already present, the sensor 112 can be connected to the appliance 110 via a Y-cable or through a USB hub or through a shared Bluetooth connection.

The appliance 110 and/or the mobile device 12 is configured to provide various functionality associated with the modules 30, 32, 34, 36, 38, 40, 42, 44, 46, and/or 48. That is, the functionality described in the system 10 can be performed in the various components of the system 100. For example, the appliance 110 can be a computer vision processor, and the screen recognition can be performed via the mobile device 12. The appliance 110 is configured, generally, to translate gestures from the sensor 112 to touch-based inputs to the mobile device 12 for control thereof. The appliance 110 is a mini-computer and can be based on an ARM processor operating Linux such as the Raspberry Pi, Beagle Bone Black, etc. Alternatively, the appliance 110 can be an ADAPT ES1 device from LS Research, a Snapdragon S4 mobile device originally designed for DARPA. The ADAPT ES1 is similar to a Samsung Galaxy S3 but lacks a display and touchscreen. The ADAPT ES1 is powerful enough to act as both (a) an accessory device to another phone or tablet, i.e. the mobile device 12, and (b) a set top box entertainment device capable of playing games like Need for Speed or streaming Netflix or Amazon Instant Video to the display device 14. For example, the appliance 110 can both be an interface to the mobile device 12 for translating gestures to control apps on the mobile device 12 as well as a set top box for providing content to the display device 14 such as via Over-the-Top (OTT) content providers. Advantageously, the system 100 contemplates using the TV, i.e. the display device 14, for display of content from the mobile device 12 and in-air gestures used to control the mobile device 12.

The system 100 can include various options for connectivity between the components 12, 14, 100, 102. First, the mobile device 12 can be directly connected to the display device 14 for providing video thereto. Alternatively, the mobile device 12 can be connected to the appliance 110, and the appliance 110 can be connected to the display device 14 for providing video thereto from the mobile device 12. The sensor 112 can be connected either to the mobile device 12 directly or through the appliance 110. All of the connections can be either wired or wireless as is known in the art.

The system 100 enhances TV-connected mobile gaming by enabling a wide range of individual and group gestures to seamlessly work with the mobile device 12. Player movements can include (a) in-air hand gestures, (b) leaning, (c) discrete and recognizable gestures such as jumping, crouching, arm raising and (d) non-discrete general movement by a crowd of varying size versus stillness, and the like. This variety of motion-based control is map-able to a massive library of existing mobile games on a game-by-game and even screen-by-screen basis without modifying any original application source code. This makes operations by virtually touching and tilting the mobile device 12. For example, the user extends a hand towards the display device 14 which has the sensor 112 on top of it or near it and a hand cursor appear on the the display device 14. General touchscreen interaction is replaced by moving the cursor with an open hand and "touching down" on the touchscreen by closing the outstretched hand. This enables general touch replacement using gestures. Likewise, the user may lean left and right to virtually tilt the device, enabling general tilt replacement.

The system 100 can also include Gesture Control Services which enhance usability by recognizing the context of an app. This includes an innovative software layer which can be used to make it more fun to play games like Angry Birds using gestures than with general cursor movement and touch replacement. The system 100 offers an intelligent vision-based control system that is deeply integrated into the mobile device 12 as a software patch or app that adapts to the changing needs of app control. By intelligence, the system can recognize the currently visible app and in-app context via machine-learned models of application usage. To be more specific, the system 100 can include two concrete examples of switching and blending.

The system 100 includes automatic switching between computer vision algorithms. For example, in racing games such as Need for Speed, the system 100 can map an aggregate lean angle estimate to the game's steering function, which is natural and fun. But there are moments of interaction, such as menu screen navigation and level selection, which may be better suited for hand tracking-based control. Upon level completion, the player is prompted with a menu. The system 100 can recognize that the user is prompted with a menu and instantly switch from leaning to hand tracking for menu control. If the player makes a selection to begin a new level, the system 100 switches hand tracking off and leaning back on. Or if the player quits the game to launch another app, the system 100 keeps hand tracking engaged for the purpose of selecting an app from the mobile device 12. The system 100 is able to do this by monitoring multiple sources of information and comparing them to previously collected training data in real-time.

The system 100 includes blending vision-based controllers. For example, Temple Run is an example of a game that employs both the accelerometer and touchscreen in a clever fashion. The player runs through an Indiana Jones-like environment to collect coins while avoiding obstacles and falling off a track. Swiping up makes the player jump to avoid gaps or enemies, swiping down is used for crouching under tree branches and left-right swipes turn the player to avoid running off the track at a T junction. While swiping, the player may tilt the smartphone or tablet to slide from side to side across the track to collect coins. Upon recognizing that Temple Run has been launched, the system 100 engages leaning and discrete gesture recognition capabilities; leaning is mapped to sliding from side to side, pointing to the left and right results in turning 90 degrees to stay on track and jumping and crouching in front of the display device 14 is mapped to swipes up and down on the touchscreen. Those of ordinary skill in the art will recognize these mappings can be different for a variety of different apps on the mobile device 12.

Advantageously, the system 100 includes deep integration with the operating system of the mobile device 12, e.g. Android. In this manner, the system 100 seeks to avoid requiring the app developer to provide the translation mapping between touch-based and gesture-based control. The system 100 is tailored for both (a) carriers and OEMs wishing to bring a universal gesture control solution to their customers and (b) software developers interested in making first party gesture-based apps. One aspect of the system 100 is to avoid solely focusing on mapping hand tracking to general touchscreen control. The system 100 also includes leaning gestures or the like for accelerometer control as well. Games like Need for Speed and Temple Run are unlikely to be fun to play with hand tracking alone.

The system 100 leverages the vast library of apps for the mobile device 12 and the ability to couple the mobile device 12 to the display device 14 and the sensor 102 for gesture control. In this manner, the system 100 can bring the mobile device 12 into the living room. For example, OTT content providers are proliferating, and the system 100 can be used to watch and control content on the display device 14 in addition to playing all of the touch-based games.

Figure 8:
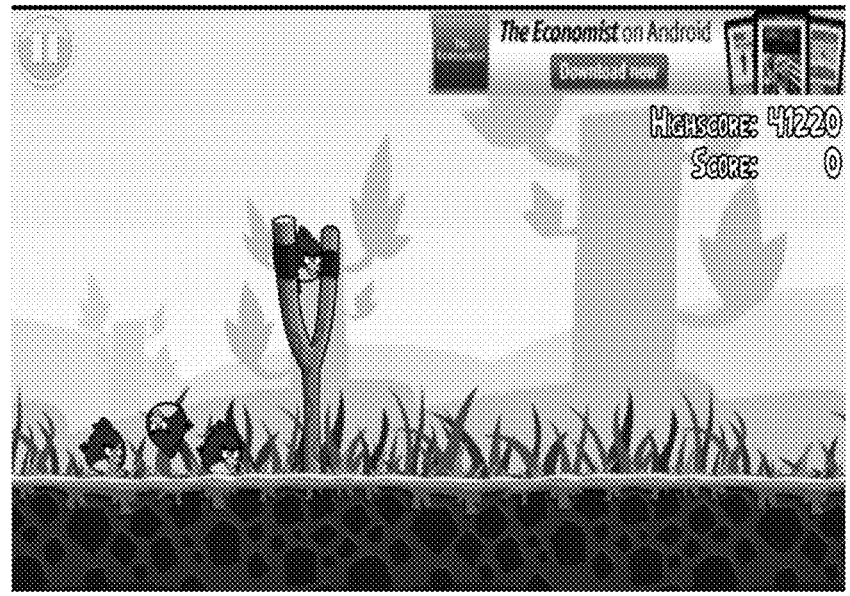
FIG. 8 illustrates screenshots of the Angry Birds app to illustrate a Gesture Assist function.
Figure 8:
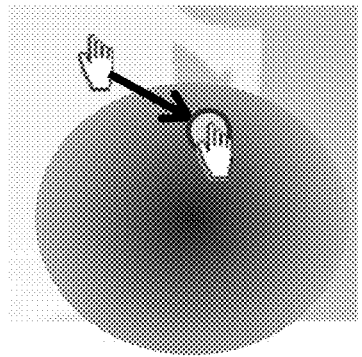
Figure 8:
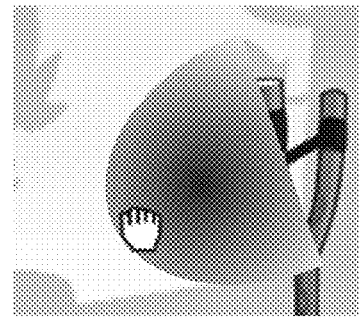

The system 100 can apply computer vision in two ways—vision for gesture tracking and vision on screenshots in the cloud. In the vision for gesture tracking, the sensor 102 is configured to track and recognize user gestures in real-time. This can include hand gestures, leaning, running in place, movement, etc. In the vision on screenshots in the cloud, the system 100 includes a user behavior module learned offline in the cloud to support a Gesture Assist function. For example, the appliance 110 can be connected to one or more servers in the cloud to report usage, etc. FIG. 8 illustrates screenshots of the Angry Birds app to illustrate the Gesture Assist function. As an input, recordings of touches and screenshots serve as training data to the Gesture Assist function. An output of the Gesture Assist function includes a user model to predict the most likely interaction per screenshot. For example, a "snap to" where a cursor enters a region of interest and is snapped to an anchor or a "drag region" which translate large hand movements into bounded, fine grained cursor movements when dragging objects.

The Gesture Assist function can provide assistance in various increments to users, such as easy, medium, and hard. The Gesture Assist function can provide game play assistance such as for younger players, e.g. toddlers, and the like with the easy setting. The medium setting can provide some assistance to bound user movement to game play whereas the hard setting can provide little to no assistance. The Gesture Assist function is an Intelligent Control System designed to leverage both kinds of computer vision (on Hands, Screenshots) and can use a Bayesian Control System to compute a most likely target given current depth and screenshot and state at previous frame.

Figure 9:
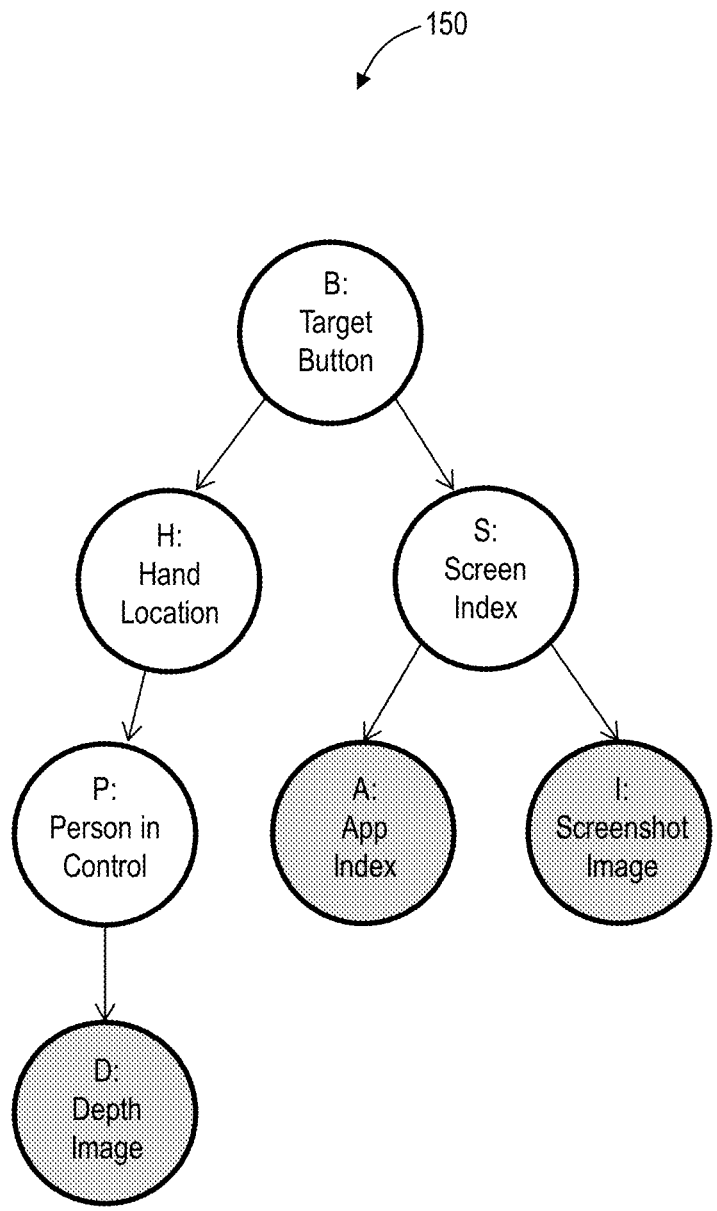
FIG. 9 illustrates a graphical model for a control system in the Gesture Assist function.

FIG. 9 illustrates a graphical model 150 for a control system in the Gesture Assist function. The graphical model 150 includes the following random variables:

| Random Variable | Description |
| --- | --- |
| B: Target Button (hidden state) | Current cursor location on TV, lined up with the intended button to press. Cursor moves as hand moves |
| H: Hand Location (hidden state) | Current hand location in face-centered coordinate system |
| S: Screen Index (hidden state) | Index of screenshot (e.g. menu screen for Angry Birds) |
| P: Person in Control (hidden state) | Region of interest (box) in depth image indicating who is in control, which defines face-centered coordinate system |
| A: App Index (observed state) | Number that identifies the running application (e.g. APK id) |
| I: Screenshot Image (observed state) | Current screenshot (color image) |
| D: Depth Image (observed state) | Current depth image (grayscale) |

The gray circles, A, I, and D, in FIG. 9, show pieces of information observable at runtime when someone is using the mobile device 12 with the system 100. The white circles are unobserved variables. These are basically the outputs of variable computer vision modules, such as described in FIG. 2. For example, "S: Screen Index" is a screenshot recognition module. A screenshot may be recognized by applying image recognition techniques, such as "Scalable Recognition Using Vocabulary Trees" to an input that is an actual screenshot of a game running on the mobile device 12. But it can be expensive to take screenshots and process them with image recognition techniques in real-time. To address the computational expense, the system 100 uses a new technique for recognizing the screen of an app by inspecting an OpenGL command stream, or set of commands that were used to tell the graphics hardware (GPU) to draw the particular screen in a game. For example, the system 100 can count the number of times it sees a particular command. It is a frequency table of OpenGL commands, otherwise known as a term frequency feature. This is how the system 100 can estimate button locations for a given screen. The term frequency feature is used to recognize a screen in a game. Following recognition, previously recorded interactions (e.g. touches) are registered to the screen recognized at runtime. This registration or alignment of touch points may be used to infer button locations by clustering the observed touch locations. This assumes enough training data has been captured to record the touches of all touchable regions.

Figure 10:
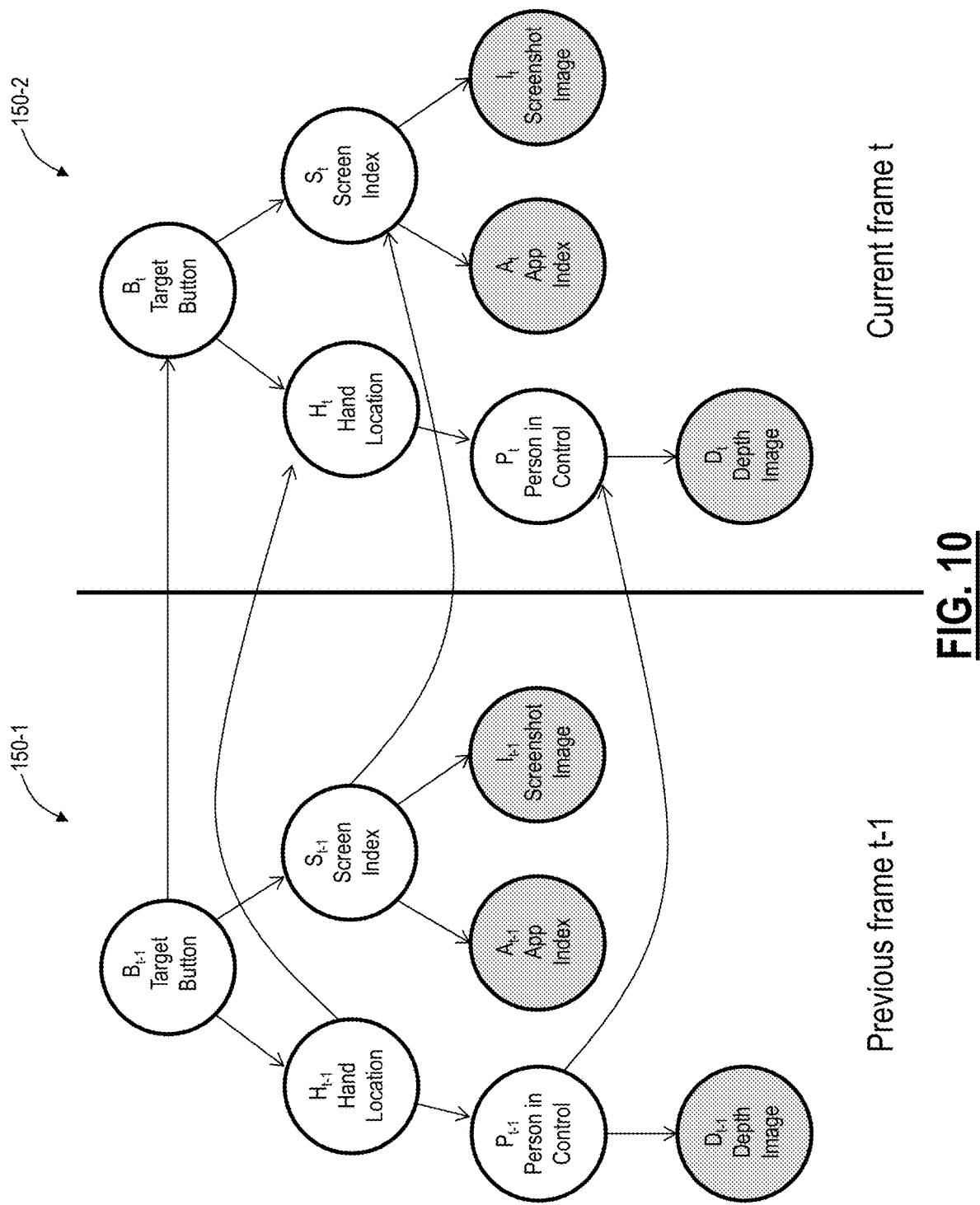
FIG. 10 illustrates a hidden Markov model for modeling interactions over time between a previous frame and a current frame.

FIG. 10 is a hidden Markov model for modeling interactions over time between a previous frame with a graphical model 150-1 and a current frame with a graphical model 150-2. The goal is to compute most likely target button given observed data (gray shaded—variables D, A, and I) and state at previous frame. An on-screen cursor location at frame t given by: Cursor location at previous frame (t−1), Hand location at previous frame, Screen index at previous frame, Current depth image, Current app index, and Current screenshot. The task is to find the parameters of the target button which maximize the target button probability conditioned on current observations and previous state—argmax $P(B_t|B_{t-1}, H_{t-1}, S_{t-1}, D_t, A_t, I_t)$.

The following describe exemplary solutions to sub-problems of the control inference problem. For the hand location, H, P(H|D,P) can be based on a novel hand pose recognition algorithm using random fern for shape regression on depth. The input can be depth image and the output can be face (x,y), hand (x,y), hand pose (open or closed). For person in control, P, P(P|D) can be based on a novel face detector using CoBE on depth with the input being depth image and the output being face boxes. For screen index, S, P(S|A,I) can be based on a screenshot recognition using a per-app vocabulary tree such as described in D. Nister and H. Stewenius, "Scalable Recognition with a Vocabulary Tree," Conference on Computer Vision and Pattern Recognition, 2006. For the button target, B, P(B|H,S) can be based on a button recognition technique using a novel technique inspired by panorama annotation transfer technique such as described in Ozuysal et. al., "Fast Keypoint Recognition using Random Ferns", PAMI 2010.

From this, the Gesture Assist function can compute argmax $P(B_t|\text{all observations,HMM params})$. The Estimated screen index enables alignment of training data to current screen. The training data contains recorded touch points per screen. The transition probability table is learned from touch sequences in training data. The Gesture Assist function can use Viterbi algorithm to compute optimal button location. The hand location's influence on selected button can be governed by Gesture Assist level, e.g. hard level: human is in full control to easy level: computer is mostly in control.

Figure 11:
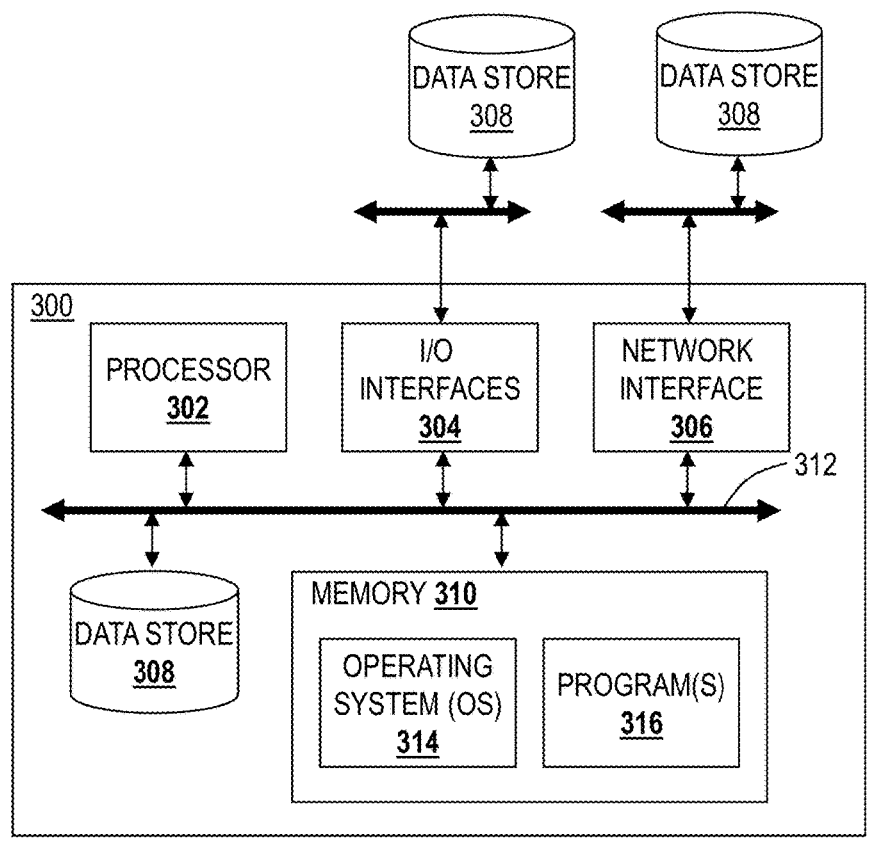
FIG. 11 illustrates a block diagram of a server which may be used in the systems and methods described herein.

FIG. 11 is a block diagram of an exemplary server 300. The server 300 may form the basis for the appliance 110. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 11 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications.

Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, a wide area network (WAN), a local area network (LAN), and the like, etc. The network interface 306 may include, for example, an Ethernet card or adapter (e.g., 10BaseT, Fast Ethernet, Gigabit Ethernet, 10GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

Figure 12:
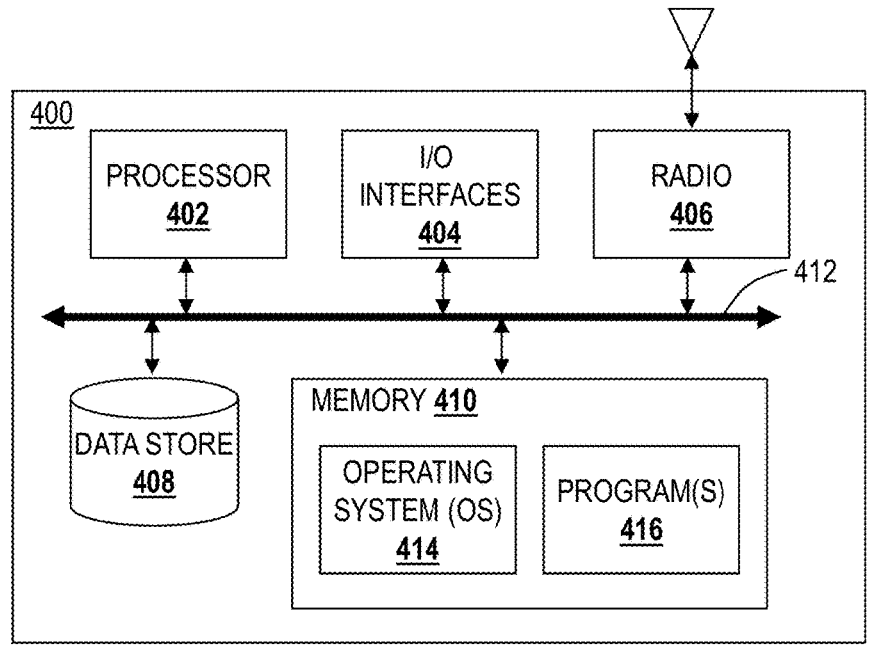
FIG. 12 illustrates a block diagram of a mobile device which may be used in the systems and methods described herein.

FIG. 12 is a block diagram of another exemplary implementation of a mobile device 400 which can be used for the mobile device 12. The mobile device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 12 depicts the mobile device 410 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the mobile device 410, a semiconductor-based microprocessor (in the form of a microchip or chip set), or generally any device for executing software instructions. When the mobile device 410 is in operation, the processor 402 is configured to execute software stored within the memory 410, to communicate data to and from the memory 410, and to generally control operations of the mobile device 410 pursuant to the software instructions. In an exemplary embodiment, the processor 402 may include a mobile optimized processor such as optimized for power consumption and mobile applications. The I/O interfaces 404 can be used to receive user input and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the mobile device 410. Additionally, the I/O interfaces 404 may further include an imaging device, i.e. camera, video camera, etc.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 12, the software in the memory 410 includes a suitable operating system (O/S) 414 and programs 416. The operating system 414 essentially controls the execution of other computer programs, and provides scheduling, input-output control, file and data management, memory management, and communication control and related services. The programs 416 may include various applications, add-ons, etc. configured to provide end user functionality with the mobile device 400. For example, exemplary programs 416 may include, but not limited to, a web browser, social networking applications, streaming media applications, games, mapping and location applications, electronic mail applications, financial applications, and the like. In a typical example, the end user typically uses one or more of the programs 416 along with a network such as the system 100.

One aspect of the disclosure relates to a system and method of controlling a touch-based application. Such applications may be controlled via a touch-sensitive user interfaced on, for example, a mobile device. The system and/or method may provide for alternate control of the touch-based application via computer vision. This may facilitate gesture and/or image-based control of the touch-based application by the user. Such alternative control may enhance user experience if the output of the mobile device is being presented to the user via an external display device (e.g., a television). For example, the user may control the same touch-based applications on the mobile device controlled via touch during regular use from a distance (e.g., a viewing distance to the television, and/or other distances).

The mobile device may include a touchscreen, a video output port, a processor, and/or other components. The processor may be configured to execute one or more of a touchscreen driver module, a touch-based application module, a user recognition module, a gesture module, an input translation module, an overlay module, a display output module, and/or other modules.

The touchscreen driver module may be configured to receive output signals from the touchscreen. Based on the received output signals, the touchscreen driver module may be configured to generate command inputs that correspond to the received output signals.

The touch-based application module may be configured to generate visual information for display to the user via the touchscreen. The visual information may be accompanied by other sensory information (e.g., audio information, tactile information, and/or other information). The information generated by the touch-based application module may present a game to the user, may provide the user with access to files and/or documents stored on the mobile device, may provide the user with access to a network (e.g., the Internet), and/or provide other functionality. The touch-based application may be configured such that operation of the application module may be controlled by the user via the command inputs.

The user recognition module may be configured to generate information related to the position and/or body position of the user based on image information representing the user. The image information may be captured by an image capture device. The image capture device may be associated with the mobile device, with the external display device, with the docking station for the mobile device, external to the other components of the system, and/or associated with other components of the system. The user recognition module may be configured to locate one or more body parts of the user in the image information.

The gesture module may be configured to identify one or more gestures made by the user. The gesture module may identify the gesture(s) based on the image information representing the user, based on the information related to position and/or body position determined by the user recognition module, and/or based on other information. The gestures recognized by the gesture module may include gestures that correspond to command inputs to the touch-based application module.

The input translation module may be to translate the position and/or body position of the user, and/or the gestures identified by the gesture module, into control inputs to the touch-based application module. As such, the input translation module may be configured to spoof the control inputs typically generated by the touchscreen driver in order to facilitate gesture-based control of the touch-based application module.

The display output module may be configured to output the visual information generated by the touch-based application module to the external display device through the video output port. Responsive to the gesture-based control being used to control touch-based application module, this facilitates control over the content and/or application being presented on the external display device by the user through gesture-based control.

The modules may be configured to operate in a first mode and second mode. In the first mode, the input translation module may not generate command inputs. In the second mode, the input translation module generates command inputs based on the identified position, body position, and/or gestures. This may enable the mobile device to be controlled via touch during typical operation, and via gesture if the mobile device is coupled to an external display device for output. In some implementations, the mobile device may be switched automatically from the first mode to the second mode responsive to a determination that the mobile device has been coupled to an external display device.

The overlay module may be configured to generate overlay content based on user position, body position, and/or gestures. The overlay content may be superimposed over the visual information generated by the touch-based application module. The overlay content may convey one or more of current body position, the current position of one or more (e.g., two or more) specific body parts, and/or other information. The overlay content may provide feedback to the user as to current body position and/or gesture to enhance non-contact control over the touch-based application by the user. The overlay content may include one or more of visual information, audio information, tactile information, and/or other information.

The docking station may be configured to connect a mobile device with an external display device. The docking station may include one or more of a device seat, an image capture device, an image information port, a mobile device video port, a display device video port, a display device video port, a power supply connector, a power supply port, and/or other components.

The device seat may be configured to mechanically hold and support the mobile device in place on the docking station. The device seat may be configured such that responsive to the mobile device being docked at the docking station, the mobile device interfaces with the appropriate ports associated with the docking station.

The image capture device may be carried by and/or integrated with the docking station. The image capture device may be configured to capture image information representing a user.

The image information port may be configured to couple the image capture device to the mobile device. The image information port may facilitate the transfer of image information from the image capture device to the mobile device.

The mobile device video port may be configured to couple with the mobile device. The display device video port may be configured to couple with the external display device. The mobile device video port and the display device video port may facilitate the communication of visual information (e.g., application output) from the mobile device to the external display device for display on the external display device.

The power supply connector may be configured to removably connect with an external power supply. The power provision port may be configured to couple with the mobile device. The power supply connector and the power provision port may be configured to couple the mobile device to the external power supply to facilitate the provision of power from the external power supply to the mobile device.

Figure 13:
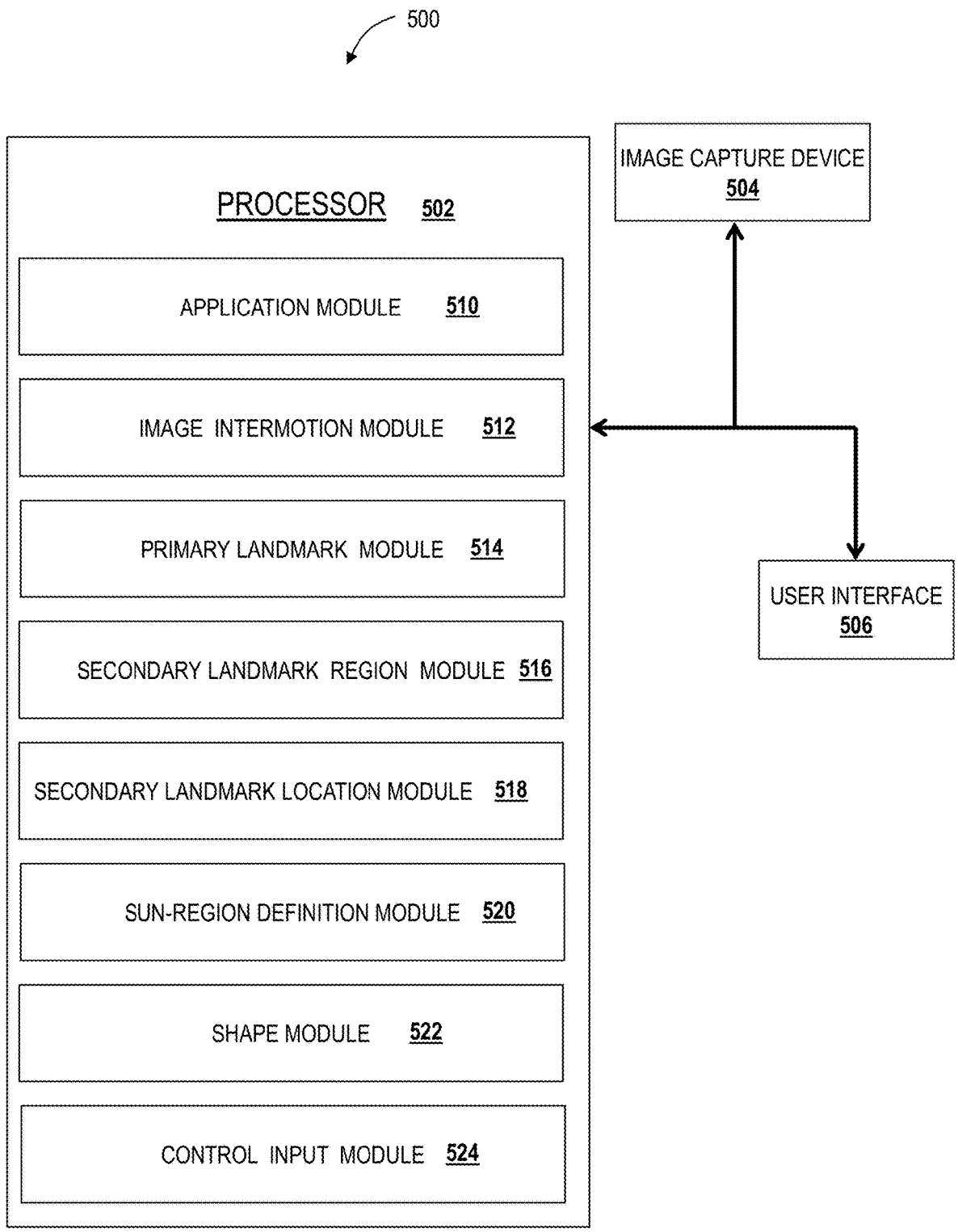
FIG. 13 illustrates a block diagram of a device for configuring alternative-control processor over a touched based application.

FIG. 13 illustrates an exemplary implementation of a display device system 500. The display device system 500 may include or be communicatively coupled to one or more processors 502, an image capture device 504, and/or other devices and a video output device or port 506.

The modules executed by the processor 502 in the display device 500 may include one or more of an application module 510, an image inter-motion driver module 512, a primary landmark module 514, a secondary landmark region module 516, a secondary landmark location module 38, a secondary landmark location module 518, a sun-region definition module 520, a shape module 522, a control input module 524, and/or other modules. The modules 510, 512, 514, 516 518, 520, 522 and/or 524 may be implemented in software; hardware; firmware; some combination of software, hardware, and/or firmware; and/or otherwise implemented. It should be appreciated that although the modules 510, 512, 514, 516 518, 520, 522 and/or 524 are illustrated in FIG. 13 as being co-located within a single processing unit, in implementations in which the processor 502 includes multiple processing units, the modules 510, 512, 514, 516 518, 520, 522 and/or 524 may be located remotely from the other modules. Further, the description of the functionality provided by the different modules 510, 512, 514, 516 518, 520, 522 and/or 524 described below is for illustrative purposes, and is not intended to be limiting, as any of the modules 510, 512, 514, 516 518, 520, 522 and/or 524 may provide more or less functionality than is described. For example, one or more of the modules 510, 512, 514, 516 518, 520, 522 and/or 524 may be eliminated, and some or all of its functionality may be provided by other ones of the modules 510, 512, 514, 516 518, 520, 522 and/or 524. As another example, the processor 502 may include one or more additional modules that may perform some or all of the functionality attributed below to one of the modules 510, 512, 514, 516 518, 520, 522 and/or 524.

The system may collect information from the gesture-based control inputs. The executed processor 514 may be configured by a computer readable instructions to obtain image information defining an image including a subject; the device processor may also be configured to identify a location of a primary landmark on the subject from the obtained image information, the primary landmark being disposed at or near a head of the subject; the device processor 514 may further be configured to define a secondary landmark region of the image based on the location of the primary landmark, wherein the secondary landmark region represents a hypothesis with respect to the location of a secondary landmark on the subject, the secondary landmark region subsuming the primary landmark; The device processor may furthermore be configured to analyze the secondary landmark region separate from the rest of the image to identify a location of the secondary landmark and defined a sub-region of the secondary landmark region that includes the location of the secondary landmark; The device processor may be finally configured to analyze the sub-region of the secondary landmark region separate from the rest of the image to determine a shape of the secondary landmark.

Figure 14:
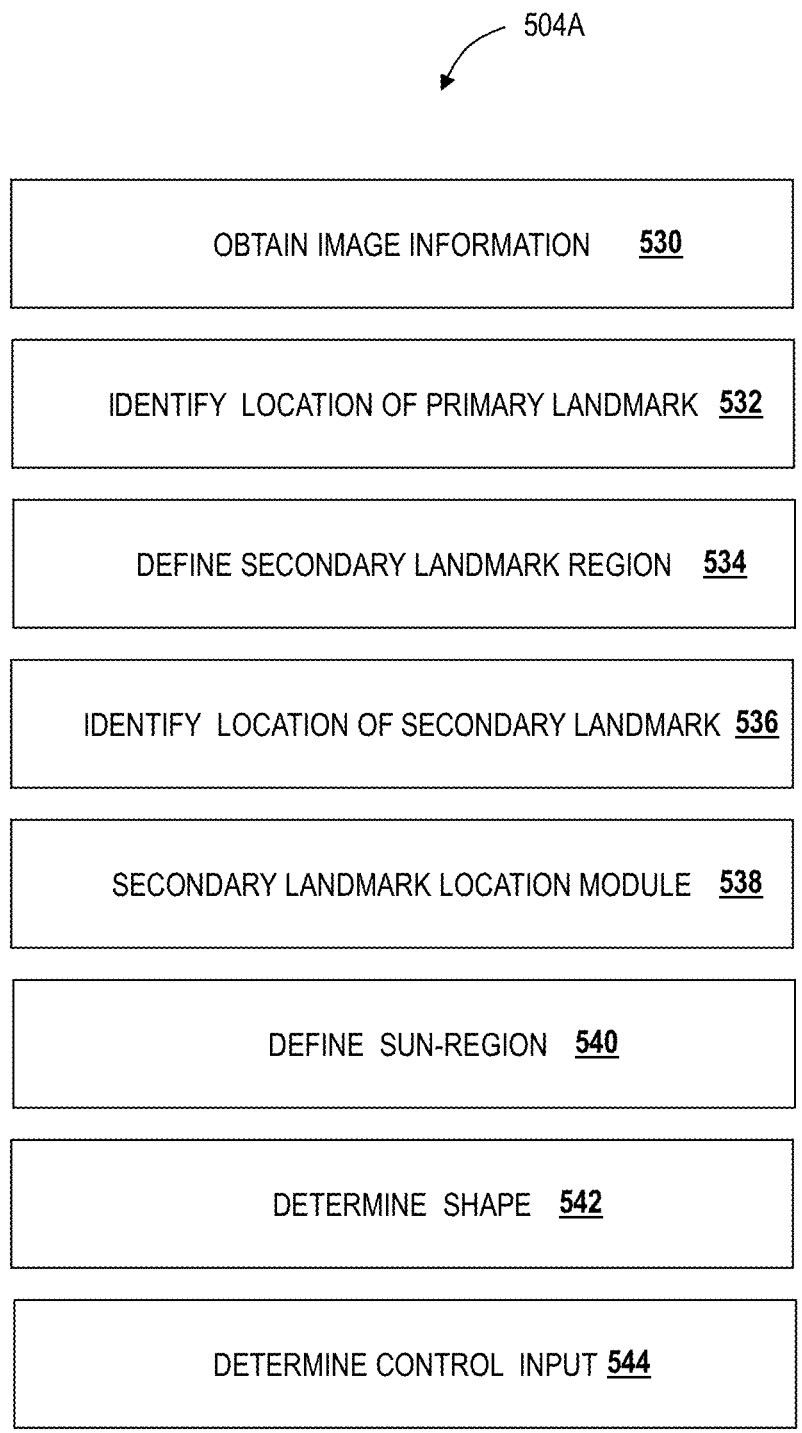
FIG. 14 illustrates an image capturing device gathering information from the gesture-based control inputs.

FIG. 14 illustrates another exemplary implementation of an image capturing process 504A gathering information from the gesture-based control inputs.

The system may collect information from the gesture-based control inputs. The executed processor 502 may obtain image information 530 from the image capture device 504, identify a location of a primary landmark 532, define a secondary landmark region 534, identify location secondary landmark 536. After identifying the location of the secondary landmark 536 the processor 502 may display a secondary landmark location module 538, define a sub-region 540, determine a shape, and determine the control input 544. It should be appreciated that although the gathering, identification and/or definition of information 530, landmark 532, region 534, secondary landmark 536, module 538, sun-region 540, shape 542 and control input 544 are illustrated in FIG. 14 as being co-located within a single processing unit, in implementations in which the processor 502 includes multiple processing units, the process 530, 532, 534, 536 538, 540, 542 and 544 may be implemented in software; hardware; firmware; some combination of software, hardware, and/or firmware.

The computer-implemented method may further include providing output from a touch-based device to an external display; detecting gestures from a user located away from and not physically touching the touch-based device; and translating the detected gestures into appropriate commands for the touch-based device to control the touch-based device without being in physical contact therewith.

Figure 15:
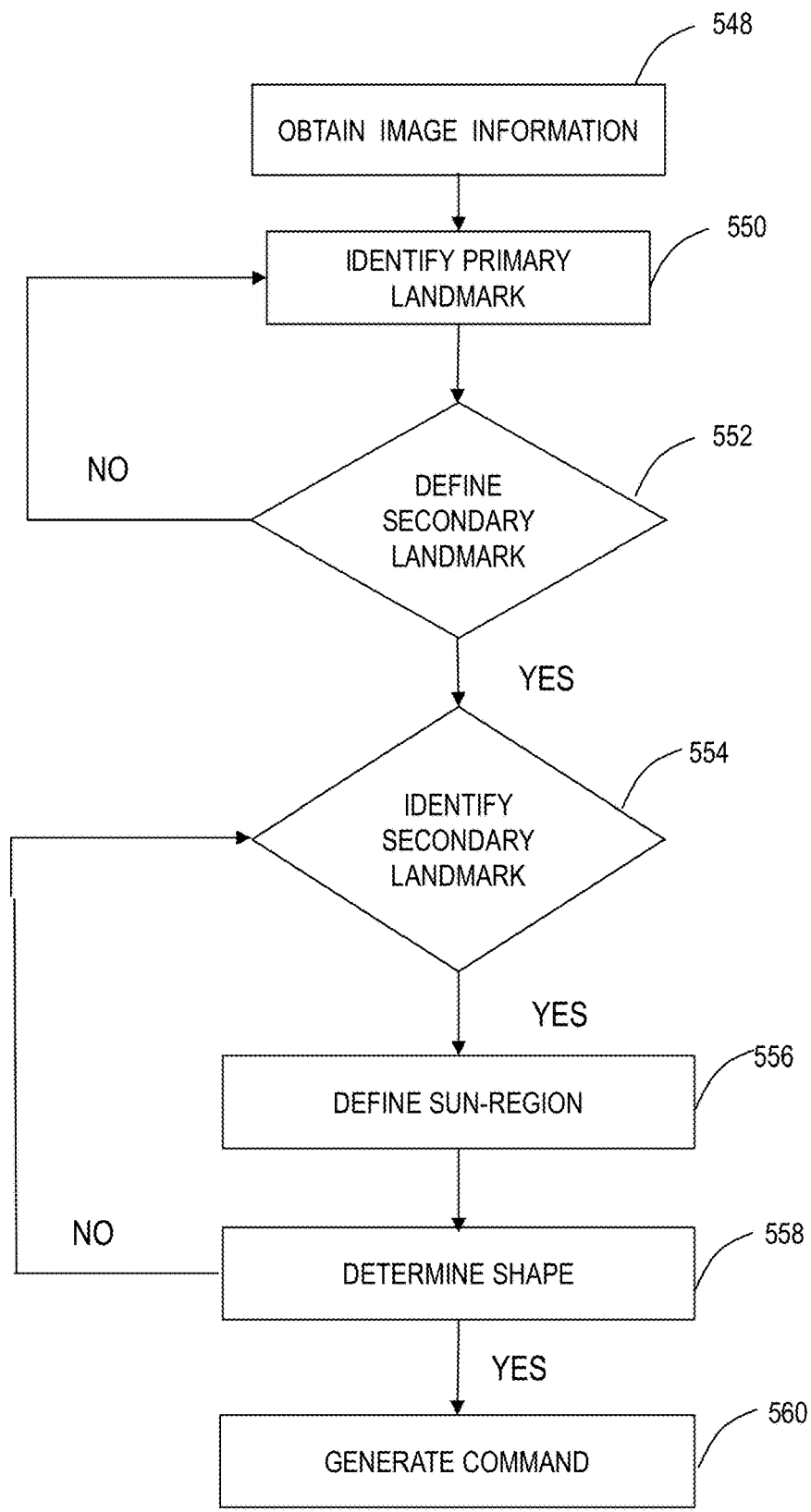
FIG. 15 illustrates a flow chart of a course-to-fine process that provides the computer-implemented method to generate the input command from the gestures inputs.

FIG. 15 illustrates a flow chart of a course-to-fine process that provides the computer-implemented method to generate the input command from the gestures inputs. The system may be configured to determine the gesture-based controls inputs. The device processor may be configured by a computer-readable instructions to automatically obtain the image information 548 that define an image including a subject. The device processor may automatically identify a location of a primary landmark 550 on the subject from the obtained image information, wherein the primary landmark is being disposed at or near a head of the subject. Based on the obtained information, the device processor may define a secondary landmark region 552 of the image based on the location of the primary landmark, wherein the secondary landmark region 554 represents a hypothesis with respect to the location of a secondary landmark. The secondary landmark region may subsume the primary landmark on the subject. The device processor may also be configured to analyze the secondary landmark region separated from the rest of the image to identify a location of the secondary landmark. The device processor may further define a sub-region 556 of the secondary landmark region that includes the location of the secondary landmark and analyze the sub-region of the secondary landmark region separate from the rest of the image to determine a shape 558 of the secondary landmark. This is classified as the first active pose and every control input command 560 may be therefore generated.

Figure 16A:
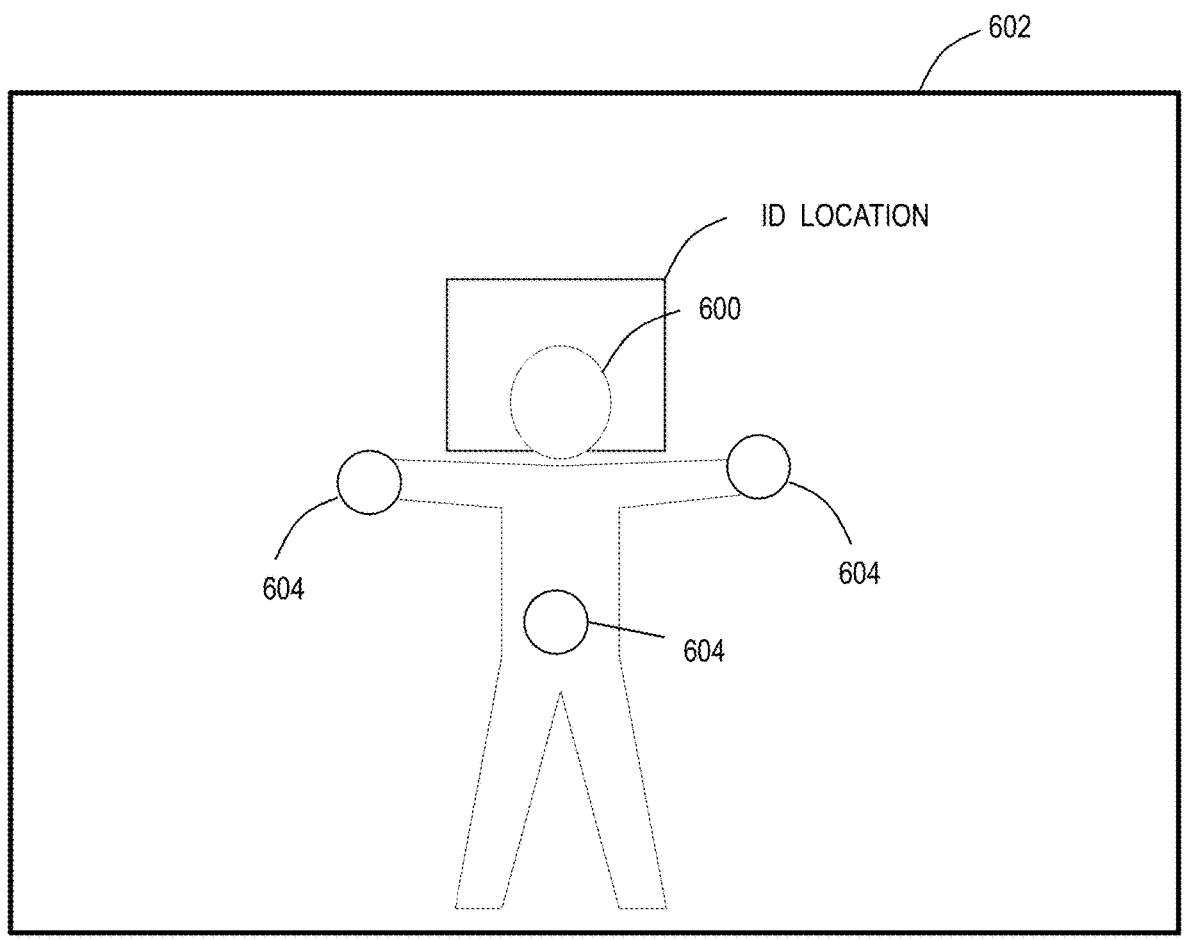
FIGS. 16A-16D illustrate a display device such as a user interface and/or a video output device.
Figure 16B:
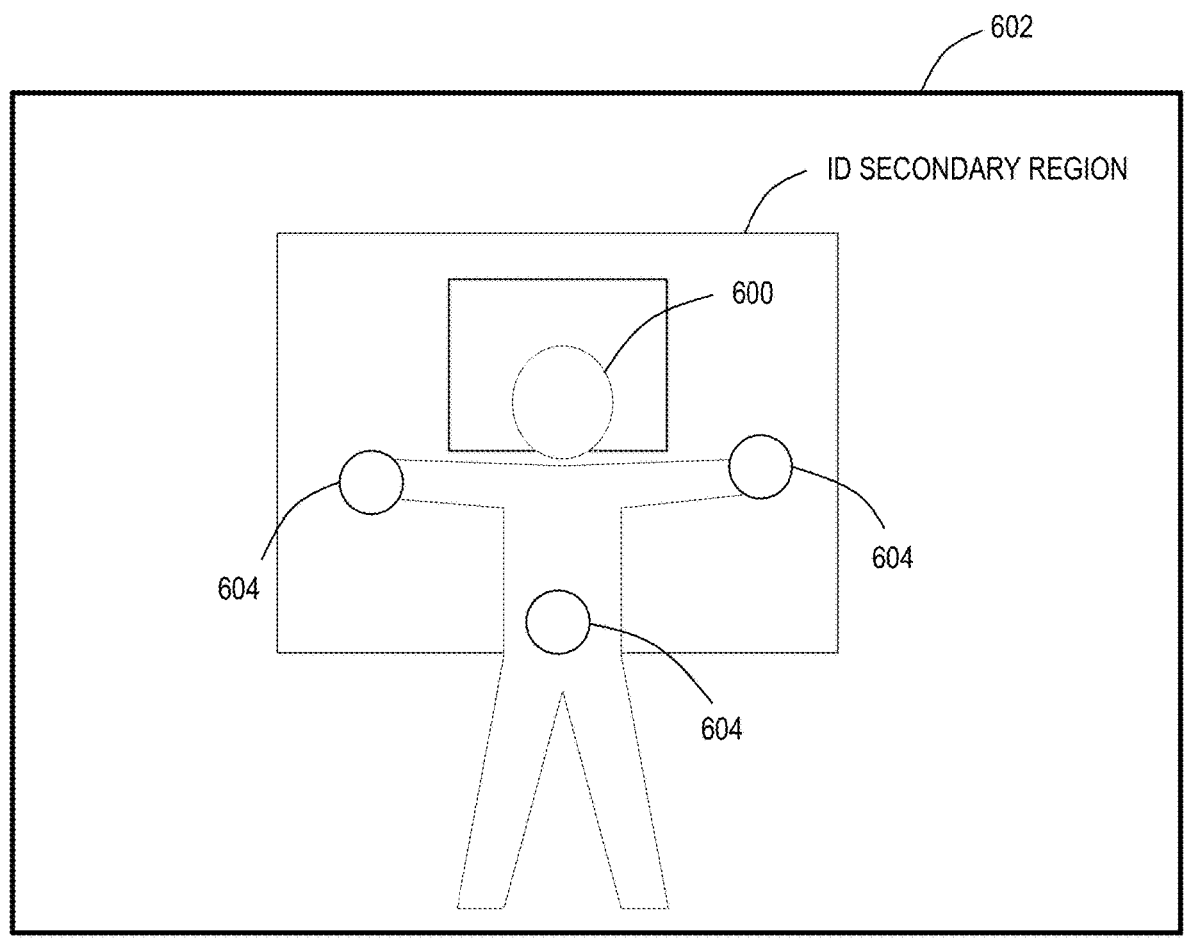
Figure 16C:
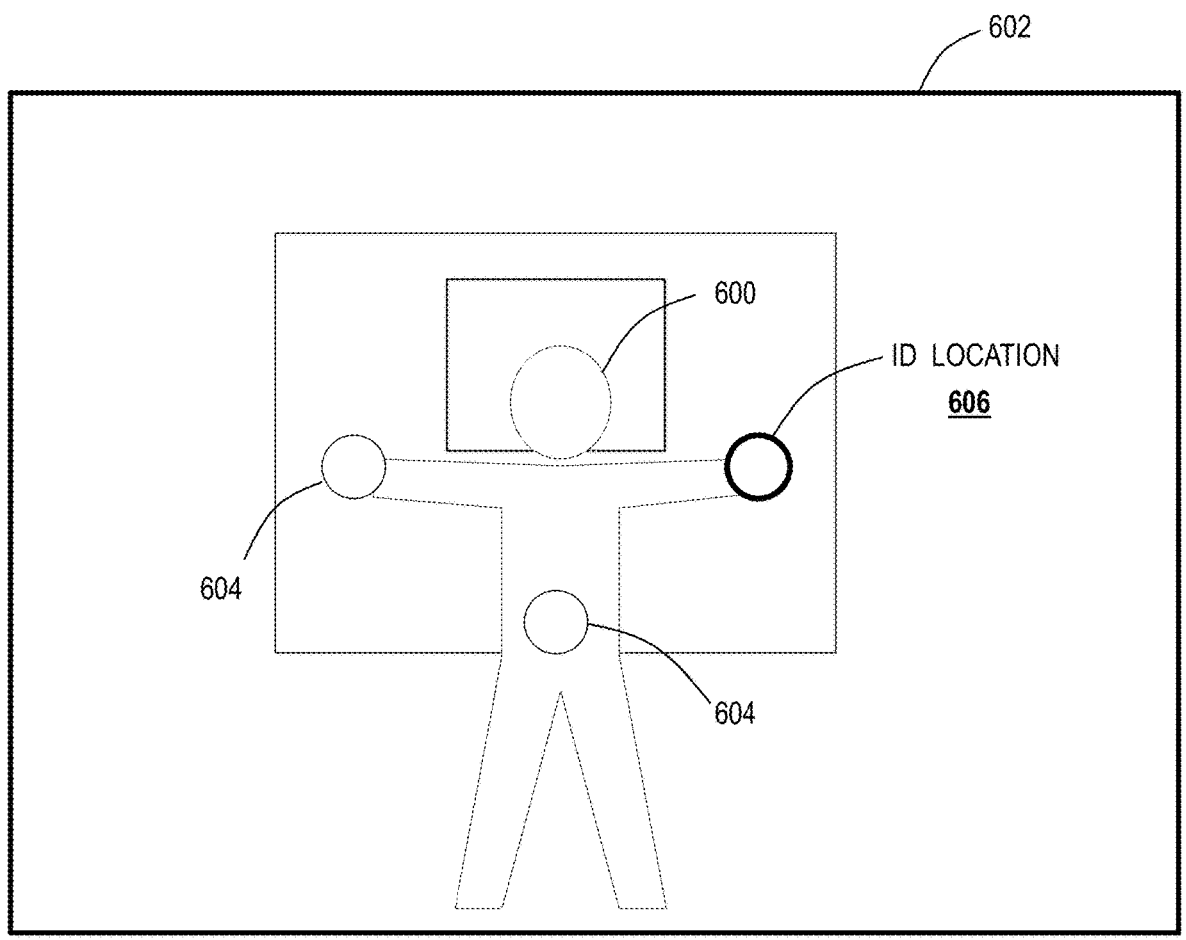
Figure 16D:
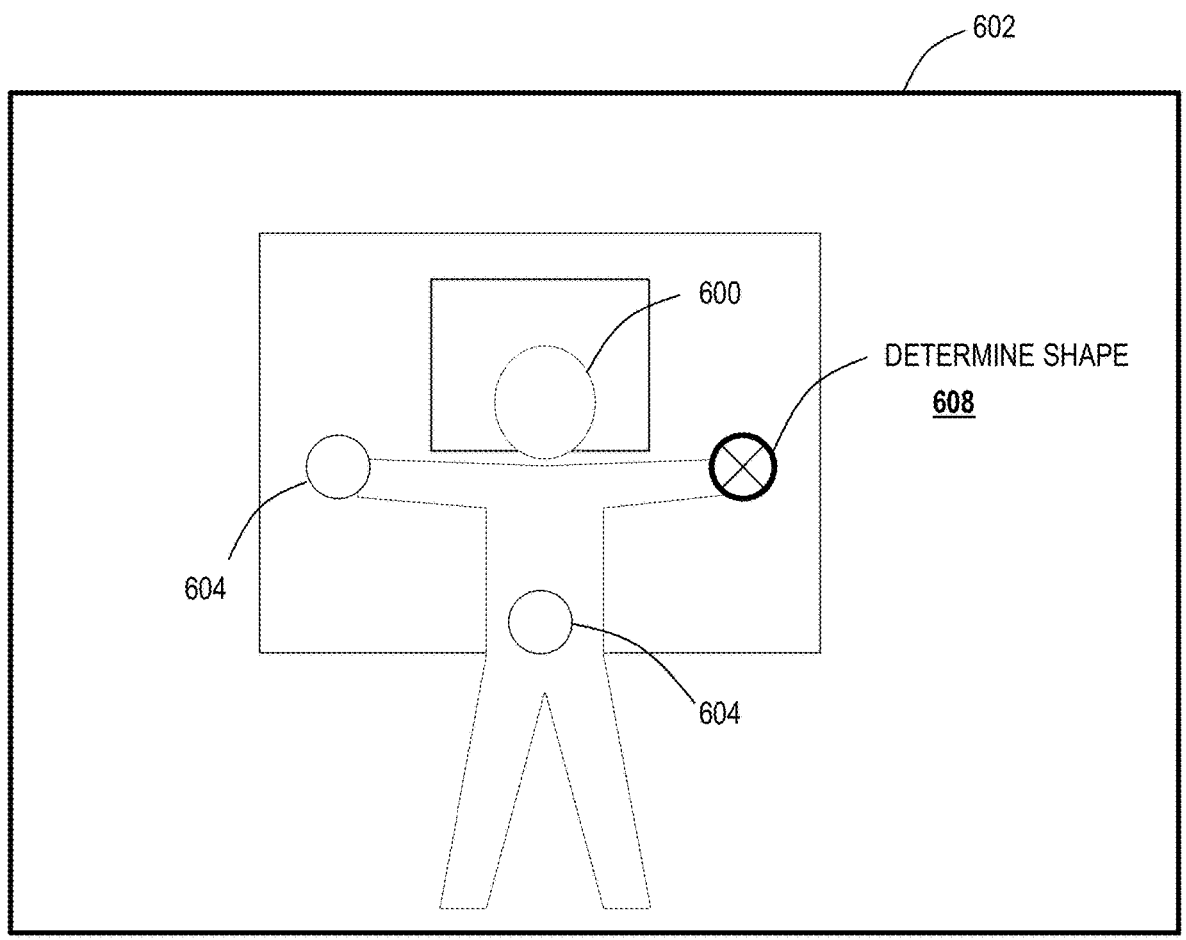

The illustration of FIG. 16A depicts a view 602, image information from a touch-based application module (e.g., similar to or the same as the touch-based application module 512 shown in FIG. 13 and described above). In the view 602, a user interface overlay position 600 may be visible on the head ID location, body ID secondary region, hand ID location and/or hand shape determination. The view 602, with the overlay position 600 may be presented to the user via an external display device (e.g., the external display device 14 shown in FIG. 1) or another external device (e.g., the other external device(s) 18 shown in FIG. 1). The overlay position 600 includes overlay content, such as, for example, one or more of ID location content (e.g., the head position 600 shown in FIG. 16A), ID secondary region content (e.g., the part of body position 600 and 604 shown in FIG. 16B), ID location content (e.g., the hand position 606 shown in FIG. 16C), and shape determination content (e.g., the hand position 608 shown in FIG. 16D)

The overlay position 600 may be configured to be superimposed over visual information generated by the touch-based application module, wherein the user interface overlay position is determined based on the image information representing the user. The overlay position 600 may be configured to represent a current body position of the user. In some implementations, the overlay 600 may be configured to represent body positions of one or more individual user body parts. The overlay 600 may be configured to track and display user gestures (e.g. body position, sounds, movement, touch, or other contact or non-contact gestures) from one or more simultaneous users. The overlay 600 may be depicted as having a body position that corresponds to the body position of the user associated with the overlay representation (e.g., based on body position and/or body position parameters detected by the inter-motion module 512).

Figure 17:
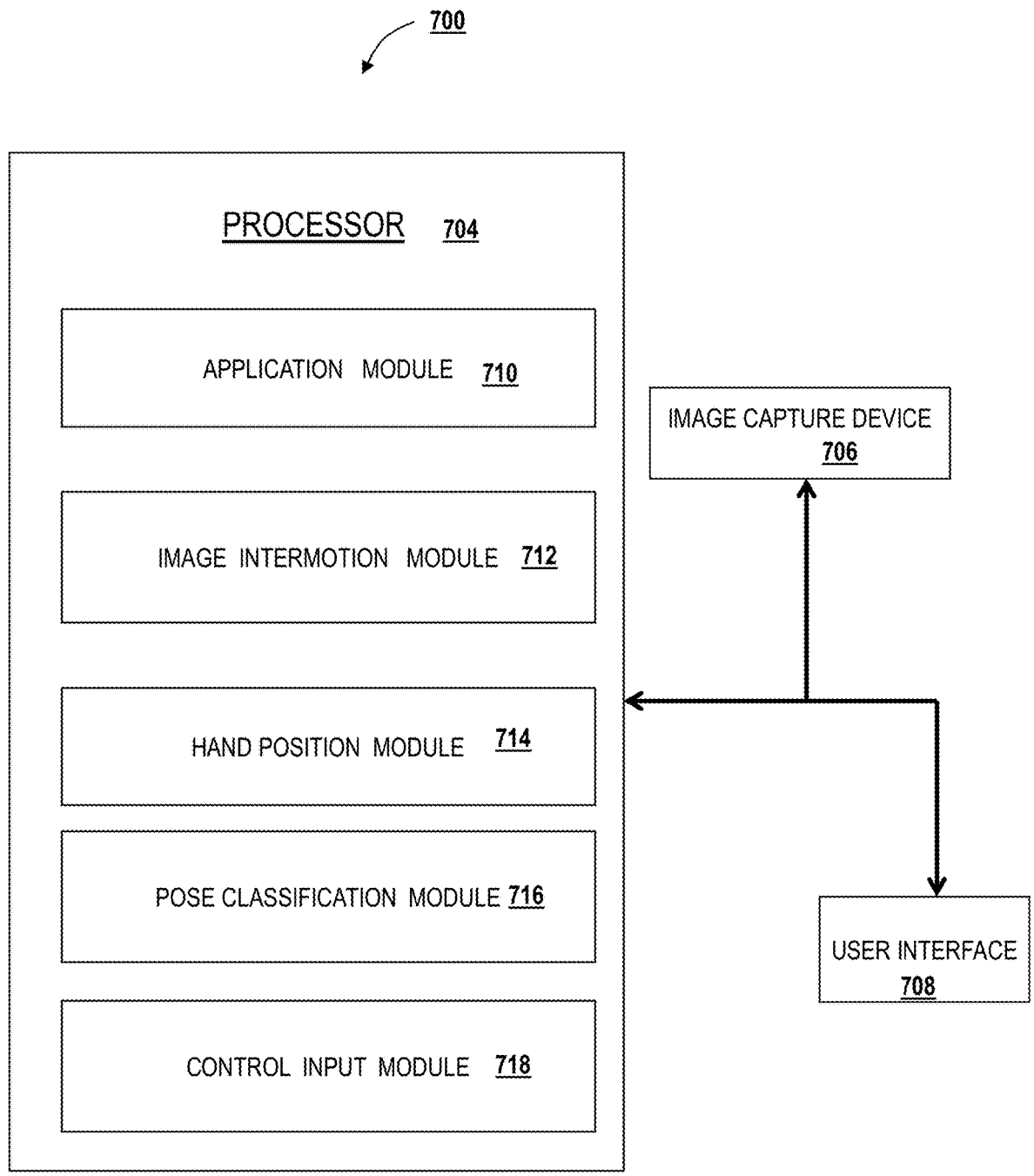
FIG. 17 illustrates a block diagram of a device for gathering information from the gestured-based application.

FIG. 17 illustrates an exemplary implementation of the display device 700. The display device 700 may include one or more of a processor 704, an image capture device 706, and/or other devices such as user interface and/or a video output device or port 708.

The modules executed by the processor 704 in the display device 700 may include one or more of an application module 710, an image inter-motion driver module 712, a hand position module 714, a pose classification module 716, a control input module 718, and/or other modules. The modules 710, 712, 714, 716, and/or 718, may be implemented in software; hardware; firmware; some combination of software, hardware, and/or firmware; and/or otherwise implemented. It should be appreciated that although the modules 710, 712, 714, 716 and/or 718 are illustrated in FIG. 17 as being co-located within a single processing unit, in implementations in which the processor 704 includes multiple processing units, the modules 710, 712, 714, 716 and/or 718 may be located remotely from the other modules. Further, the description of the functionality provided by the different modules 710, 712, 714, 716 and/or 718 described below is for illustrative purposes, and is not intended to be limiting, as any of the modules 710, 712, 714, 716 and/or 718 may provide more or less functionality than is described. For example, one or more of the modules 710, 712, 714, 716 and/or 718 may be eliminated, and some or all of its functionality may be provided by other ones of the modules 710, 712, 714, 716 and/or 718. As another example, the processor 804 may include one or more additional modules that may perform some or all of the functionality attributed below to one of the modules 710, 712, 714, 716 and/or 718.

The system may be configured to determine the gesture-based controls inputs. The device processor may be configured by a computer-readable instructions to automatically obtain the image information that define an image including a subject. The device processor may also be configured to automatically identify a location of a primary landmark on the subject from thee obtained image information, wherein the primary landmark is being disposed at or near a head of the subject. The device processor may also be configured to define a secondary landmark region of the image based on the location of the primary landmark, wherein the secondary landmark region represents a hypothesis with respect to the location of a secondary landmark. The secondary landmark region may subsume the primary landmark on the subject. The device processor may also be configured to analyze the secondary landmark region separated from the rest of the image to identify a location of the secondary landmark. The device processor may be further configured to define a sub-region of the secondary landmark region that includes the location of the secondary landmark. The device processor may be furthermore configured to analyze the sub-region of the secondary landmark region separate from the rest of the image to determine a shape of the secondary landmark.

Figure 18:
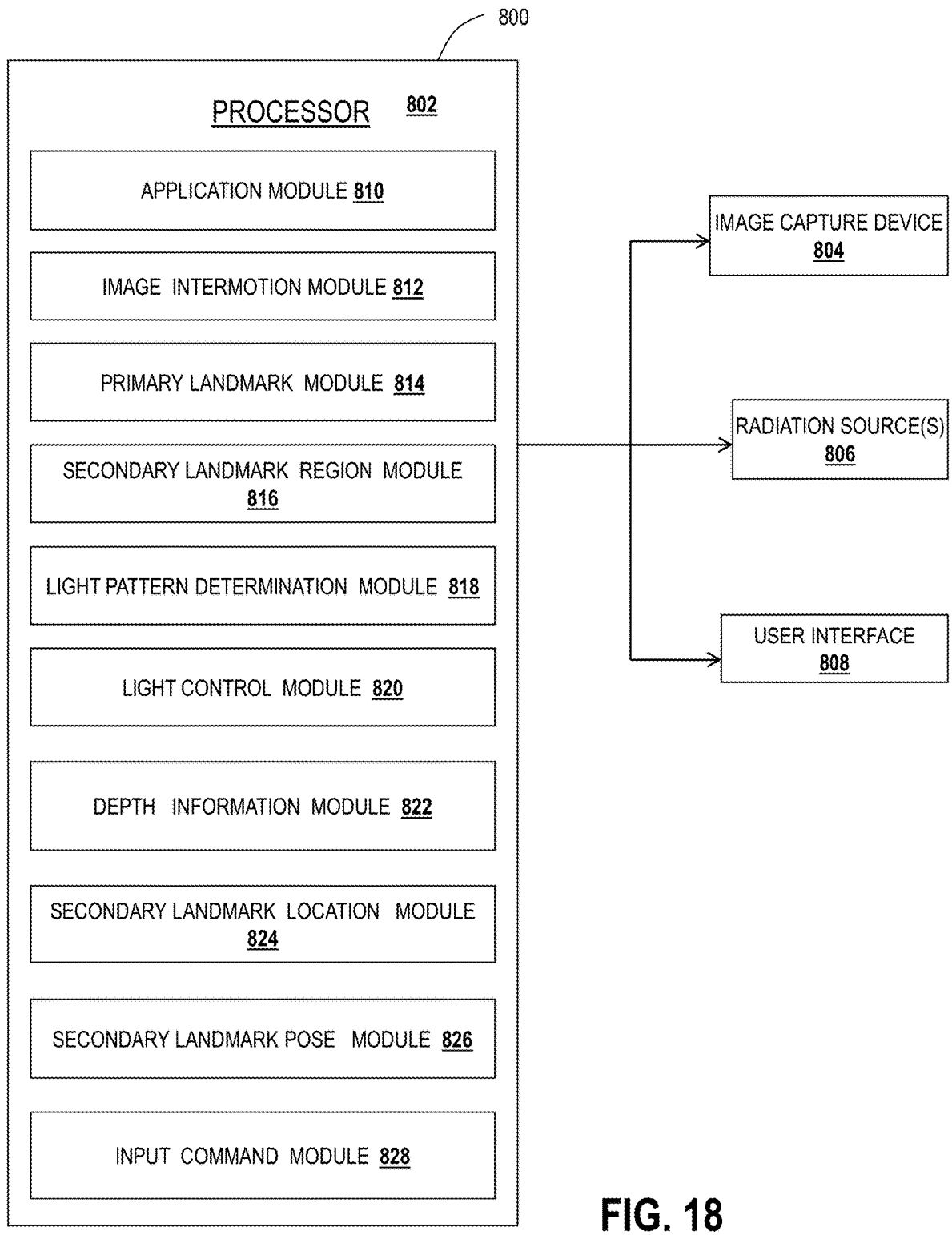
FIG. 18 illustrates another method of implementing gathered information from the gestured-based application by the device processor.

FIG. 18 illustrates another exemplary implementation of the display device processor 802. The display device 800 may include one or more of a processor 802, an image capture device 804, one or more radiation sources 806, and a user interface or other devices and a video output device or port 808.

The processor 802 is a hardware device for executing software instructions. The modules executed by the processor 802 in the display device 800 may include one or more of an application module 810, an image inter-motion driver module 812, a primary landmark module 814, a secondary landmark region module 816, a light pattern determination module 818, a light control module 820, a depth information module 822, a secondary landmark location module 824, a secondary landmark pose module 826, and input command module and/or other modules. The modules 810, 812, 814, 816 818, 820, 822, 824, 826, 828 and/or other modules may be implemented in software; hardware; firmware; some combination of software, hardware, and/or firmware; and/or otherwise implemented. It should also be appreciated that although the modules 810, 812, 814, 816 818, 820, 822, 824, 826 and/or 828 are illustrated in FIG. 18 as being co-located within a single processing unit, in implementations in which the processor 802 includes multiple processing units, the modules 810, 812, 814, 816 818, 820, 822, 824, 826 and/or 828 may be located remotely from the other modules. Further, the description of the functionality provided by the different modules 810, 812, 814, 816 818, 820, 822, 824, 826 and/or 828 described below is for illustrative purposes, and is not intended to be limiting, as any of the modules 810, 812, 814, 816 818, 820, 822, 824, 826 and/or 828 may provide more or less functionality than is described. For example, one or more of the modules 810, 812, 814, 816 818, 820, 822, 824, 826 and/or 828 may be eliminated, and some or all of its functionality may be provided by other ones of the modules 810, 812, 814, 816 818, 820, 822, 824, 826 and/or 828. As another example, the processor 802 may include one or more additional modules that may perform some or all of the functionality attributed below to one of the modules 810, 812, 814, 816 818, 820, 822, 824, 826 and/or 828.

The processor 802 is a hardware device for executing software instructions. The device processor 802 may be configured to obtain the image information that defines an image including a subject. The device processor may be further configured to identify a location of a primary landmark on the subject from the obtained image information, the primary landmark being disposed at or near a head of the subject. The device processor may be furthermore configured to define a secondary landmark region of the image based on the location of the primary landmark, wherein the secondary landmark region represents a hypothesis with respect to the location of a secondary landmark on the subject, wherein the secondary landmark region subsuming the primary landmark. The device processor may be furthermore configured to project a visible light pattern into the second landmark region, wherein a boundary and/or a density of the visible light pattern is determined based on the secondary landmark region. The device processor may be configured to obtain image information by defining an image that includes the user with the projected visible light pattern present. The device processor may be moreover configured to determine the depth information in the secondary landmark region based on the projected visible light pattern. The device processor may be finally configured to analyze the determined depth information to identify a location and shape of the secondary landmark.

Figure 19:
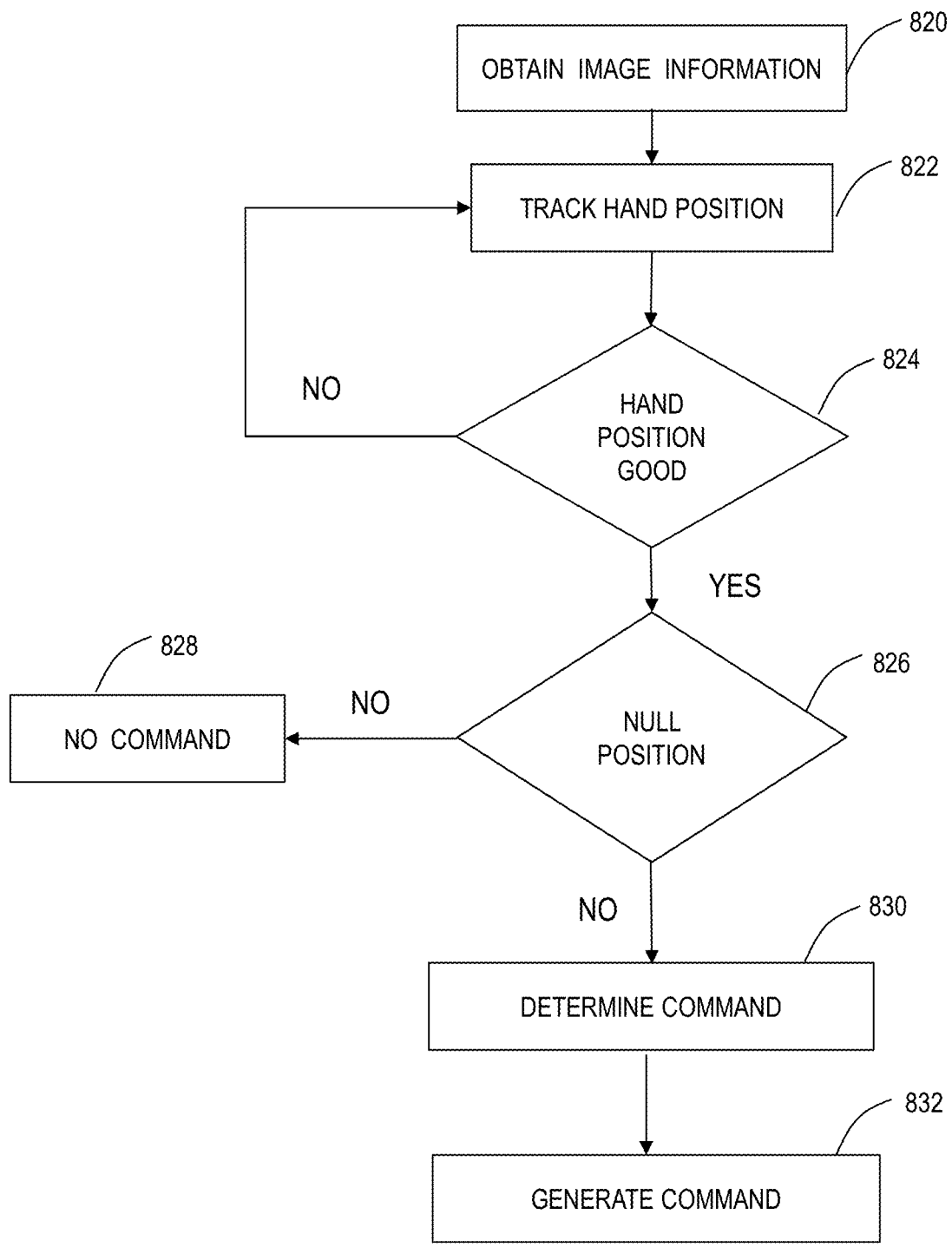
FIG. 19 illustrates another method of implementing gathered information from the touched-based control inputs.

FIG. 19 illustrates another exemplary implementation of device processor 802 gathering information from the gesture-based control inputs.

The system may obtain information from the gesture-based control inputs. The executed processor 804 may obtain a series of images information 820, of a subject across time and track the hand position 822 of the subject through the images and be able to identify and adjust the hand position 824 and classify pose of the hands through the images null position 826. A responsive to the null position of the hand 826 of the subject, determine a control input command 830 base on the null position classification and generate a control input command 832.

The device processor 804 may also be configured to obtain a series of images of a subject across time, be able to track hand position of a hand of the subject through the images and be able to classify pose of the hand though the images, wherein the classification of a pose includes the assignment of a pose to the hand for at least one of the images from a set of potential poses. These set of potential poses include a first active pose and a null pose. A responsive to the pose of the hand of the subject, this is classified as the first active pose and every control input command for a computer program may be generated. Moreover, a responsive to the pose of the hand of the subject, this is classified as the null pose and every generation of any control input command for the computer program that may be refrained.

FIG. 20 illustrates another exemplary implementation of the image capture device 904 gathering information from the gesture-based control inputs.

The system may for example collect information from the gesture-based control inputs. The processor 902 is a hardware device for executing software instructions. The executed processor 902 may obtain image information 930, identify a location of a primary landmark 932, define a secondary landmark region 934, determine light pattern 936, project light pattern 938, obtain image information 940, locate a secondary landmark 942, determine the pose 944, and determine the command input 946.

In some implementation, the device processor may also be configured to obtain a series of images of a subject across time, and be able to track hand position of a hand of a subject through the image information and be able to classify the pose of the hand through the images, wherein the classification of a pose includes the assignment of a pose to the hand for the at least one of the images from a set of potential poses. These set of potential poses include a first active pose and a null pose. A responsive to the pose of the hand of the subject is classified as the first active pose and every control input command for a computer program may be generated. Moreover, a responsive to the pose of the hand of the subject, is classified as the null pose and every generation of any control input command for the computer program may be refrained.

Figure 21:
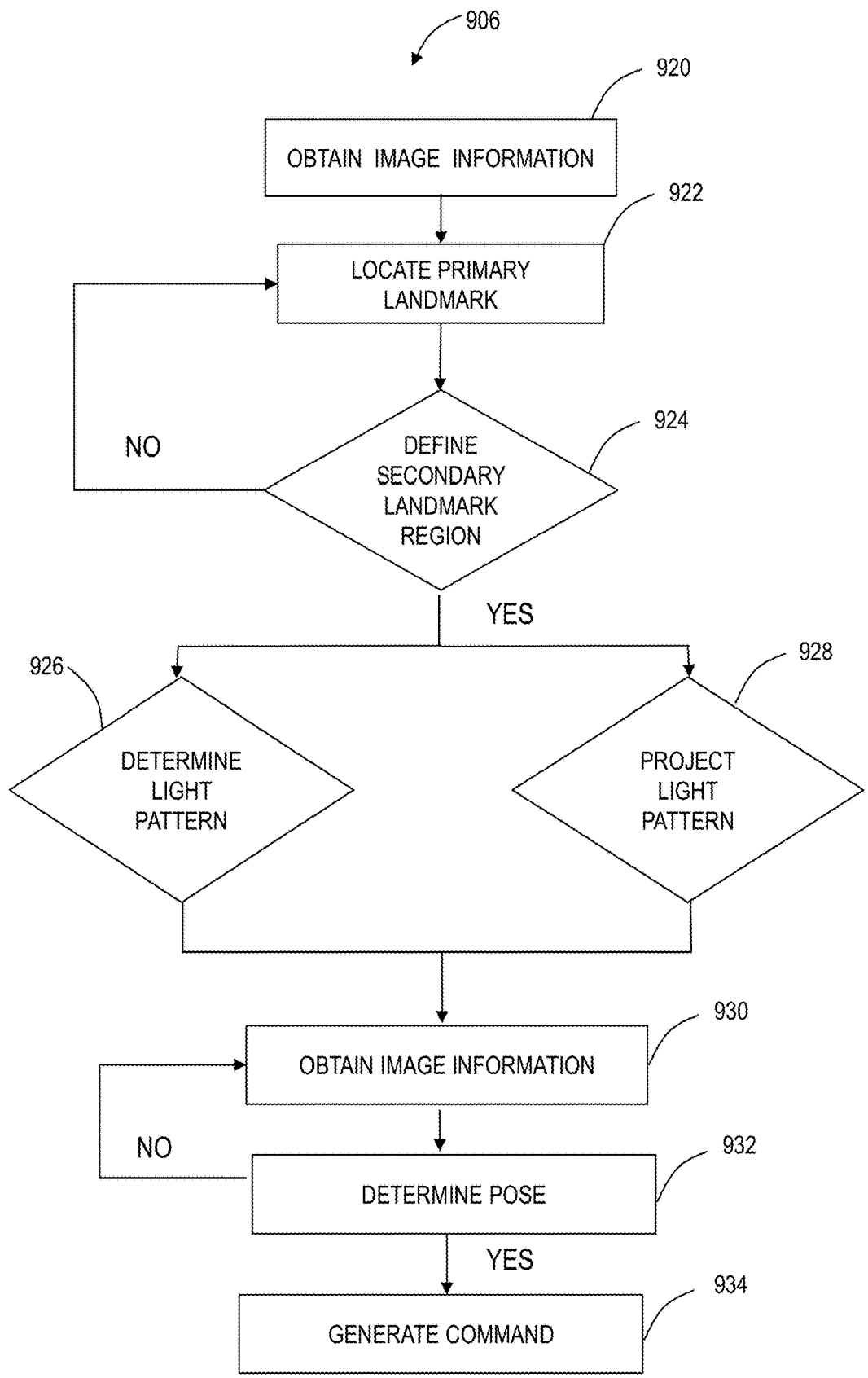
FIG. 21 illustrates a method of controlling a touch-based application being executed on a mobile device with computer vision.

FIG. 21 illustrates a method of controlling a touch-based application being executed on a mobile device with computer vision. The operations of the method presented herein are intended to be illustrative of some computer-implementation method including of detecting and translating gestures from a user located away from a touched based device to control the device. The device processor may obtain the image information 920 that defines for example, an image including a subject. Base on the image information, the processor may for example identify a location of a primary landmark 922 on the subject from the obtained image information, the primary landmark being disposed at or near a head of the subject. The device processor may once again define a secondary landmark region 924 of the image based on the location of the primary landmark, wherein the secondary landmark region represents a hypothesis with respect to the location of a secondary landmark on the subject, wherein the secondary landmark region subsuming the primary landmark. The device may furthermore project a visible light pattern 926 into the second landmark region, wherein a boundary and/or a density of the visible light pattern are determined based on the secondary landmark region. In some embodiments, the method may be accomplished with one or more additional operations not described, and/or without one or more of the operations discussed. Additionally, the order in which the operations of the method 74 are illustrated in FIG. 5 and described below is not intended to be limiting. The device processor may further obtain image information 930 by defining an image that includes the user with the projected visible light pattern present. The device processor may moreover determine the depth information in the secondary landmark region based on the projected visible light pattern in order to generate the input control command 934 for the user.

FIGS. 22A-22D illustrate another exemplary overlay superimposed over application output by gathering location definition and visibility pattern from a gestures-based application.

Figure 22A:
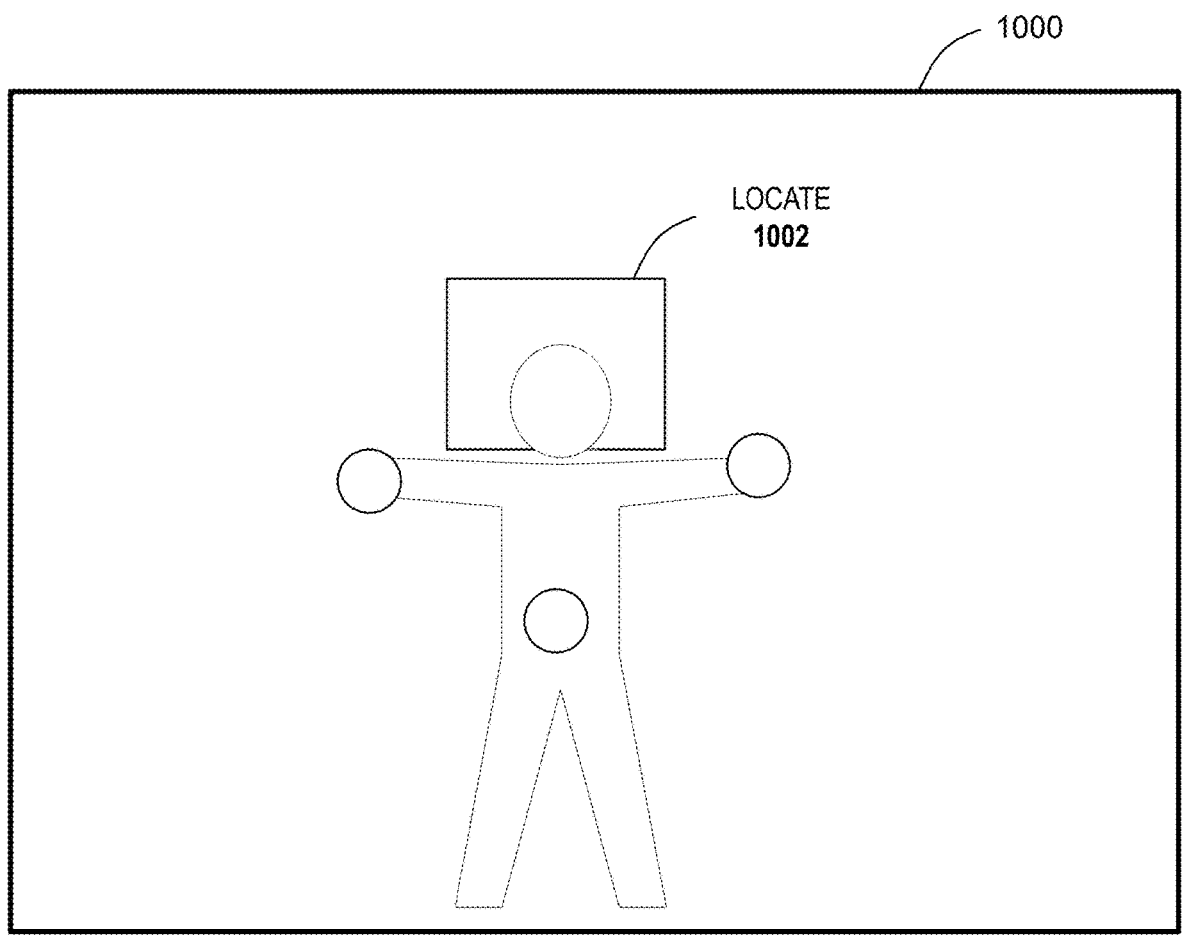
FIGS. 22A-22D illustrate another exemplary overlay superimposed over application output by gathering location definition and visibility pattern from a gestures-based application.
Figure 22B:
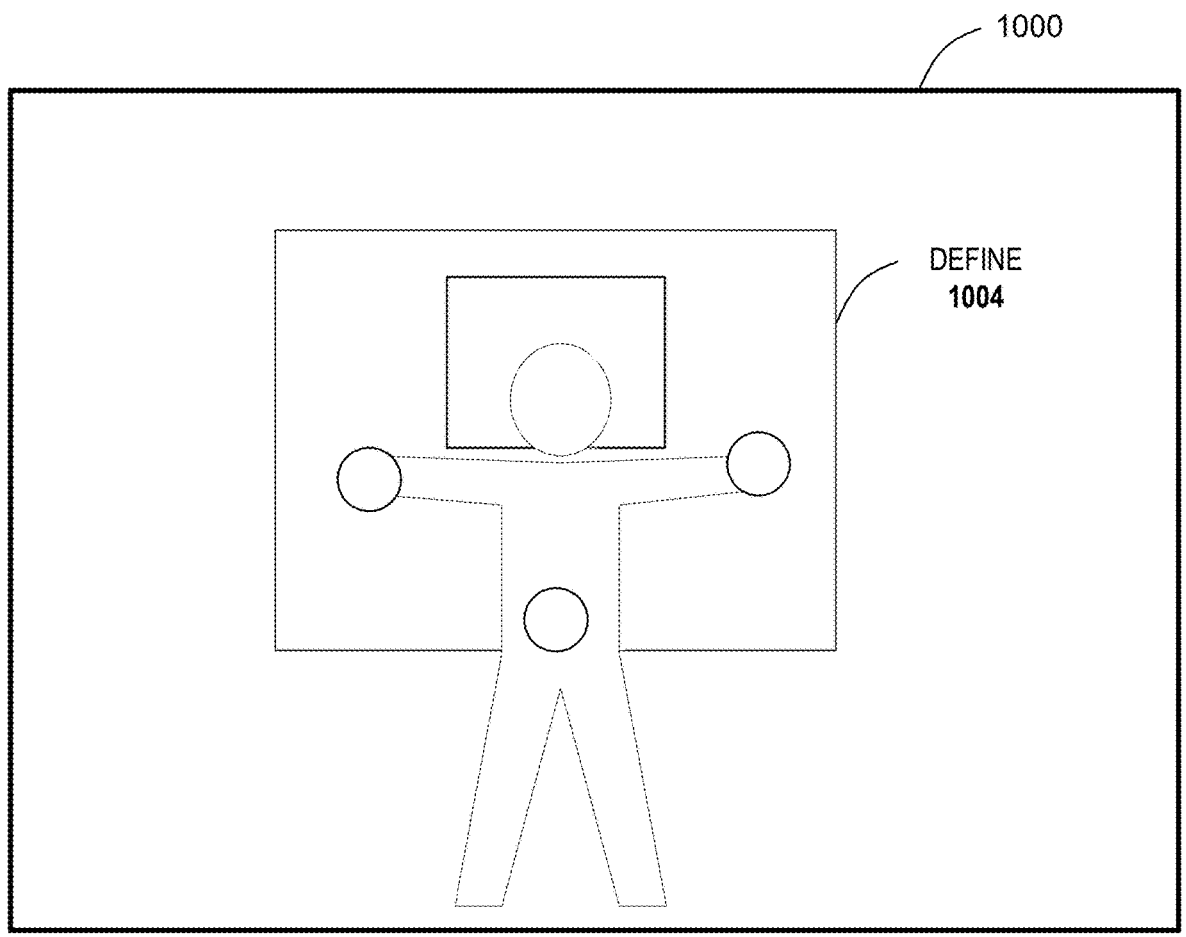
Figure 22C:
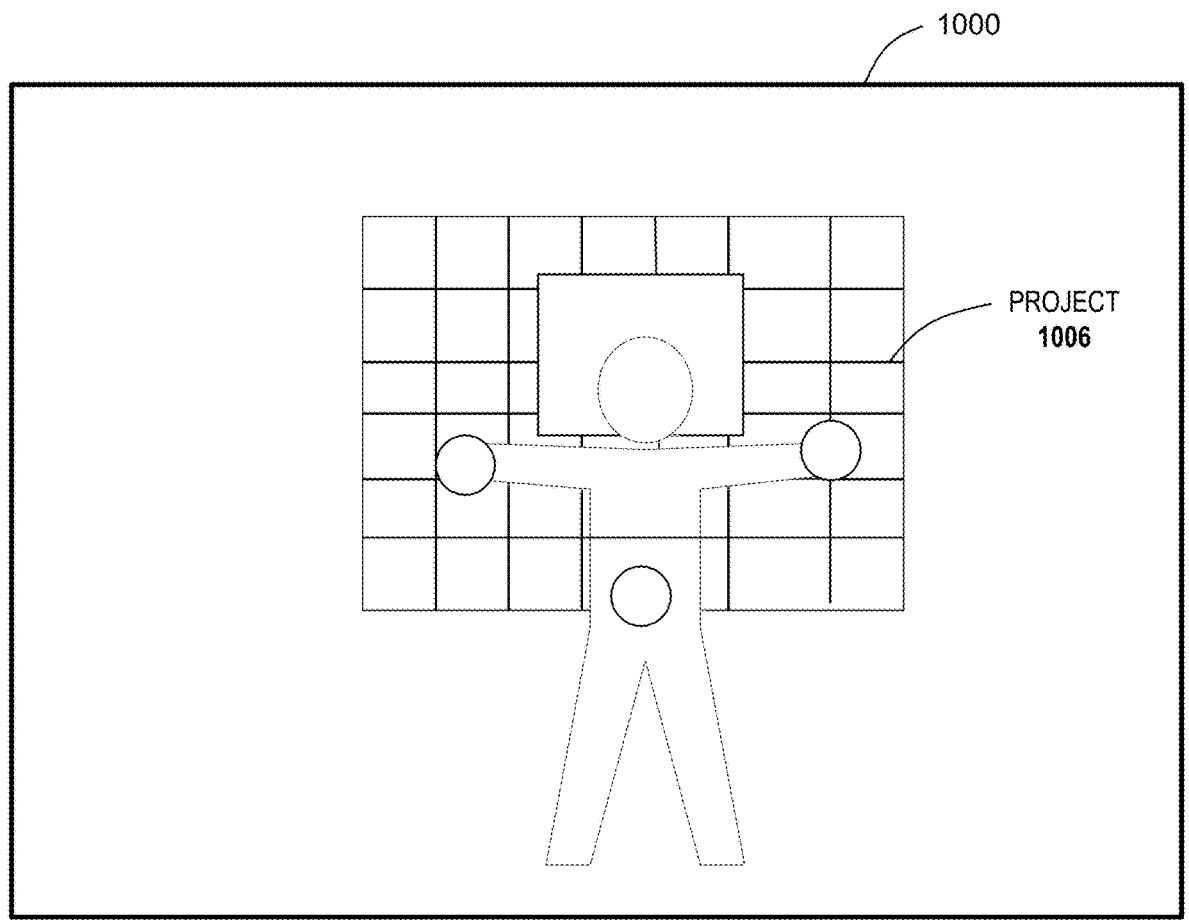
Figure 22D:
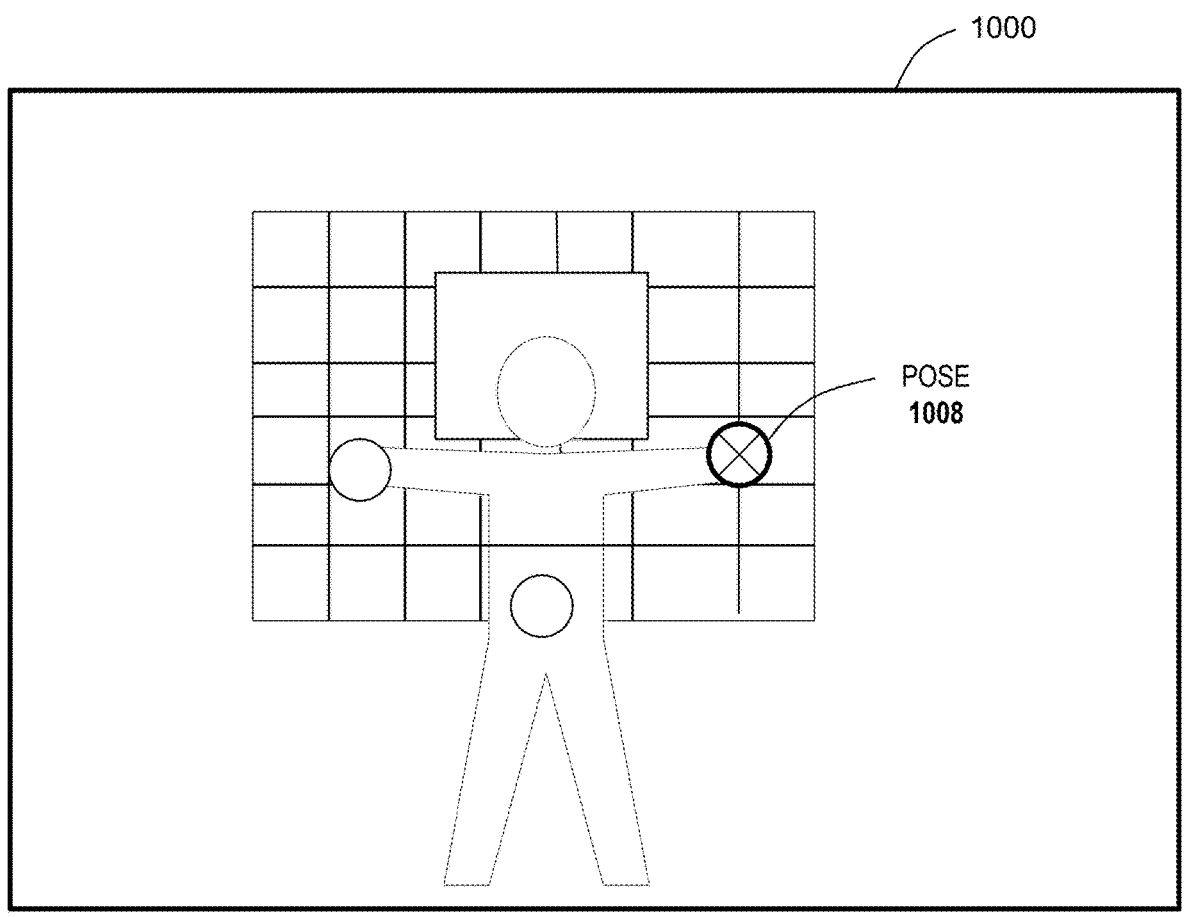

The illustration of FIG. 22A depicts a view 1000 of image information from a gestured-based application module (e.g., the external display device shown in FIG. 21 and described above). In the view 1000, a user interface overlay the position 1002 may be visible based on the location of the primary landmark region and/or defined an image include a subject by body with respect to the location of a secondary landmark on the subject region 1004, and/or projected by light pattern based on the secondary landmark region 1006 and/or determined and identified the depth information based on the shape and location of the secondary landmark described above in the FIG. 21. The overlay position 904 includes overlay content, such as for example one or more of location content (e.g., the head location 1002 shown in FIG. 22-A), secondary landmark region content (e.g., the part of body defined by 1004 shown in FIG. 22-B), light pattern projection into the second landmark region content (e.g., the hand position 1006 shown in FIGS. 22-C), and depth information determination content (e.g., the hand position 1008 shown in FIGS. 22-D).

The overlay position 1000 may be configured to be superimposed over visual information generated by the touch-based application module, wherein the user interface overlay position is determined based on the image information representing the user. The overlay position 1000 may be configured to represent a current body position of the user. In some implementations, the overlay 1000 may be configured to represent body positions of one or more individual user body parts (e.g., head, body, hands). The overlay 1000 may be for example configured to locate, define, project and/or pose user gestures (e.g. body location, project a visible light pattern presence, configure to determine the depth information to identify a location and/or shape) from one or more simultaneous users. The overlay 1000 may be depicted as having a body position that corresponds to the body position of the user associated with the overlay.

Figure 23:
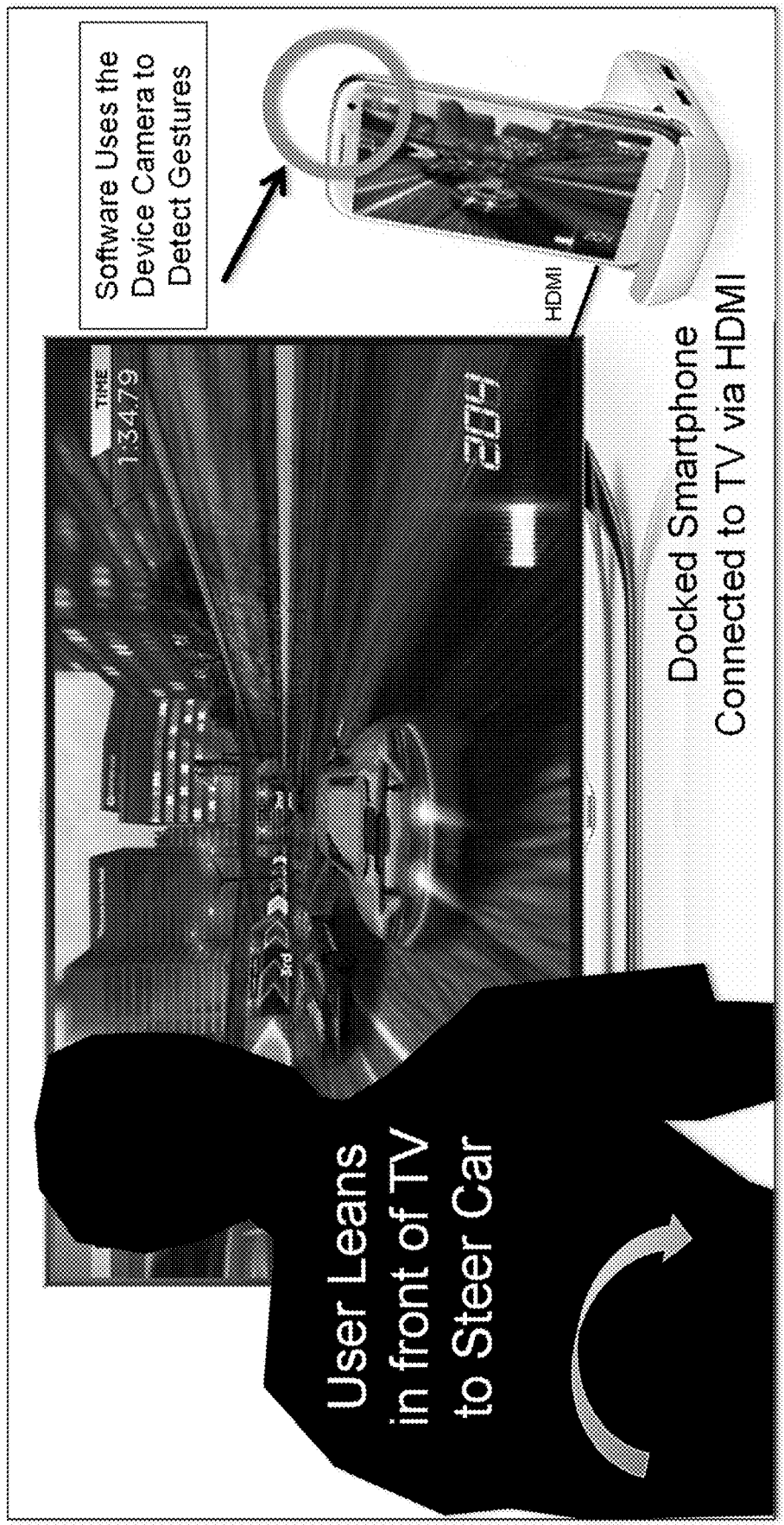
FIG. 23 illustrates a diagram of alternative control of a touch-based device according to the systems and methods described herein.

FIG. 23 illustrates a diagram of alternative control of a touch-based device according to the systems and methods described herein. Specifically, FIG. 23 illustrates a smartphone, such as an Android-based device docked and coupled to a television or other display device via HDMI. In the example of FIG. 23, the user can control the smartphone via physical gestures detected by the camera on the smartphone.

Figure 24A:
FIGS. 24A-24B illustrate diagrams of alternative control of smartphones (FIG. 24A) and laptops (FIG. 24B) according to the systems and methods described herein.
Figure 24A:
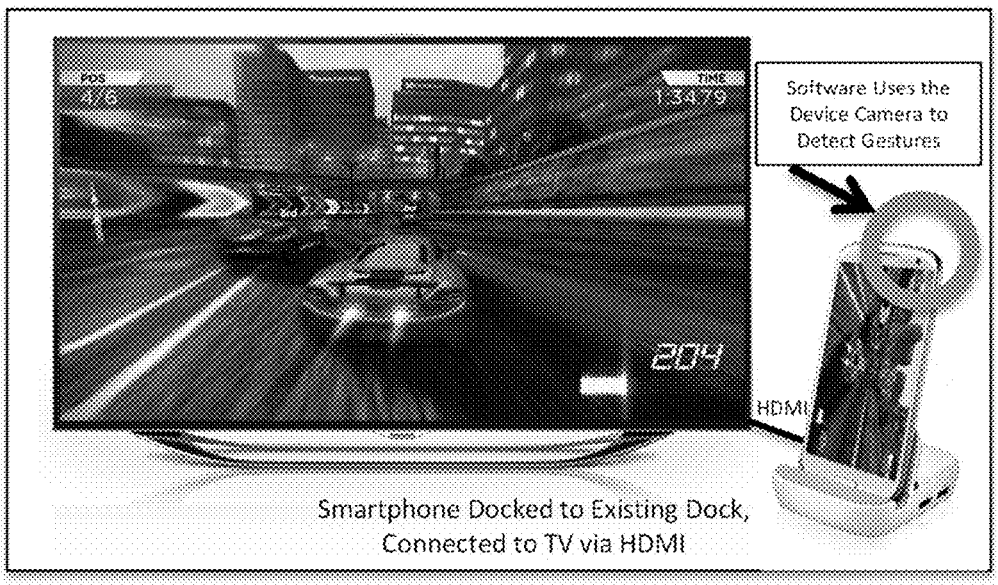
Figure 24A:
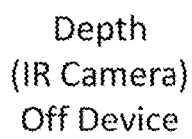
Figure 24A:
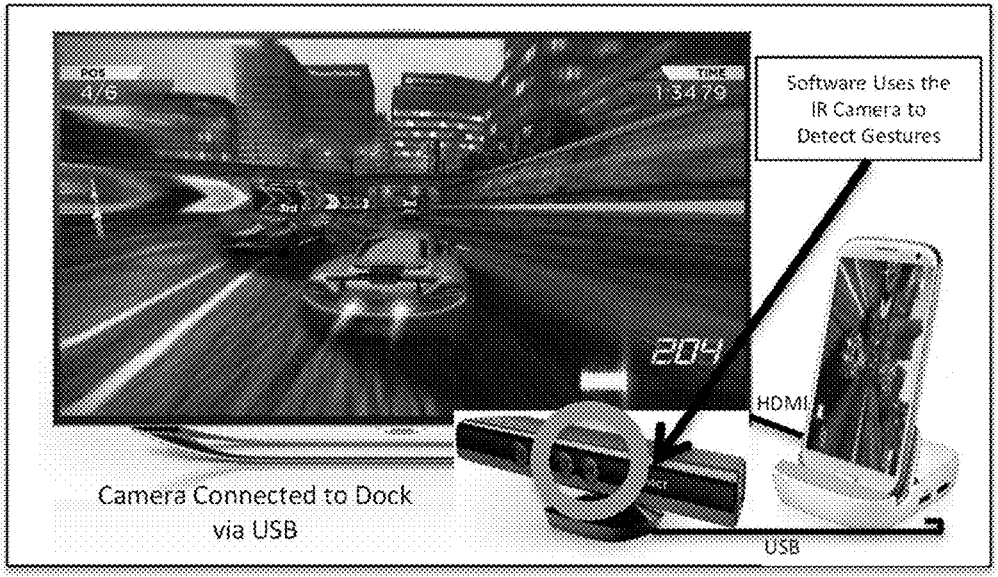
Figure 24B:
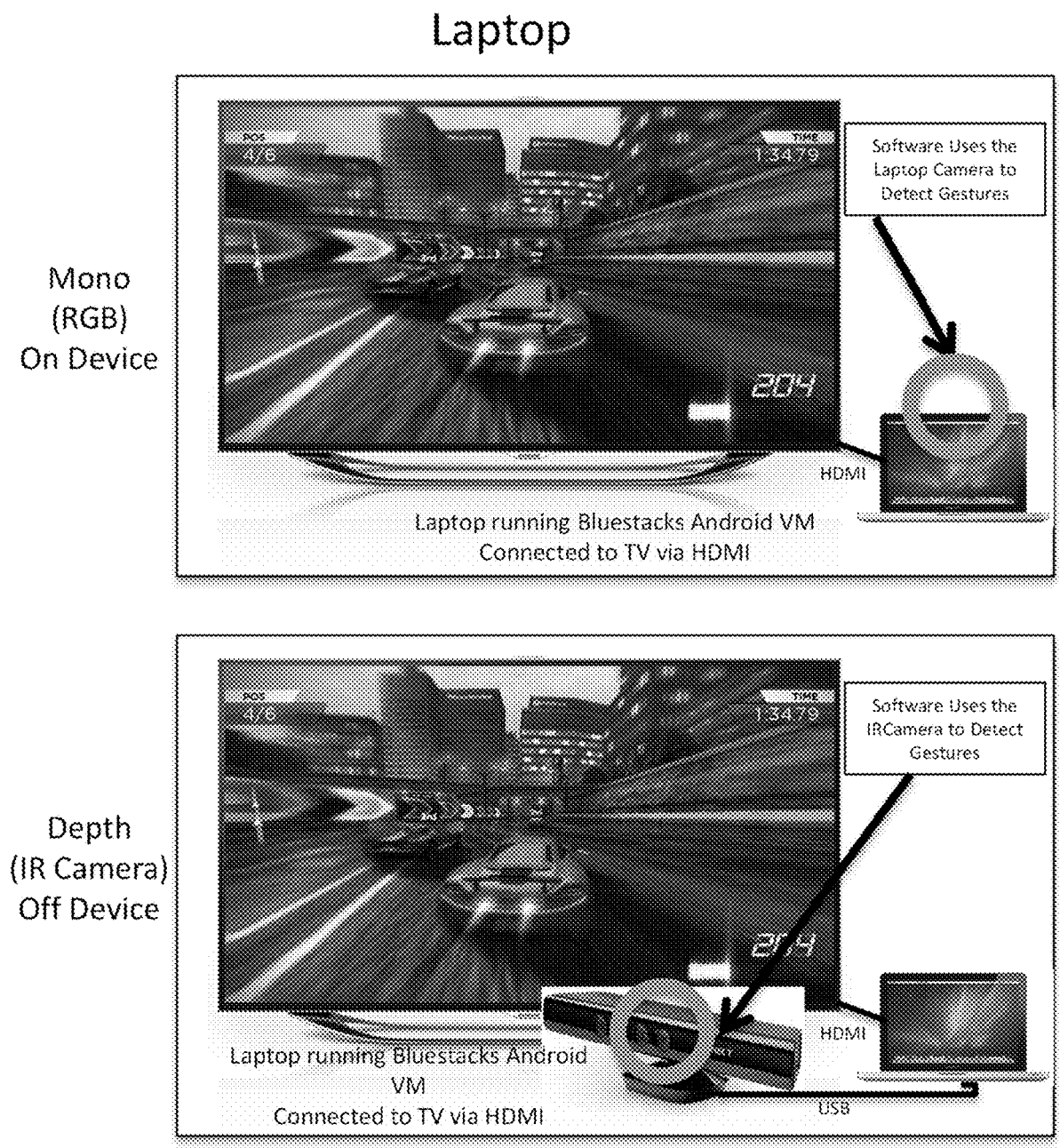
Figure 25A:
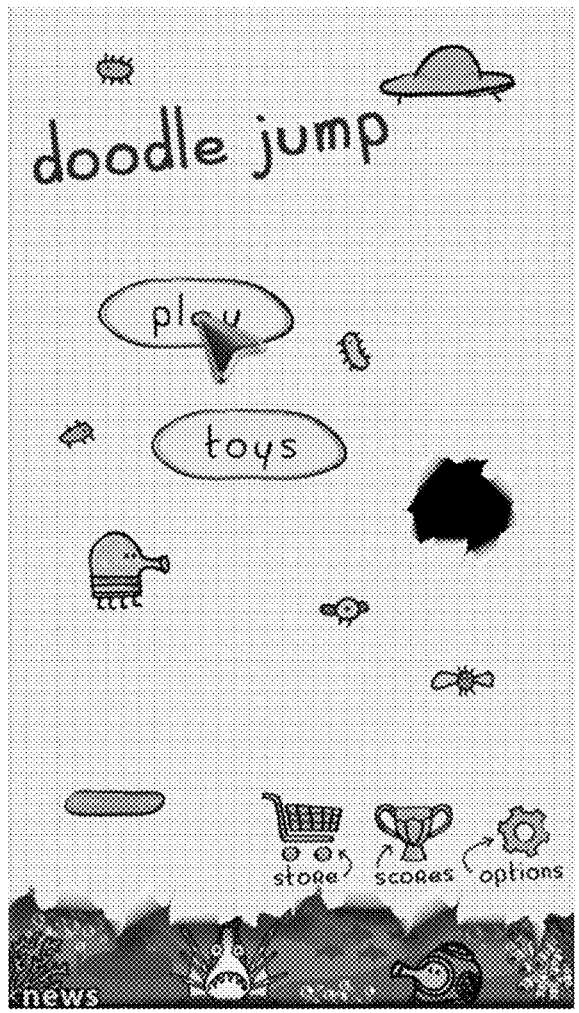
FIGS. 25A-25D illustrate screen diagrams of another example of the Gesture Assist from FIG. 8 with a "snap to" feature on a doodle jump menu screen.
Figure 25B:
Figure 25C:
Figure 25D:

FIGS. 24A-2B illustrate diagrams of alternative control of smartphones (FIG. 24A) and laptops (FIG. 24B) according to the systems and methods described herein. Specifically, FIG. 24A illustrates using the smartphone with its camera as well as with a camera (e.g., IR camera) coupled to the dock via USB. Similarly, FIG. 24B illustrates replacing the smartphone with a laptop or the like.

The systems and methods described herein can be generalized to provide alternate control to at least include (a) the use of traditional game controllers and (b) the use of secondary mobile devices, such a second smartphone or a tablet. This includes mappings between gestures sensed by our software and input controls such as touch and tilt sensors. This could also be generalized to include mappings between game controllers and device sensors, and mappings between secondary mobile devices and primary mobile device sensors. For example, if I swipes with my right hand, I may touch a "play" button in a game. I can also trigger a press of the "play button" by pressing the A button on a gamepad, or by pressing a region of the display on a secondary mobile device. We call these mappings "Input Maps" which can be manually created or automatically learned given (a) recordings of traditional mobile device gameplay sensory data, i.e. multiple time-varying 2D point touch locations and 3D tilt orientations, and (b) a seed set of exemplar input maps which are manually generated.

Input maps may be created by mapping core actions recognized by a gesture recognition system, a button press on a game controller, or a tap to a touchscreen on a secondary mobile device, to touch or tilt input events. For example, the centerline through the torso of a user, i.e. a line connecting an estimate of the user's nose and navel, is computed in real-time and mapped to an appropriate in-plane rotation of the mobile device's tilt sensor (accelerometer). The same output may be generated by an analog joystick on a traditional game controller, or by the tilt sensor output of a secondary mobile device. These mappings may be manually generated by writing event handler methods that are called when actions are recognized by the input module, such as a right swipe gesture. Upon being called, an action is triggered by the output module, such as a touch down even on the touch screen at a particular location and for a specific duration of time. Here is an example of an event handler for Need for Speed which maps a gesture of a swipe action of the right hand moving to the side of the body to a touchscreen swipe event (used to trigger a nitro burst of speed in the game):

```
protected Swipe __rightSwipe = new Swipe(0.6f, 0.50f, 0.9f, 0.50f);
@Override protected boolean rightAction (boolean entered, boolean exited)
{
    if (entered) {
        __rightSwipe.issue(__phone);
        Debug.info("send: RIGHT>>>");
    }
    return true;
}
```

This small block of code may be re-used to control other games which involve swiping the right side of the screen, such as a right swipe turning a character to the right in Temple Run 2. It is possible to automatically re-use input map event handler methods for unseen games by (a) recording touch and tilt signals while the unmapped game is played in the native way, (b) matching an unmapped game to a previously mapped game on the basis of similarity of native input events (c) copying event handler methods from the matching mapped game to the unmapped game and (d) tuning the parameters to the lifted game using data analysis techniques. For example, assume Need for Speed has been already mapped and we'd like to automatically map Temple Run 2. Following step (a), we record several runs through Temple Run 2 by capturing all touch and tilt state for each frame in time (typically games run at 30 or 60 Hz). A feature vector on this recorded data may be computed (such as a histogram of oriented touch trajectories) and used to compute similarity between the unmapped Temple Run 2 and a set of previously mapped games. The closest match yields event handler methods represented by computer code (Java code in the above example), and the parameters (e.g. the _rightSwipe Swipe definition above) may be modified to suit the recorded data for Temple Run 2 (i.e. the mean trajectory on the right side of the screen is used, which can be computed by standard clustering techniques such as mean shift). Thus, we have developed a principled and data-driven methodology for mapping new games given gameplay recordings.

During gameplay, it is possible for a user to no longer be tracked or have her gestures recognized. For example, if the user starts to move out of the field of view, the system can no longer see that person. In the event of a detection of a loss of "lock on" for a user, our system will automatically programmatically press the back button on the mobile device. Most games will pause when the back button is pressed. Our system will notify the user that they are no longer being tracked and given feedback to move until they are once again tracked. If this happens again in the same app, the system will pause again but prompt the user if they want to keep this auto-pause feature on or off.

New App-Dependent System Capabilities:

The section above described how an app may have its own custom input handlers for unique control of each app. In addition to control, there are several other properties of apps which are defined by our input maps: (a) The orientation of the screen (portrait or landscape), which governs the input map coordinate system (e.g. a right swipe has a different trajectory in portrait mode than in landscape mode, or the notion of "up" in tilt coordinates varies), (b) the layout of graphical overlay elements (e.g. the lean meter stick may belong in the center and at the bottom for one game and in the upper left hand corner for another game), (c) the look and feel of graphical overlay elements (e.g. color, size, style of lean meter), and (d) an introductory animation played while the game is loading to describe how a game is played with gestures (what we refer to as the "gesture coach").

New Launcher Application:

An app launcher can be developed for users to see all apps which have been mapped and are able to be controlled via alternative means (i.e. gesture, game controller or secondary mobile device). The launcher has two primary modes of operation: (1) calibration, or live preview of the camera feed to see if the user is fully visible in the play space and (2) app selection. In our prototype app, we have combined both modes into one screen (but in the future they will be in their own separate screens).

The app includes a background service and an activity, or window which presents a launching menu to the user. The background service constantly processes camera images in the background while running another app such as a game. For example, the app may be automatically launched when the device is docked to a TV. Alternatively, the app could be presented as a Mode for all of Android in the future. For example, the Samsung Galaxy S4 ships with a Driving Mode and a Reading Mode which tailors various aspects of the user experience to make it better for driving or reading.

Note, the majority of smartphone and tablet games share similar game mechanics. Subway Surfers, Temple Run and Minion Rush are all examples of endless runners: games that move forward on a 3D course and accept touch swipes up, down, left and right to jump, crouch, and turn left and right. When a user learns how to play one endless runner, she is able to quickly learn to play another endless runner. Likewise, most racing games such as Need for Speed Most Wanted and Heat: Asphalt 7 share the tilt-to-steer game mechanic.

The systems and methods capitalize on the shared nature of touch and tilt interaction techniques for smartphone/tablet gaming by enabling 3 alternative control techniques for existing smartphone games: (1) gestures, (2) handheld game controllers and (3) secondary mobile devices. First and foremost, the systems and methods enable gamers to play their smartphone games on a large display using gestures. This is unique for at least two reasons.

First, there are no vision-based gesture controlled smartphone apps available today. Kinect is the leading system for motion gaming, and it requires an Xbox game console and a Kinect depth camera. Sony offers the Move accessory to the PlayStation system, and requires that the user hold a baton in each hand. In contrast, the systems and methods use the front facing camera on a mobile device to sense gestures. Second, the systems and methods are unique in that it works with existing apps on a user's smartphone. These include apps which were previously downloaded and used in the native manner with touch and tilt, such as a gamer's favorite set of smartphone games. A small set of smartphone games are able to work when connected to a large display by working with handheld game controllers. Apps which currently interact with game controllers are rare, and have special code inside to accept control from a 3rd party device (e.g. Moga, Samsung Mobile Console, Green Throttle). In contrast, our system requires no modification to existing apps to be able to control them with gestures, game controllers or secondary mobile devices.

It is challenging to interpret the stream of images from a front-facing embedded smartphone camera to detect and measure gestures. Lighting is variable, user appearance is extremely variable, and motion blur often pose challenges to computer vision and gesture recognition. The systems and methods work in a coarse-to-fine manner to overcome these challenges. First, it detects faces using a Viola-Jones face detector trained using local binary pattern (LBP) features. Experiments show that standard Haar wavelets are 2.5 times slower than LBP in detecting faces at runtime despite showing fewer false negatives, especially at small scales.

Following face detection on each new frame, face boxes undergo outlier rejection and clustering. All face boxes per frame are evaluated to estimate if motion has occurred in the region defined by the face box. A face is rejected if the normalized sum of intensities of a motion history image with 1 s decay within the face box region falls below an auto-tuned threshold value. Following rejection of stationary faces (i.e. moving faces are kept as inliers), face boxes over the past short duration of time (e.g. 5 s) are clustered using the mean-shift algorithm. The dominant cluster (i.e. has the largest cardinality) and its exemplar value (mean value over all face boxes represented as [centerx, century, width, height]) is kept and defined as the stable face. The stable face defines a center of rotation for a user who has the focus of attention that approximately locates the navel of the user (i.e. 3 stable face heights below the center of the stable face). For each new frame, all instantaneous face detection boxes are evaluated in terms of distance from the circle defined at the navel estimate with a radius of 3*stable_face_height. The instantaneous face box with the lowest distance to this circle is kept as the current frame's selected winner, whose center is defined as point pf. The angle formed between a=(stable_face_center−navel) and b=(pf−navel) is calculated using the dot product: $dot(a,b)=|a|*|b| \cos\theta$. This angle is mapped to the tilt control of games. Next, we define 3 regions relative to the stable face: left_region, right_region and top_region. The motion history image per frame is transformed into an integral image (a.k.a. summed area table), and the integral image is evaluated for the left_region, right_region and top_region for normalized intensities that exceed a threshold. If any region does, a flag is set indicating so. This provides the basic mechanism used to map swipes left and right with gestures beside the body to standard touch based swipes used in endless runner games.

Alternative Control of Existing Apps on Mobile Devices

There are four methods for providing alternative control of existing apps on mobile devices. The first three methods are specific to the Android OS and the fourth is a generic hardware-based technique which works across all mobile devices The first method is a system-signed app. It works without having to modify the Android operating system at all. All Android apps are packaged with a Manifest file which specifies the permissions that the app needs. One of those permissions is a system permission titled INJECT_EVENTS, which allows an application to inject user events (keys, touch, trackball) into the Android event stream. Our app has two components: (a) a background service and (b) a calibration and app launcher activity (window), which correspond to the app screenshots I sent you earlier. The background service component uses the INJECT_EVENTS capability to control the touchscreen while other applications are in the foreground. This technique does not afford the ability to control the accelerometer sensor. Despite this, however, several apps which are controlled by tilting the phone (i.e. racing games played by tilting-to-steer) provide an alternative steering mechanism call tap-to-steer. Thus, a system-signed app may control accelerometer-controlled apps which also offer a tapping alternative to tilting. We employ tap-to-steer to control several popular racing games including Need for Speed Most Wanted and Beach Buggy Blitz.

A system signed app is a standard Android app, packaged as an APK file, which has been cryptographically signed using a public and private key. A device OEM that has loaded Android onto a device must also generate and store a public and private key. The app signing process involves running an encryption program given the public and private keys to generate a keystore file. This keystore file may then be used at app deployment time to grant the APK the desired system privilege (in our case, the INJECT_EVENTS privilege). In practice, each mobile device has its own public and private keys which correspond to the Android build it is running, and these key files are closely guarded by the OEM to protect against security exploits.

The second method injects touch and tilt events into the Android operating system via the Linux input subsystem, which provides several event files (typically located in the /dev/input directory in a Linux system) that may be used as an interface for device drivers. By writing commands directly into the event file, we can both monitor sensor activity (e.g. read out touch down locations when the sensor is actually physically touched) and insert our own sensor commands (e.g. specify touch locations without actually physically touching the sensor). If an accelerometer device driver adheres to the Linux input subsystem and thereby provides an event file interface, we are able to inject our accelerometer commands. We have created a special Linux program called a daemon which continuously runs in the background and accepts commands over a network (we currently support three kinds of communication: 802.11, Bluetooth and domain sockets) which follow our proprietary networking protocol. These commands are transformed into the appropriate device driver commands for the touchscreen and accelerometer devices.

One can modify the Android OS code itself to support event injection. In the Android stack lies a module called the SensorManager, which is responsible for accessing the device's sensors and generating the appropriate events (e.g. touch screen events) which flow up the stack to the app. By inserting our own custom code, we can generate our own events regardless of what the physical sensors are reporting. Specifically, we can insert code which communicates with our background service (which does computer vision to sense gestures) and injects events of the appropriate type. This technique requires rebuilding and deploying the entire Android OS on a given device.

One can apply a physical layer of hardware atop the touchscreen which activates the touchscreen. Without loss of generality to all touchscreen technologies, we describe an approach for capacitance-based touchscreens (the most common in modern mobile devices). A capacitive touchscreen monitors changes in current conducted by a finger placed on the glass surface via two layers of electrical lines (a set of horizontal lines and a set of vertical lines). By placing a similar grid of lines on top of the glass surface, we are able to drive an appropriate current for a given row and column (2D location) to simulate being pressed by an actual finger. A smartphone dock which includes a sleeve that covers the touchscreen (whose display is mirrored on an external display) may stimulate the touchscreen in response to gestures recognized by the camera (which is obviously not covered by the sleeve and able to view the scene). This technique does not work for the accelerometer sensor and is thus limited to the same set of apps described in (1) above.

Automatic Menu Navigation

Smartphone/table media apps have two primary modes of operation: (1) menu navigation and (2) consumption of media. Games and media viewing apps, for example, universally separate the process of navigating menus from the act of playing games or consuming media. Games and media viewing apps differ in frequency and style of touchscreen or accelerometer interaction. Gameplay typically involves tapping or tilting in accordance with an interaction mechanic, or physical means of playing the game. For example, several racing games (e.g., Powerboat Racing 3D) employ tilting to steer a vehicle and side scrollers (e.g., Jetpack Joyride) often involve tapping the screen to move a vehicle upwards. Media viewing apps, when used to watch videos and look at photos, are passively observed with occasional active control over the playback.

On the other hand, menu navigation is the process of sequentially selecting menu options, by pressing touchscreen buttons, and is a more consistent mode of operation than the varying ways of playing games or consuming videos and photos. To get into the game or to start watching movies, all app users must first go through the menu navigation process. The user often has to press the same sequence of buttons between gaming sessions to simply start playing the game.

Figure 26:
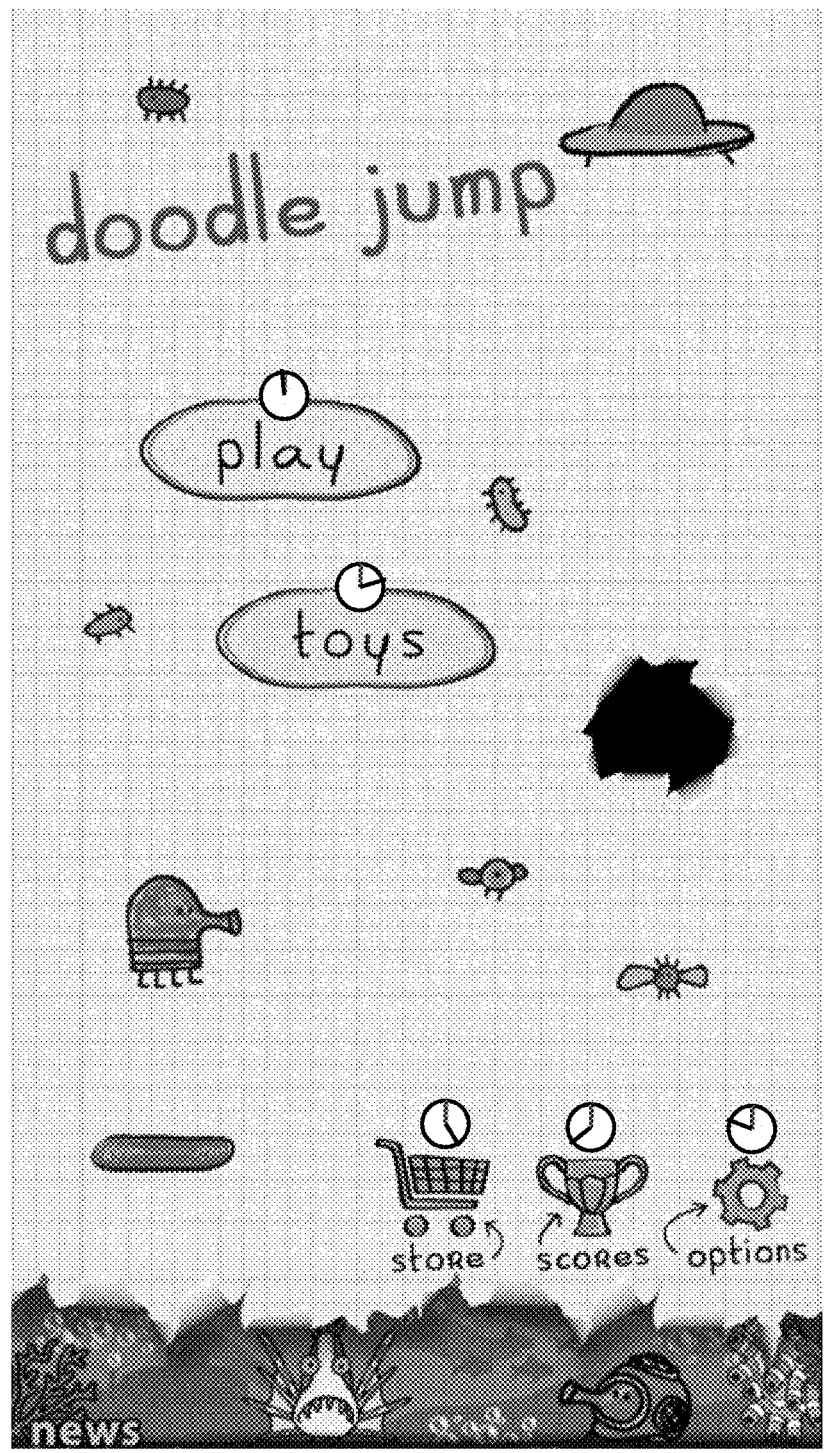
FIG. 26 illustrates a screen diagram of the doodle jump menu screen from FIGS. 25A-25D with a one-click feature included allowing selection of any menu item based on timing.

FIGS. 25A-25D illustrate screen diagrams of another example of the Gesture Assist from FIG. 8 with a "snap to" feature on a doodle jump menu screen. Again, the Gesture Assist function assists alternate control to convert wide-ranging movements to specific locations on the screen during menu selection. FIG. 26 illustrates a screen diagram of the doodle jump menu screen from FIGS. 25A-25D with a one-click feature included to allow selection of any menu item based on timing. The one-click feature identifies all selectable menu items on a screen and assigns a phase or time to select the item, indicated in the example of FIG. 26 by a stopwatch. From this, a user can select any menu item based on a single gesture for a specified time. For example, see Broderick T, MacKay D J C (2009) "Fast and Flexible Selection with a Single Switch," PLoS ONE 4(10): e7481. doi:10.1371/journal.pone.0007481. The present invention includes an automatic creation of the user interface along with using the as an interface to control existing applications without modifying them.

Figure 27:
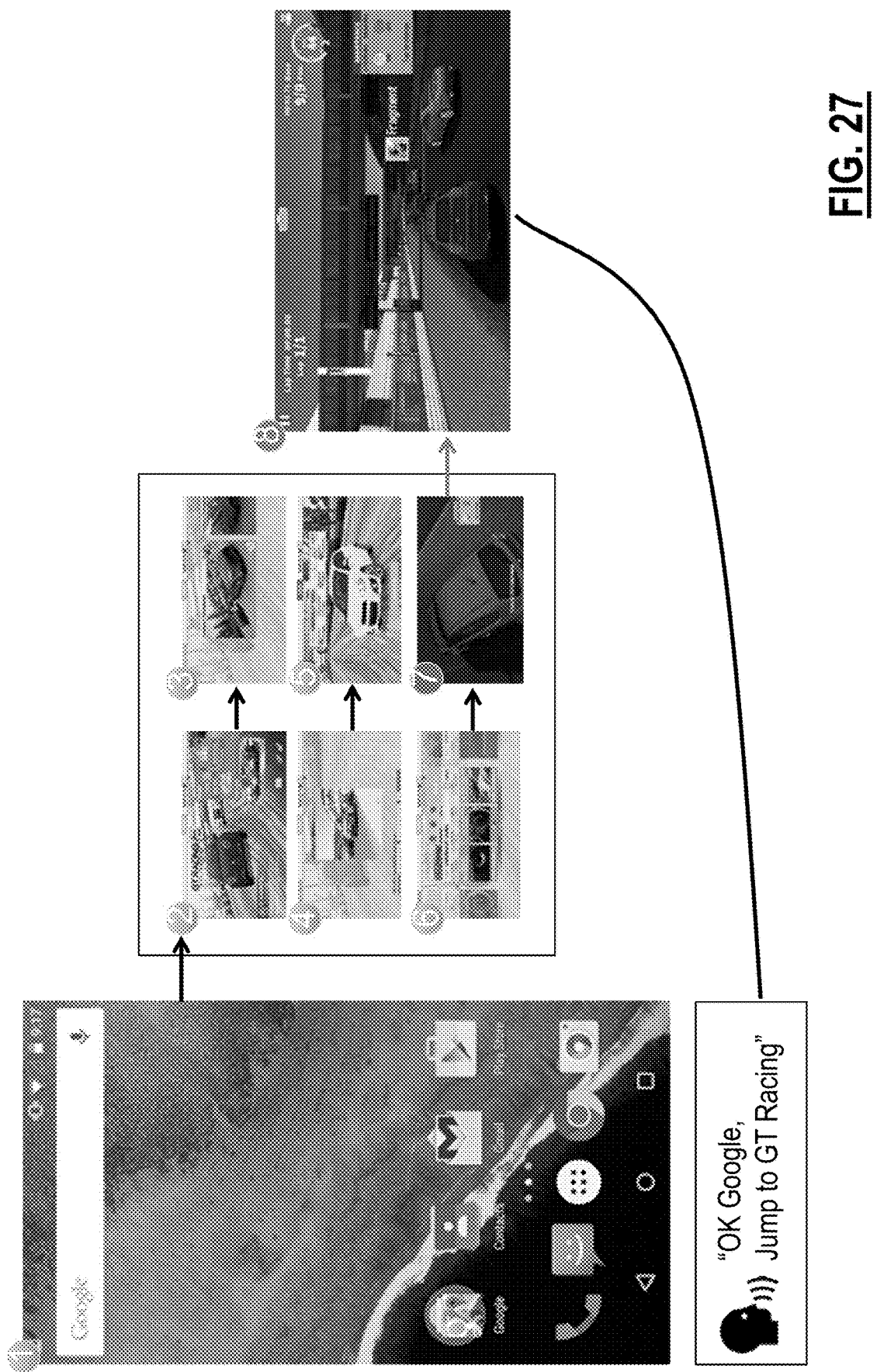
FIG. 27 illustrates a flow diagram of screen shots of menu navigation from a home screen to playing a game.

FIG. 27 illustrates a flow diagram of screen shots of menu navigation from a home screen to playing a game. In particular, a user, to play GT Racing on Android, for example, goes through 7 screens to get to gameplay. In an exemplary aspect, the systems and methods provide automation to get through the menu screens. This is especially useful, but not limited to, alternative control of touch-based systems. In an exemplary embodiment, the automation of menu navigation uses OK Google plus a command such as "Jump to X"—Jump to GT Racing. Of course, on iPhone, this could use Siri.

Figure 28:
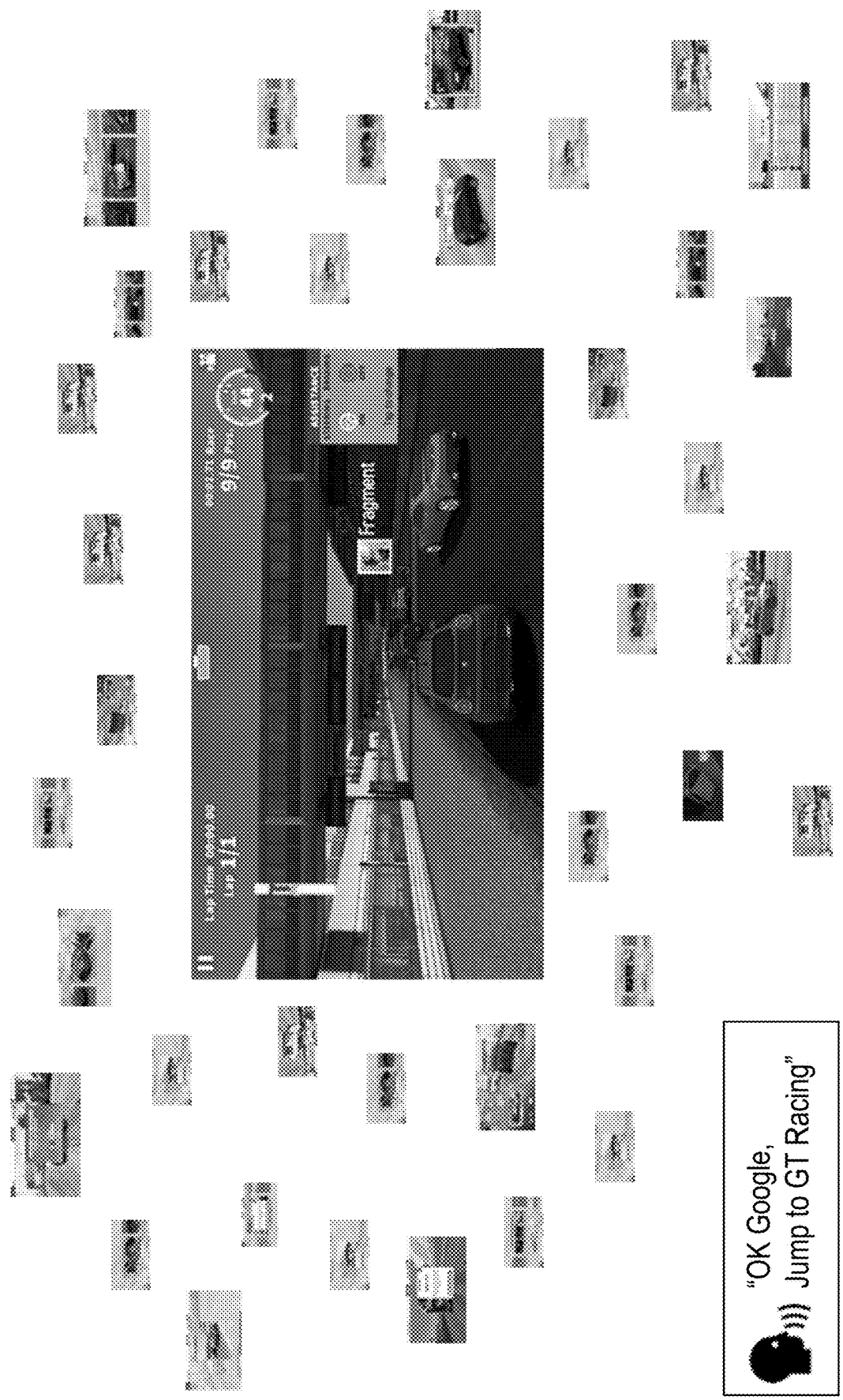
FIG. 28 illustrates automatic navigation anywhere in a game.

FIG. 28 illustrates automatic navigation anywhere in a game. Here, the systems and methods recognize that the touch-based device may be taken away from gameplay, e.g., to take a phone call, etc. The systems and methods contemplate automatic navigation back to the game.

Figure 29:
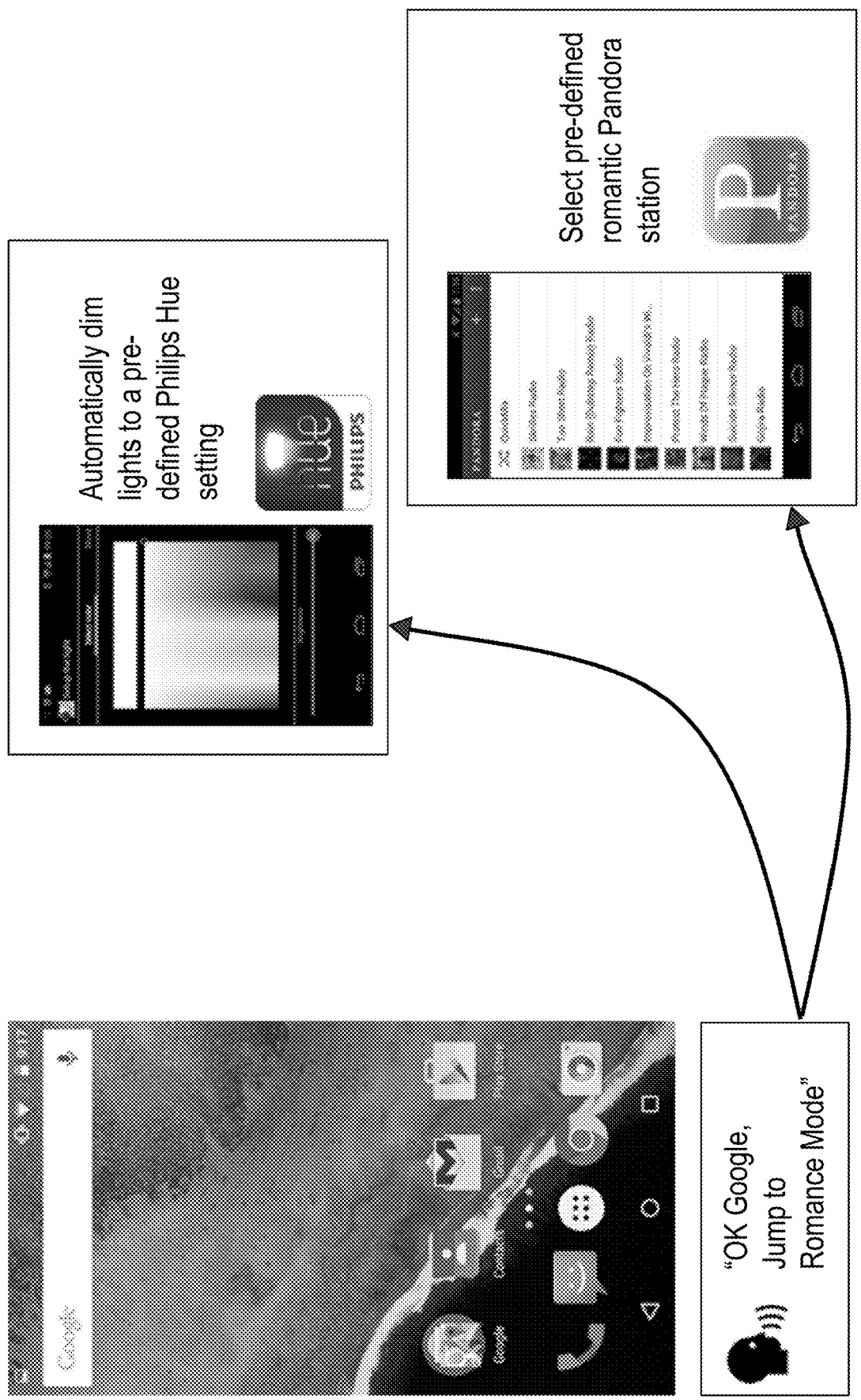
FIG. 29 illustrates automatic menu navigation of multiple apps using a single command.

FIG. 29 illustrates automatic menu navigation of multiple apps using a single command. Additional, the automatic navigation can be used to simultaneously control multiple apps. Here, "OK Google, Jump to Romance Mode" could include changing lighting using a lighting app (Hue from Philips) and playing music using a music app (Pandora). Those of ordinary skill in the art will recognize various different combinations are possible. In essence, the automatic navigation of menus can be viewed as a macro which automates various menu functions.

Figure 30:
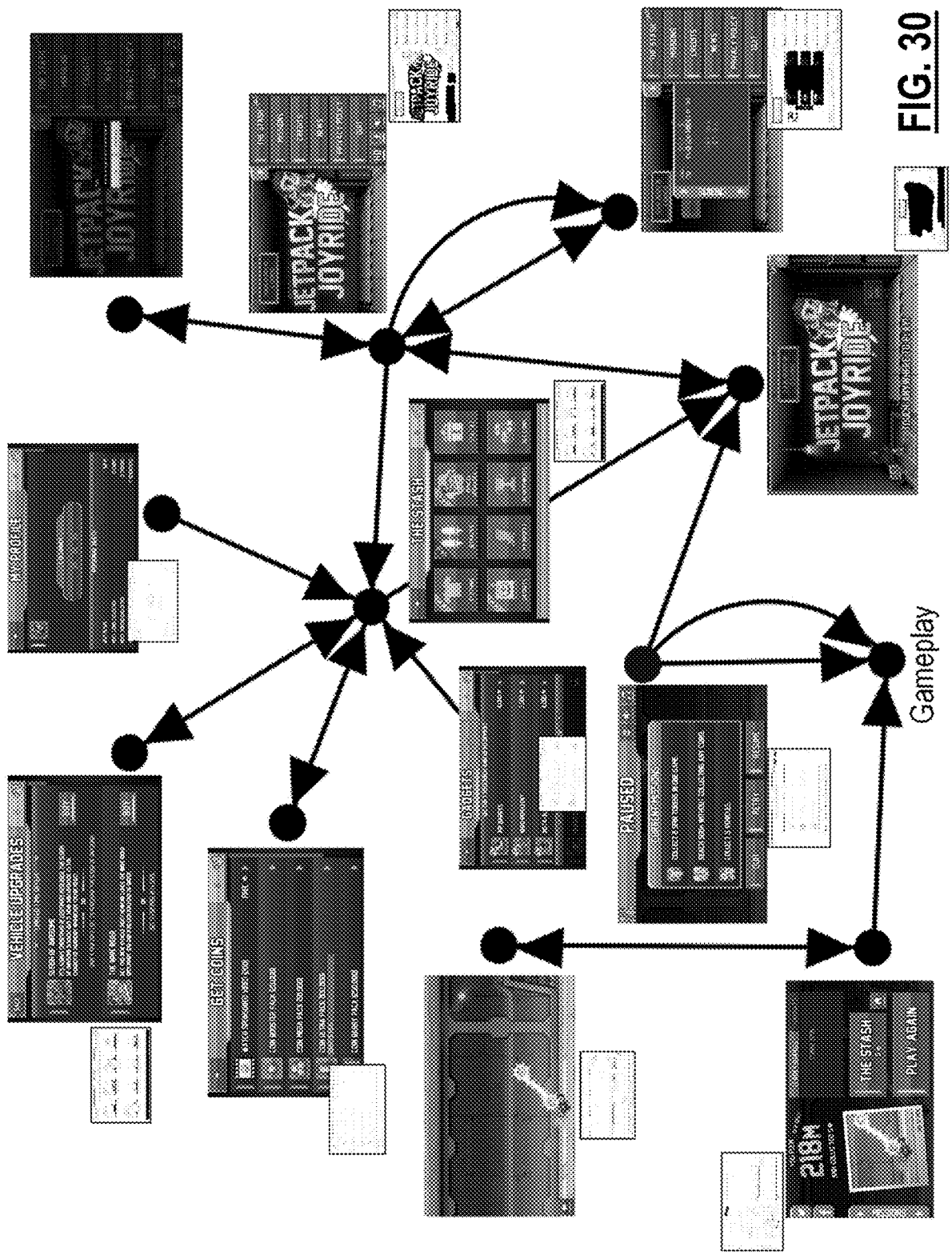
FIG. 30 illustrates modeling menu navigation using a graph for automatic machine learning.

FIG. 30 illustrates modeling menu navigation using a graph for automatic machine learning. Here, menu navigation in any app can be modeled as a graph—nodes being menu screens and vertices being transitions between menu screens (e.g., buttons). Using graph techniques, menu navigation can be automated through machine learning to find techniques to get from one point to another via a shortest path, e.g., using Dijkstra's shortest path algorithm.

The systems and methods include a technique for enhancing the usability of menus in smartphone media apps. There are three specific interaction techniques, which improve the efficiency of menu navigation:

(1) Automating the process of navigating an app's menu, e.g. to start playing a game or consuming a video or set of photos
(2) Voice commands for (a) launching and navigating menus to gameplay or watching videos using a single command and (b) replaying the game or video using a single command without physically touching the touchscreen and
(3) Enabling accessory controllers, such as gamepads and remote controls, to navigate menus without having to physically touch the touchscreen and without having to freely move a cursor to target buttons for selection.

Furthermore, these techniques may be carried out on a single app or multiple apps as a batch. For example, one voice command can be used to perform the following operations as a single batch: (a) start playing a particular style of music in a music playing app and (b) adjust the lights using an Internet of Things lighting control app (e.g. Philips Hue).

Also, a key aspect of these techniques is that they are performed without requirement modification of software from the publisher. In one exemplary embodiment, these techniques are performed in the dock. In another exemplary embodiment, these techniques are performed in a module used to perform the mappings between the gestures and the touch-based commands.

Use Case Scenarios Which Benefit From Usability Enhancements

There are several desirable scenarios, which can take advantage of usability enhancements to menu navigation. First, when the phone is used on the go, voice commands enable the navigation of menus in a hands-free and eyes-free manner. Second, when the smartphone is clipped into a gamepad, the d-pad may be used to rapidly target and select buttons on menu screens. Third, when the smartphone is attached to an auxiliary display, such as a living room or conference room TV, gamepads, remote controls, gesture controls and voice commands may be used to navigate menus without physically interacting with the attached smartphone.

Software Components

The usability enhancement technique rests upon the following novel software components, which work in tandem to enhance the usability of smartphone menus.

Menu Graph: Menu screens are represented as nodes in a directed acyclic graph, and menu buttons as edges which are used to universally represent menus to support enhanced menu navigation on a per-app basis (one graph per app).

Snap To Map is a collection of buttons associated with a menu graph node and is used to snap a cursor to button locations.

Menu Screen Recognition includes identifying which node in the menu graph the user is currently looking at and is used as feedback to update internal location of user in menu graph. Recognition is treated as multi-class classification where each menu screen is an individual class to be recognized. Menu screens vary in resolution, aspect ratio and according to dynamic content, such as scores and level unlocks. Menu screens are given class labels and menu classifiers are learned from training data that is captured either (a) in the lab using instrumented smartphones which record screenshots and touch locations for each touch down and up event, along with live video recording of the phone's graphical output or (b) crowdsourcing interactions with menus to automatically learn from users which opt in to help build menu graphs and snap to maps.

Automatic Menu Navigation includes clicking buttons in a menu to walk a path in menu graph. After launching an app, the first menu screen recognized after the app is loaded is used define the source in the path. A single gameplay node defines the destination in the path. Dijkstra's shortest path algorithm can be used to compute the shortest path from the source node to the destination node in the menu graph.

The graph technique can be used to manually program automatic menu navigation. Additionally, the graph technique can enable machine learning where the automatic menu navigation can be automated.

Auto Control Scheme

Figure 31A:
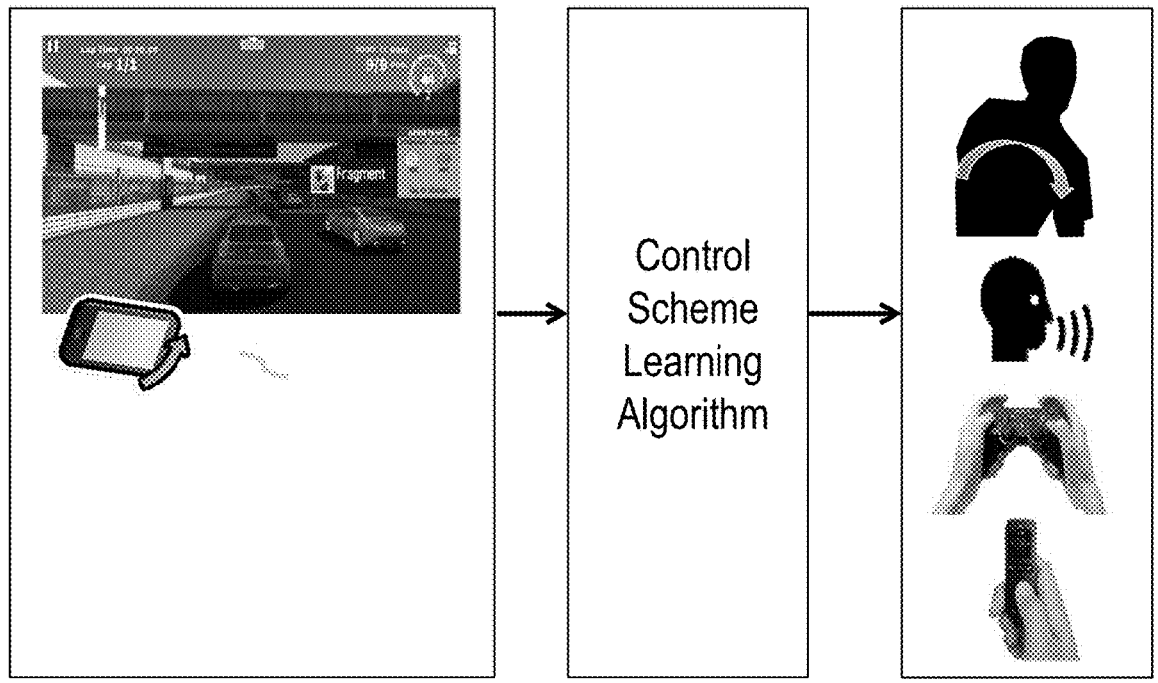
FIGS. 31A-31B are flow diagrams of an auto control scheme for alternative control of touch-based devices.
Figure 31B:
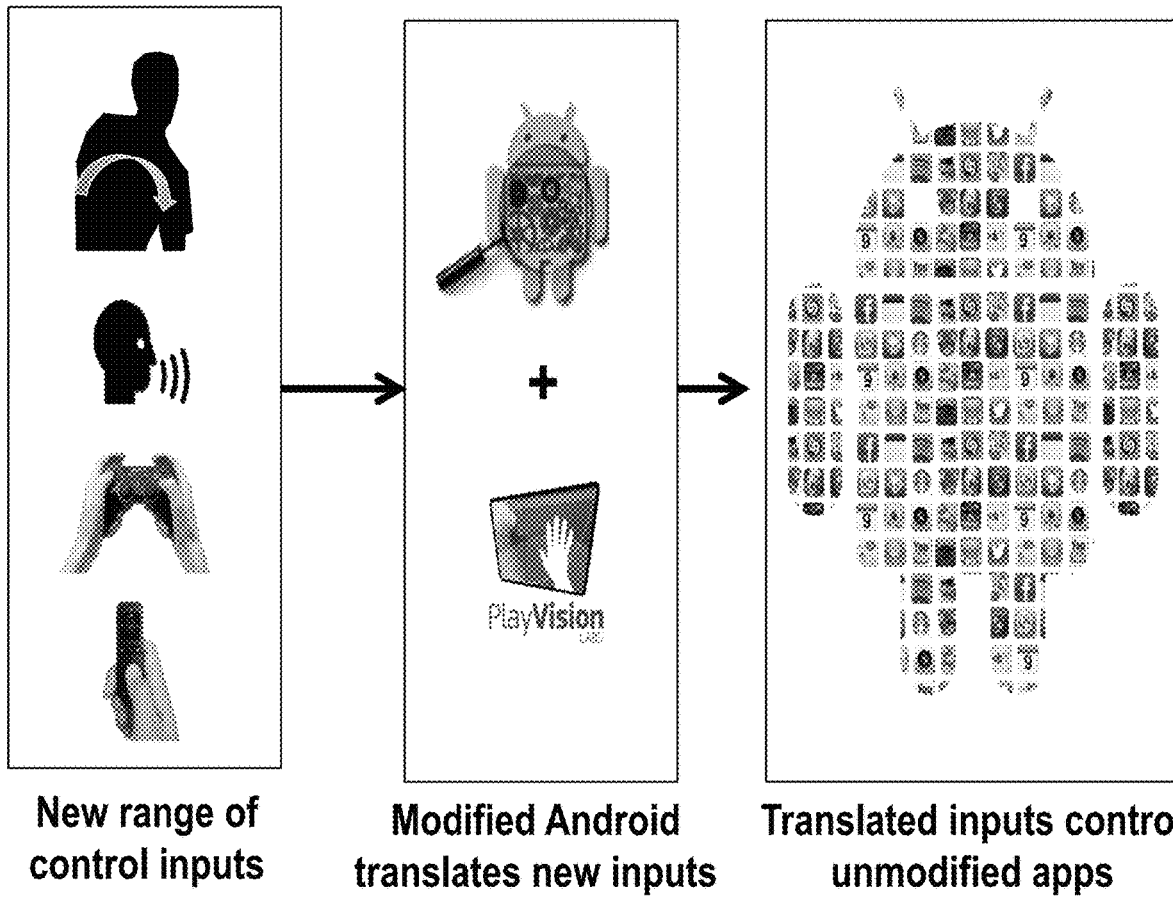

FIGS. 31A-31B are flow diagrams of an auto control scheme for alternative control of touch-based devices. Specifically, FIGS. 31A-31B enable automatic learning of a control scheme code. Previous description above discussed the learning of menu graphs, which are used to enable alternative controllers to navigate app menus using snap to maps. This can be referred to as a menu navigation mode of operation. FIGS. 31A-31B are about the gameplay mode of operation. In FIG. 31A, the auto control scheme takes input including (a) Recordings of Accelerometer and Touchscreen Sensor Data Captured during Gameplay of All Apps in Training Set and (b) Hand-written code mapping alternative controllers to touch and tilt events that apps expect. These inputs are provided to a control scheme learning algorithm. In FIG. 31B, a new range of control inputs are provided and modified Android translates these new inputs to support unmodified apps. Specifically, touch-based apps can now be controlled with alternative controls, without modifying the touch-based apps. Thus, these touch-based apps can now be multi-modal input apps.

Figure 32:
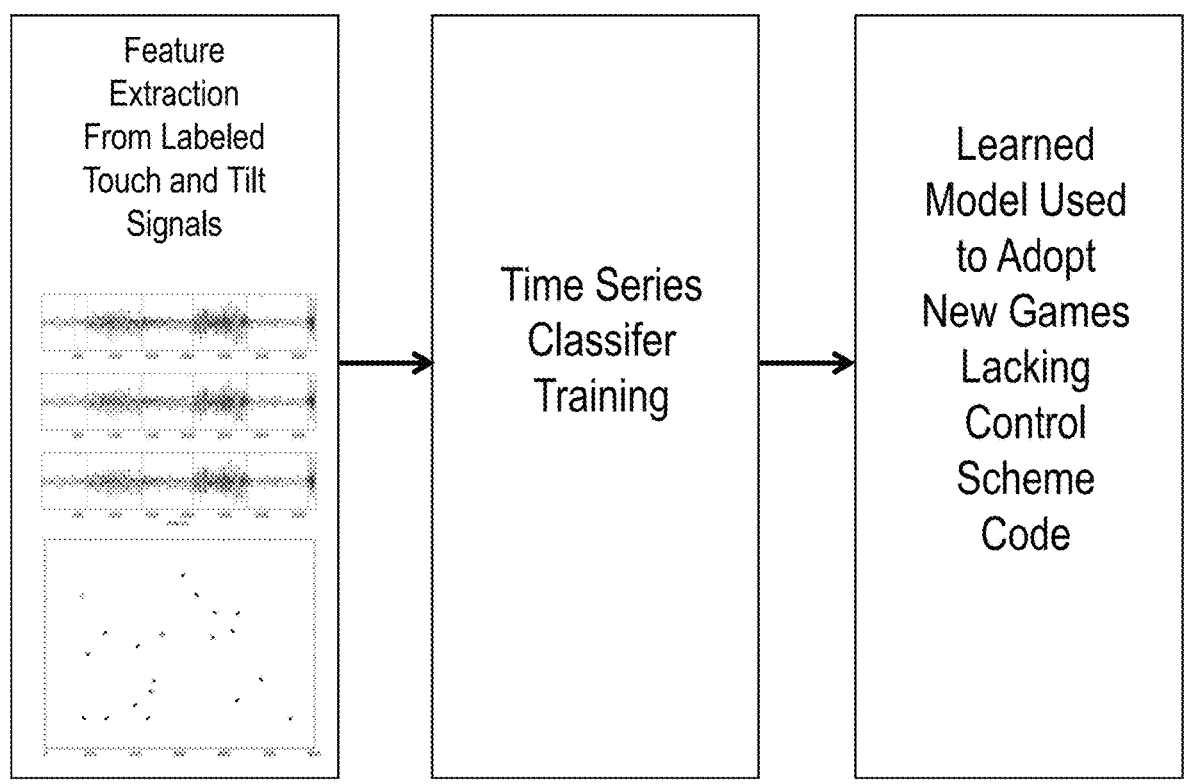
FIG. 32 is a control scheme learning process which extracts features from labeled touch and tilt signals, performs time series classifier training to develop a learned model used to adopt new games lacking control scheme code.

FIG. 32 is a control scheme learning process which extracts features from labeled touch and tilt signals, performs time series classifier training to develop a learned model used to adopt new games lacking control scheme code.

Figure 33:
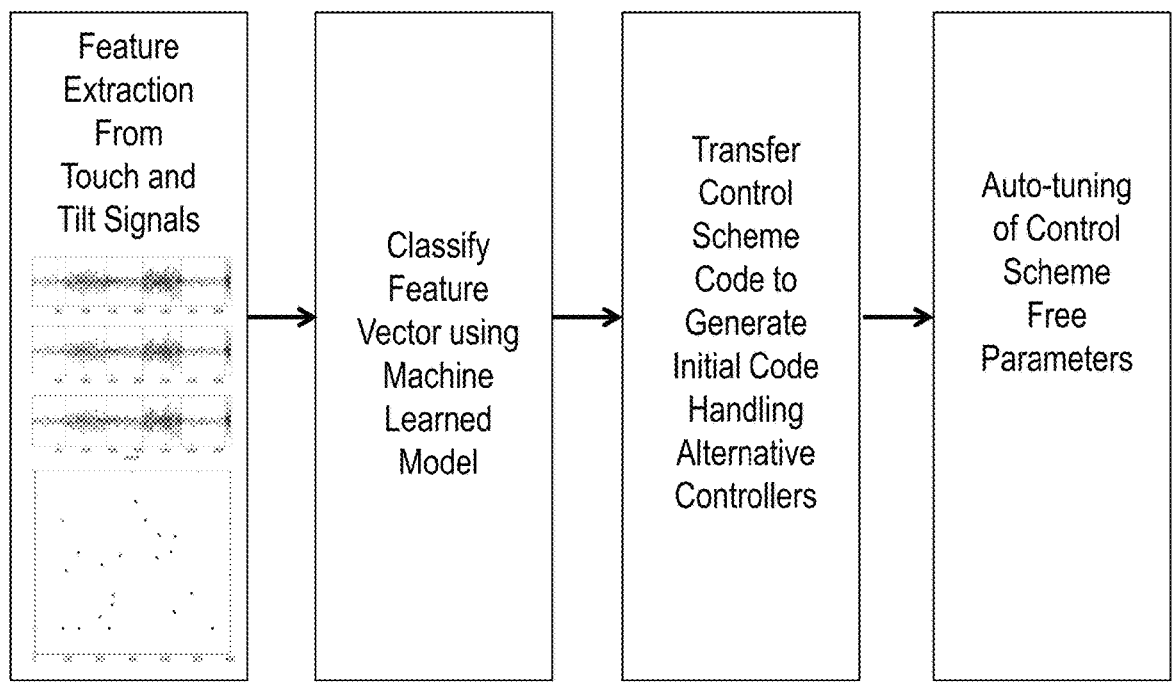
FIG. 33 is an application of a control scheme classifier.

FIG. 33 is an application of a control scheme classifier. Again, features are extracted from touch and tilt signals to classify feature vectors using a machine learned model. The control scheme code is transferred to generate initial code handling alternative controllers along with auto-tuning of control scheme free parameters.

Camera Operation for Alternative Control of Touch-Based Devices

Figure 34A:
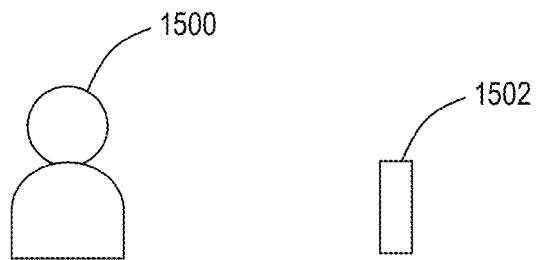
FIGS. 34A, 34B, and 34C are various embodiments for a user and camera for alternative control of touch-based devices.
Figure 34B:
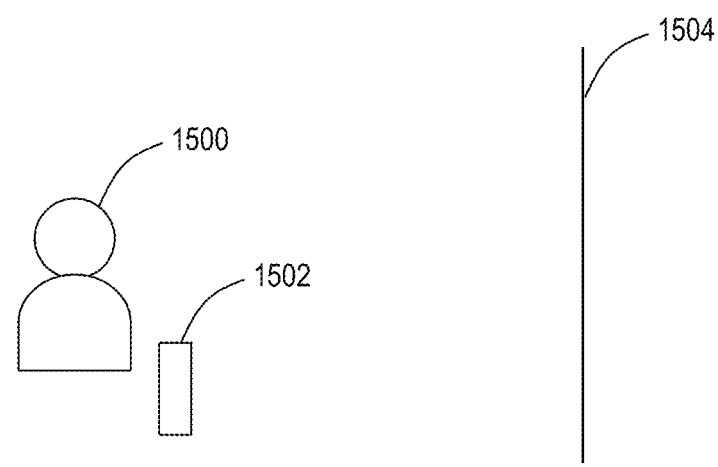
Figure 34C:
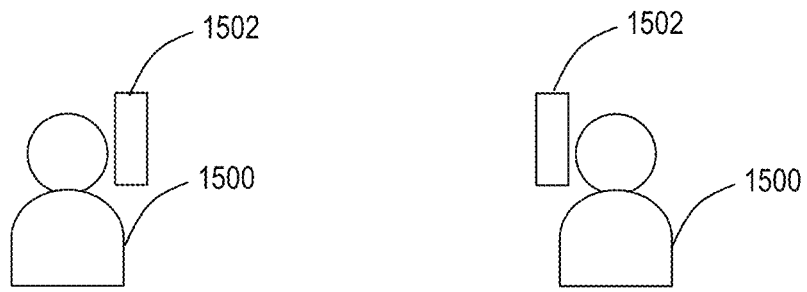

FIGS. 34A, 34B, and 34C illustrate various embodiments for a user 1500 and camera 1502 for alternative control of touch-based devices. In FIG. 34A, the camera 1502 directly faces the user 1500 to detect motion from the user for translation to touch-based and accelerometer-based commands. The camera 1502 can be part of the touch-based device or separately connected. The camera 1502 can be visual and/or IR and/or depth and/or thermal. In FIG. 34B, the camera 1502 faces the user 1500 through a mirror 1504 or the like. In FIG. 34C, the camera 1502 is on a device near the user's eyes, such as glasses, a heads-up display (HUD) or a device holding the touch-based device on the user's head. Here, the camera 1502 can face out to detect other users 1500.

Virtual Accelerometer and Touch Sensors

In an exemplary embodiment, virtual accelerometer and touch sensors can be completely made from software. Therefore, large oversized and/or stationary devices (such as smart TVs, media hubs, game consoles cable TV set-top boxes, etc.) that do not have any physical touch or accelerometer sensors (like mobile devices do) can use the software if they are running an application capable of touch-based commands to control existing apps with the various forms of control in the same manner described herein. Therefore, an OEM can now produce and launch a non-mobile device and bring in existing apps as part of the platform with no need to have app developers reengineer their apps to work on these new forms of devices.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of multi-modal control of a touch-based device, the method comprising:
receiving multi-modal control input data from one or more of voice commands, a game controller, a hand-held remote, and physical gestures detected by a sensor, wherein the multi-modal control input data is provided by inputs of a user;
converting, based on a translation mapping between touch-based data and multi-modal based control data, the multi-modal control input data into corresponding translated input data which correspond to signals generated from receipt of physical inputs recognizable by underlying applications of the touch-based device; and
providing the corresponding translated input data to the underlying applications of the touch-based device for control thereof, wherein the translated input data is utilized to control the underlying applications executed on the touch-based device which recognize the corresponding translated input data as the signals from the physical inputs even though no physical inputs were received by the touch-based device for the signals, and wherein the translation mapping between the touch-based data and the multi-modal based control data is different while menus of the underlying applications are displayed than for other display operations of the underlying applications.

2. The method of claim 1, wherein the method is implemented by a processing device communicatively coupled to the touch-based device and communicatively coupled to one or more input devices configured to obtain the multi-modal control input data.

3. The method of claim 1, wherein the underlying applications are configured for control by the corresponding signals from the physical inputs comprising one or more of touch commands and tilt commands, and the translation mapping maps the corresponding translated input data to the signals from the one or more of touch commands and tilt commands.

4. The method of claim 1, wherein the translated input data is mapped to touch commands on a screen of the touch-based device and tilt commands based on a position of the touch-based device.

5. An apparatus for multi-modal control of a touch-based device, the method comprising:
   circuitry configured to receive multi-modal control input data from one or more of voice commands, a game controller, a handheld remote, and physical gestures detected by a sensor, wherein the multi-modal control input data is provided by inputs of a user;
   circuitry configured to convert, based on a translation mapping between touch-based data and multi-modal based control data, the multi-modal control input data into corresponding translated input data which model signals generated from receipt of physical inputs recognizable by underlying applications of the touch-based device; and
   circuitry configured to provide the corresponding translated input data to the underlying applications of the touch-based device for control thereof, wherein the translated input data is utilized to control the underlying applications executed on the touch-based device which recognize the corresponding translated input data as the signals from the physical inputs even though no physical inputs were received by the touch-based device for the signals, and wherein the translation mapping between the touch-based data and the multi-modal based control data is different while menus of the underlying applications are displayed than for other display operations of the underlying applications.

6. The apparatus of claim 5, wherein the apparatus is disposed in a processing device communicatively coupled to the touch-based device and communicatively coupled to one or more input devices configured to obtain the multi-modal control input data.

7. The apparatus of claim 5, wherein the underlying applications are configured for control by the corresponding signals from the physical inputs comprising one or more of touch commands and tilt commands, and the translation mapping maps the corresponding translated input data to the signals from the one or more of touch commands and tilt commands.

8. The apparatus of claim 5, wherein the translated input data is mapped to touch commands on a screen of the touch-based device and tilt commands based on a position of the touch-based device.

9. A non-transitory computer-readable storage medium having computer readable code stored thereon for programming a computer, server, appliance, or device, each of which comprising a processor which, in response to the computer readable code, performs steps of
   receiving multi-modal control input data from one or more of voice commands, a game controller, a handheld remote, and physical gestures detected by a sensor, wherein the multi-modal control input data is provided by inputs of a user;
   converting, based on a translation mapping between touch-based data and multi-modal based control data, the multi-modal control input data into corresponding translated input data which model signals generated from receipt of physical inputs recognizable by underlying applications of the touch-based device; and
   providing the corresponding translated input data to the underlying applications of the touch-based device for control thereof, wherein the translated input data is utilized to control the underlying applications executed on the touch-based device which recognize the corresponding translated input data as the signals from the physical inputs even though no physical inputs were received by the touch-based device for the signals, and wherein the translation mapping between the touch-based data and the multi-modal based control data is different while menus of the underlying applications are displayed than for other display operations of the underlying applications.

10. The non-transitory computer-readable storage medium of claim 9, wherein the computer readable code stored is executed by a processing device communicatively coupled to the touch-based device and communicatively coupled to one or more input devices configured to obtain the multi-modal control input data.

11. The non-transitory computer-readable storage medium of claim 9, wherein the underlying applications are configured for control by the corresponding signals from the physical inputs comprising one or more of touch commands and tilt commands, and the translation mapping maps the corresponding translated input data to the signals from the one or more of touch commands and tilt commands.

12. The non-transitory computer-readable storage medium of claim 9, wherein the translated input data is mapped to touch commands on a screen of the touch-based device and tilt commands based on a position of the touch-based device.

* * * * *